(12) United States Patent
Griggs et al.

(10) Patent No.: US 7,237,369 B2
(45) Date of Patent: Jul. 3, 2007

(54) AUTOMATED CLIPPING PACKAGING SYSTEMS

(75) Inventors: Samuel D. Griggs, Raleigh, NC (US); Dennis J. May, Pittsboro, NC (US); David T. Wince, Fuquay-Varina, NC (US); William M. Poteat, Fuquay-Varina, NC (US); Derek L. Brown, Apex, NC (US)

(73) Assignee: Tipper Tie, Inc., Apex, NC (US)

( * ) Notice: Subject to any disclaimer, the term of this patent is extended or adjusted under 35 U.S.C. 154(b) by 0 days.

(21) Appl. No.: 10/952,421

(22) Filed: Sep. 28, 2004

(65) Prior Publication Data
US 2005/0034426 A1 Feb. 17, 2005

Related U.S. Application Data

(60) Provisional application No. 60/508,609, filed on Oct. 3, 2003, provisional application No. 60/579,846, filed on Jun. 15, 2004.

(51) Int. Cl.
B65B 51/04 (2006.01)
(52) U.S. Cl. ............... 53/138.2; 53/138.4; 53/576; 29/243.56; 452/48
(58) Field of Classification Search .......... 53/417, 53/138.1–138.4, 567, 576; 29/243.56, 243.57; 452/30, 35, 37, 38, 48
See application file for complete search history.

(56) References Cited

U.S. PATENT DOCUMENTS

| 2,720,055 A | 10/1955 | Ward |
| 2,880,419 A | 4/1959 | Tipper |
| 3,342,017 A | 9/1967 | Yerkey |
| 3,358,418 A | 12/1967 | Manetta |
| 3,383,754 A | 5/1968 | Klenz |
| 3,389,533 A | 6/1968 | Tipper et al. |
| 3,400,433 A | 9/1968 | Klenz |
| 3,499,259 A | 3/1970 | Tipper et al. |
| 3,543,378 A | 12/1970 | Klenz |
| 3,587,204 A | 6/1971 | George ............ 53/138.4 |

(Continued)

FOREIGN PATENT DOCUMENTS

DE 2452760 5/1976

(Continued)

OTHER PUBLICATIONS

Product Brochure, 6 sheets, "Tipper Net For Smoking, Hanging & Decoration, Net-All® Netting Is The Answer," © 2000.

(Continued)

*Primary Examiner*—Stephen F. Gerrity
(74) *Attorney, Agent, or Firm*—Myers Bigel Sibley & Sajovec PA

(57) ABSTRACT

Methods, devices and computer program products automatically package an object in a covering material such as casing and/or netting by: (a) automatically pushing at least one object through a product chute; (b) pulling a covering material upstream of the product chute off an exterior surface of the product chute to automatically enclose the object in the covering material as the object exits the product chute; and (c) applying a clip to the covering material to secure the object in the packing material.

13 Claims, 37 Drawing Sheets

U.S. PATENT DOCUMENTS

| | | | |
|---|---|---|---|
| 3,662,514 A | 5/1972 | Goss | |
| 3,719,022 A | 3/1973 | Cherio | |
| 3,732,662 A | 5/1973 | Paxton | 53/415 |
| 3,797,199 A | 3/1974 | Seifert | |
| 3,815,323 A | 6/1974 | Longo | 53/530 |
| 3,945,171 A | 3/1976 | Marietta et al. | |
| D243,158 S | 1/1977 | Bolwell | D15/145 |
| 4,044,450 A | 8/1977 | Raudys et al. | |
| 4,091,595 A | 5/1978 | Peister et al. | 53/417 |
| 4,165,593 A | 8/1979 | Niedecker | |
| RE30,390 E * | 9/1980 | Kupcikevicius et al. | 452/37 |
| 4,247,005 A * | 1/1981 | Buxton | 53/417 |
| 4,430,772 A | 2/1984 | Michel et al. | |
| 4,505,003 A | 3/1985 | Becker et al. | |
| 4,516,387 A * | 5/1985 | Kupcikevicius | 452/40 |
| 4,525,898 A | 7/1985 | Gallion et al. | 24/30.5 W |
| 4,537,006 A | 8/1985 | Pieri | 53/134 |
| 4,590,748 A | 5/1986 | Harrison et al. | 53/576 |
| 4,651,498 A | 3/1987 | Piereder | 53/122 |
| 4,675,945 A | 6/1987 | Evans et al. | 452/48 |
| 4,683,700 A | 8/1987 | Evans et al. | |
| 4,766,713 A | 8/1988 | Evans | |
| 4,847,953 A | 7/1989 | Evans et al. | 452/36 |
| 4,944,172 A | 7/1990 | Evans | 72/53 |
| 4,969,233 A | 11/1990 | Stanley | |
| 5,016,424 A | 5/1991 | Stirling | |
| 5,017,175 A | 5/1991 | Klusmire | |
| 5,024,041 A | 6/1991 | Urban et al. | 53/449 |
| 5,042,234 A | 8/1991 | Evans et al. | 53/523 |
| 5,044,144 A | 9/1991 | Foote et al. | 29/803 |
| 5,067,313 A | 11/1991 | Evans | 53/576 |
| 5,074,386 A | 12/1991 | Evans | 188/67 |
| 5,085,036 A | 2/1992 | Evans et al. | 53/550 |
| 5,107,666 A | 4/1992 | Rahtican | |
| 5,109,648 A | 5/1992 | Evans | |
| 5,135,770 A | 8/1992 | Underwood | 426/271 |
| 5,161,347 A | 11/1992 | May et al. | |
| 5,165,216 A | 11/1992 | May et al. | |
| 5,167,567 A | 12/1992 | Evans | 452/37 |
| 5,181,302 A | 1/1993 | Evans | 29/243.56 |
| 5,203,760 A | 4/1993 | Chen et al. | 493/302 |
| D340,467 S | 10/1993 | Pollak et al. | D15/150 |
| 5,402,625 A | 4/1995 | Halstead | |
| 5,421,142 A | 6/1995 | Cullen | |
| 5,426,910 A | 6/1995 | Cullen | 53/576 |
| 5,476,673 A | 12/1995 | Sombrio | |
| 5,495,701 A | 3/1996 | Poteat et al. | |
| 5,570,561 A | 11/1996 | May et al. | |
| 5,586,424 A | 12/1996 | Chen et al. | |
| 5,715,656 A | 2/1998 | Pearce | |
| 5,755,022 A * | 5/1998 | Whittlesey | 53/138.4 |
| 5,884,346 A | 3/1999 | Hengl | |
| 6,052,972 A | 4/2000 | Rea et al. | |
| 6,131,367 A | 10/2000 | Fukuda et al. | |
| 6,401,885 B1 | 6/2002 | Whittlesey | 188/322.16 |
| 6,604,338 B1 | 8/2003 | May et al. | 53/138.2 |
| 6,637,075 B1 | 10/2003 | Gorman et al. | 24/30.5 W |
| 6,694,711 B1 | 2/2004 | Cullen | |
| 6,695,364 B2 | 2/2004 | Bierlin | 292/307 |
| 6,719,194 B2 | 4/2004 | Richards | |
| 6,729,102 B2 | 5/2004 | Ailey et al. | |
| 6,745,547 B2 | 6/2004 | Bussey et al. | 53/576 |
| 6,883,297 B2 | 4/2005 | Kirk et al. | 53/502 |
| 6,932,688 B2 * | 8/2005 | Stanley et al. | 452/48 |
| 6,945,171 B1 | 9/2005 | Coull | |
| 6,976,346 B2 | 12/2005 | May et al. | |
| 6,708,742 B2 | 3/2006 | Weathers et al. | |
| 2003/0131564 A1 | 7/2003 | Ailey et al. | |
| 2004/0250512 A1 | 12/2004 | May et al. | |
| 2005/0053699 A1 | 3/2005 | Whittlesey | |
| 2005/0060957 A1 | 3/2005 | Griggs et al. | |
| 2005/0072119 A1 | 4/2005 | Griggs et al. | |
| 2005/0087075 A1 | 4/2005 | Mysker | |
| 2005/0101240 A1 | 5/2005 | Mysker | |
| 2005/0229541 A1 | 10/2005 | Griggs | |
| 2005/0235608 A1 | 10/2005 | Griggs et al. | |
| 2005/0247026 A1 | 11/2005 | Griggs | |
| 2005/0274088 A1 | 12/2005 | Griggs | |
| 2005/0284108 A1 | 12/2005 | Griggs | |

FOREIGN PATENT DOCUMENTS

| | | |
|---|---|---|
| EP | 0 301 768 | 2/1989 |
| GB | 1491444 | 11/1977 |
| GB | 1564397 | 4/1980 |
| JP | 2002-019735 | 1/2002 |
| WO | WO 2000/020282 | 4/2000 |
| WO | WO 2004/007298 A2 | 1/2004 |
| WO | WO 2004/007298 A3 | 1/2004 |
| WO | WO 2005/044020 | 5/2005 |

OTHER PUBLICATIONS

Product Brochure, 1 sheet, "Tipper Clipper®-Signature Series SZ3214 Double Clipper for Netting," © 2002.
Product Brochure, 2 sheets, "Tipper Net Z3200 Double Clipper and Plant Netting System," © 2000.
Product Brochure, 1 sheet, "Tipper Tie-Net, Safely and quickly package plugs before shipping," © 1999.
U.S. Appl. No. 10/951,578, Griggs et al. U.S. patent application filed Sep. 28, 2004.
U.S. Appl. No. 11/256,809, filed Oct. 24, 2005, Gupton.
U.S. Appl. No. 11/262,600, filed Oct. 31, 2005, Wince.
U.S. Appl. No. 60/579,709, Poteat et al.
Brochure *TCM 2250 Pumpable for muscle pieces*, 2 sheets, 1994©.
International Search Report and Invitation to Pay Additional Fees for PCT application No. PCT/US2005/020019 dated Oct. 28, 2005.
International Search Report and Written Opinion of the International Searching Authority for PCT application PCT/US2005/020006 dated Oct. 25, 2005.
International Search Report and Written Opinion of the International Searching Authority for International Patent Application No. PCT/US2005/017252 mailed on Sep. 7, 2005.
Product Brochure, 1 sheet, "Tipper Netter TN-3000 Automatic Netting-Packaging Machine," © 2002.
Product Brochure, 2 sheets, "Net-All Sleeved Plastic Netting System," © 2000.
Product Brochure, 4 sheets, "Net-All ® Netting Is The answer To All Your Horticultural Applications," © 2001.
Rigidized Metals Corporation, Corporate Profile, 1 page, <http://www.rigidized.com> accessed on Sep. 23, 2005, but for the purposes of examination, the reference is deemed to be before the priority filing date of the instant application.
www.mcmaster.com, Compressed Air Flow Control Valves, 1 sheet, Date unknown but believed to be before Oct. 2004.
www.tippertie.com/smoked/tcm2250.asp, 2 sheets, date believed to be before Nov. 1, 2004.

* cited by examiner

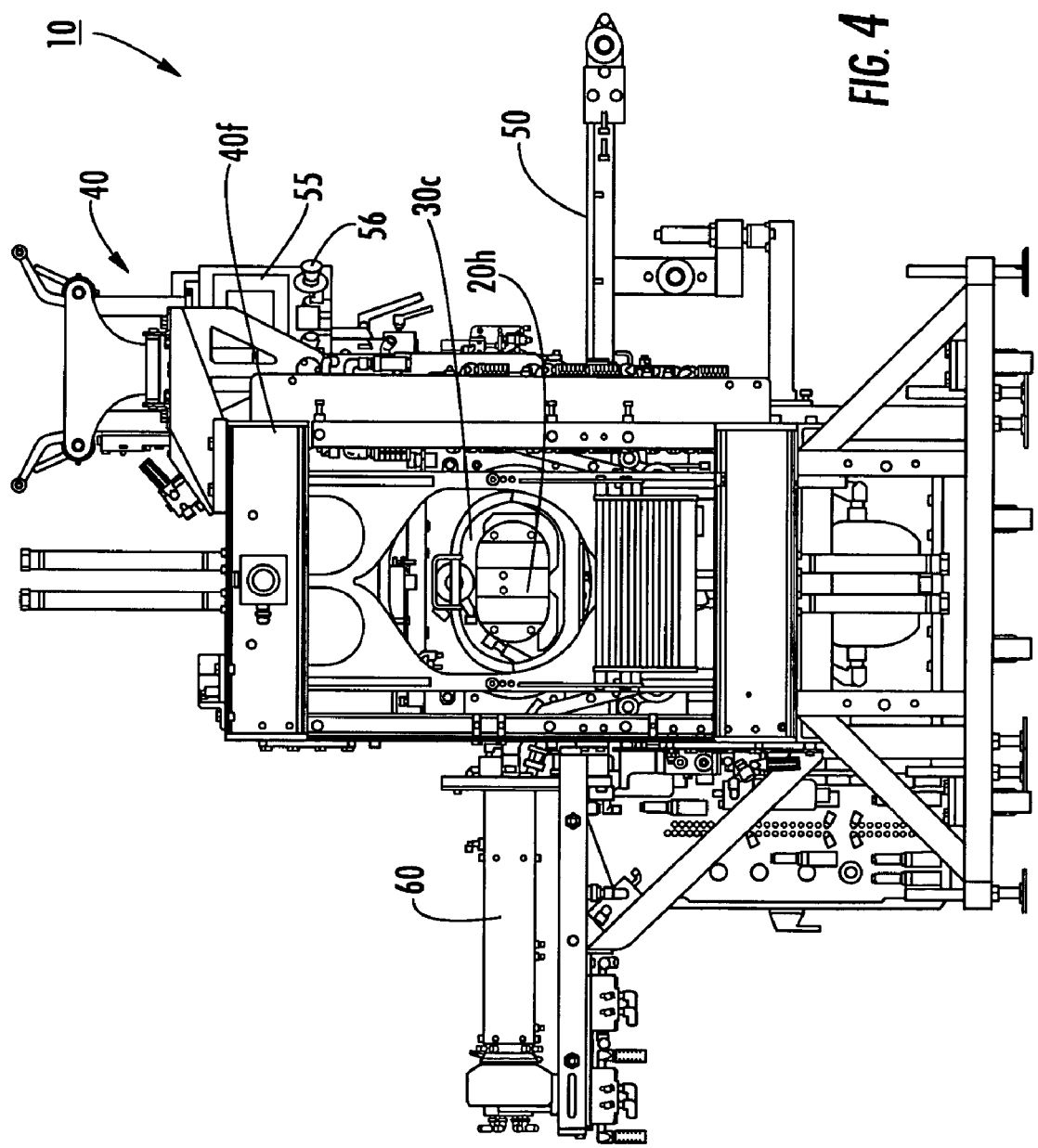

AUTOMATED CLIPPING PACKAGING SYSTEMS

RELATED APPLICATIONS

This application claims priority to U.S. Provisional Patent Application Ser. No. 60/508,609 filed Oct. 3, 2003 and U.S. Provisional Patent Application Ser. No. 60/579,846 filed Jun. 15, 2004, the contents of each is hereby incorporated by reference as if recited in full herein.

FIELD OF THE INVENTION

The present invention relates to apparatus that can package and apply closure clips to materials that enclose products therein, and may be particularly suitable for clipping netting material.

BACKGROUND OF THE INVENTION

Certain types of commodity and/or industrial items can be packaged by placing the desired product(s) in a covering material and then applying a closure clip or clips to end portions of the covering material to secure the product(s) therein. For non-flowable piece goods, the piece goods can be held individually in a respective clipped package, or as a group of goods in a single package. The covering material can be any suitable material, typically a casing and/or netting material.

Generally described, when packaging a piece good product in netting, the product is manually pushed through a netting chute. The product can include, by way of example, a non-flowable semi-solid and/or solid object such as a meat product including whole or half hams, turkey, chicken, and the like. The netting chute holds a length of a netting sleeve over the exterior thereof. A first downstream end portion of the netting is typically closed using a first clip. As the product exits the netting chute, it is covered with the netting. An operator can then orient the product inside the netting between the discharge end of the chute and the clipped first end portion of the netting. The operator can then pull the netting so that the netting is held relatively tight (typically stretched or in tension) over the product. The operator then uses his/her hands to compress or gather the open end of the netting (upstream of the product) and manually applies a clip to the netting, typically using a Tipper Tie® double clipper apparatus. A clip attachment apparatus or "clippers" are well known to those of skill in the art and include those available from Tipper Tie, Inc., of Apex, NC., including product numbers Z3214, Z3202, and Z3200. Examples of clip attachment apparatus and/or packaging apparatus are described in U.S. Pat. Nos. 3,389,533; 3,499,259; 4,683,700; and 5,161,347, the contents of which are hereby incorporated by reference as if recited in full herein.

The double clipper concurrently applies two clips to the netting proximate the open (upstream) end of the package. One clip defines the first end portion of the next package and the other defines the trailing or second end portion of the package then being closed. A cutting mechanism incorporated in the clipper apparatus can sever the two packages before the enclosed package is removed from the clipper apparatus. U.S. Pat. No. 4,766,713 describes a double clipper apparatus used to apply two clips to a casing covering. U.S. Pat. No. 5,495,701 proposes a clipper with a clip attachment mechanism configured to selectively fasten a single clip or two clips simultaneously. The mechanism has two punches, one of which is driven directly by a pneumatic cylinder and the other of which is connected to the first punch using a pin and key assembly. The pin and key assembly allows the punches to be coupled or decoupled to the pneumatic cylinder drive to apply one single clip or two clips simultaneously. U.S. Pat. No. 5,586,424 proposes an apparatus for movement of U-shaped clips along a rail. The apparatus includes a clip feed for advancing clips on a guide rail and the arm is reciprocally driven by a piston and cylinder arrangement. The contents of each of these patents are hereby incorporated by reference as if recited in full herein.

Other devices provide for semi-automated or automated clipping as described in U.S. patent application Ser. No. 10/339,910 and co-assigned, co-pending U.S. Provisional Patent Application Ser. No. 60/508,659, the contents of which are hereby incorporated by reference as if recited in full herein. U.S. patent application Ser. No. 10/339,910 describes a device with a chute that is configured to package a product, such as a vacuum-packed turkey, and can also form a handle in a tubular covering encasing the product.

SUMMARY OF EMBODIMENTS OF THE INVENTION

Embodiments of the present invention provide apparatus, subassemblies and/or other devices, systems, methods and computer program products for packaging a product in a covering material and/or applying clips thereto.

In certain embodiments, the product can be manipulated and packaged so that at least one clip is automatically applied to enclose the product in the covering material. Particular embodiments automatically package a discrete object or objects in netting.

Certain embodiments are directed to systems for enclosing at least one product in a covering material. The systems include: (a) an elongate product chute having an outer surface and opposing receiving and discharge end portions with an interior cavity extending therethrough; (b) a product pusher mechanism that is configured to controllably automatically advance into and retract from the product chute to thereby advance a product through the product chute and out of the discharge end portion of the product chute; (c) a clipper mechanism disposed downstream of the product chute in cooperating alignment therewith, the clipper mechanism configured to apply at least one clip to a covering material that encloses the product after the product exits the product chute; and (d) a cutting member disposed downstream of the product chute, the cutting member configured to cooperate with the clipper mechanism to, in operation, automatically travel generally upwardly to sever adjacent portions of covering material from an underside to top side thereof.

In some embodiments the system can include a handle maker in communication with the covering material and disposed downstream of the product chute proximate the clipper mechanism. In certain embodiments, the clipper mechanism travels from the first position to the second position while the handle maker is forming a handle to thereby reduce clip cycle time.

In some embodiments, the system includes a modular mounting frame, wherein the handle maker and the clipper mechanism are configured to be selectively mounted to either a right or left hand side of the modular mounting frame and align to a desired operating position (independent of which side the mechanism or handle maker are mounted on). The clipper mechanism and handle maker are typically configured to reside on opposing sides of the mounting frame.

In other embodiments, methods of cutting or severing adjacent portions of a covering material having two longitudinally spaced apart sealed portions held in tension, include: (a) automatically raising a knife from a position below two longitudinally spaced apart sealed portions of covering material; and (b) severing the covering material between the two longitudinally sealed portions in a bottom to top order, responsive to raising the knife.

The covering material can comprise netting. In particular embodiments, the method also includes: applying two longitudinally spaced apart clips to netting material to form the spaced apart sealed portions, one clip defining a trailing edge portion of a packaged product wrapped in the netting and the other clip defining a leading edge portion of another package; and automatically moving the knife to a home position after the severing step. The severing and moving steps can release the packaged product to allow the packaged product to travel downstream past the knife.

In some embodiments, the applying step includes automatically pivoting a clipper mechanism into an operative position, the method further comprising automatically gathering the netting material prior to the applying step, wherein the knife is attached to the clipper mechanism and pivots with the clipper mechanism to reside below the netting prior to the severing step.

Still other embodiments are directed to methods of shaping a food product. The methods include: (a) automatically pushing at least one object through a product chute using an actuator driven pusher mechanism, the product chute sized and, configured to compress a food product as the food product moves through the product chute with sufficient force to cause the food product to have a desired shape as the food product exits the product chute; (b) pulling netting material off an exterior surface of the product chute to automatically enclose the object in the netting material as the object exits the product chute; and then (c) applying at least one clip to the netting material to secure the object in the netting material.

The pushing can include automatically extending a pusher head into the product chute to contact the object and force the object through the product chute and then retracting the pusher head from the product chute. The applying a clip may include automatically gathering the covering material together and applying at least one clip to the gathered covering material. In particular embodiments, the applying step can include applying two proximately positioned but longitudinally spaced apart clips substantially concurrently to the gathered covering material.

In some embodiments, the gathered covering material is netting that wraps about a bone-in, semi, half or whole ham.

Other embodiments are directed to clipper assemblies. The assemblies include: (a) a clipper mechanism having a clipper body configured to deliver clips to a clip window and attach the clips to a gathered portion of casing material, the clipper mechanism having an automated stroke cycle that includes a retracted home position and a laterally extended full-clip position; and (b) a cutting member attached to a lower portion of the clipper mechanism, wherein the cutting member travels with the clipper mechanism during the automated stroke cycle, and wherein, in operation, the cutting member is configured to travel generally upwardly to sever a gathered casing material from a bottom to top portion thereof.

The cutting member may be automatically actuated to rise to sever the gathered casing material after (but proximate in time to when) at least one clip is applied to the gathered casing material. The automated stroke cycle full clip position can be such that the clip window is generally aligned with an axial centerline of a product travel path (typically defined by the axial centerline of a product chute upstream of the cutting member).

In particular embodiments, the clipper assemblies may also include a proximity sensor mounted to the cartridge to provide data to control the timing of the actuation of the cylinder to automatically controllably advance the cutting member (that may be configured as a generally planar knife blade) to sever the netting. The clipper can include spaced apart gathering plates with a first gathering plate disposed downstream of a second gathering plate. The first gathering plate can include a cutting member guide channel that is sized and configured to slidably receive the cutting member therein.

Some embodiments are directed to automatic pivotable clipper mechanisms for attaching closure clips to product held in a covering material. The mechanisms include: (a) a clipper body; (b) a curvilinear clip rail attached to the clipper body having opposing top and bottom end portions and defining a generally downwardly extending clip feed direction; (c) a clip entry window in communication with the bottom end portion of the clip rail and a clip closure delivery path in communication with a punch mechanism that is adapted to wrap a clip from the clip rail about a target work piece; (d) a first clip pusher configured to selectively engage with clips held on the clip rail to force the clips in the feed direction; (e) a first clipper gathering plate attached to the clipper body on a first side of the clip entry window, the first clipper gathering plate configured to extend a distance below the clip rail and generally outwardly therefrom toward a target covering material; (f) a second clipper gathering plate attached to the clipper body on an opposing side of the clip entry window downstream of the first clipper gathering plate so as to be spaced apart from the first clipper gathering plate, the second clipper gathering plate configured to extend a distance below the clip rail and generally outwardly therefrom toward the target covering material; and (g) a cutting member attached to a lower portion of the clipper body. In operation, the cutting member cuts from bottom to top and the clipper mechanism pivots from a rest position to an active clipping position and the first and second clipper gathering plates and cutting member move generally in concert with the clipper mechanism.

Still other embodiments are directed to product pusher assemblies for pushing product through a product chute that dispenses covering material from an outer surface thereof. The assemblies include: a pusher head having a forward portion with a pin extending outwardly therefrom, the pusher head configured and sized to enter into the product chute and push an object undergoing packaging through the product chute; and a pusher actuation cylinder attached to the pusher head assembly to direct the pusher head assembly to automatically and controllably repetitively travel back and forth between a downstream position and an upstream position.

Yet other embodiments are directed to computer program products for operating a clipper mechanism. The computer program product includes a computer readable storage medium having computer readable program code embodied in the medium. The computer-readable program code including computer readable program code that controllably actuates a knife actuation cylinder to direct the knife to rise up to cut from a bottom to top direction and then retracts the knife.

The computer program product can also include computer readable program code that automatically controllably actuates an automated handle maker to generate a handle from netting and/or computer readable program code that allows a user to select left hand or right hand operation of either the clipping mechanism and/or the handle maker (where operational sequence or direction is different based on the mounting configuration).

In other embodiments the same program control sequence can be used to operate the right or left handed operation of either or both of the handle maker and/or clipping mechanism.

These and other objects and/or aspects of the present invention are explained in detail in the specification set forth below.

BRIEF DESCRIPTION OF THE DRAWINGS

FIG. 4 is a left-hand "downstream-end" view of the device shown in FIG. 1, illustrated with the housing guards removed according to embodiments of the present invention.

DESCRIPTION OF EMBODIMENTS OF THE INVENTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain terms are employed to refer to the positional relationship of certain structures relative to other structures. As used herein, the terms "front," "forward" and derivatives thereof refer to the general or primary direction that a target product travels for enclosure and/or clipping; this term is intended to be synonymous with the term "downstream," which is often used in manufacturing or material flow environments to indicate that certain material traveling or being acted upon is farther along in that process than other material. Conversely, the terms "rearward," "upstream" and derivatives thereof refer to the directions opposite, respectively, the forward and downstream directions.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "frame" means a generally skeletal structure used to support one or more assemblies, modules and/or components. The term "modular" means that a subassembly is designed with standardized dimensions, mounting features and/or configurations for interchangeable use with replacement modules of the same or similar type and/or other selected different modules. The frame and selected modules may also be configured for selectable mounting on a right or left hand side of a common frame.

Figure 7:
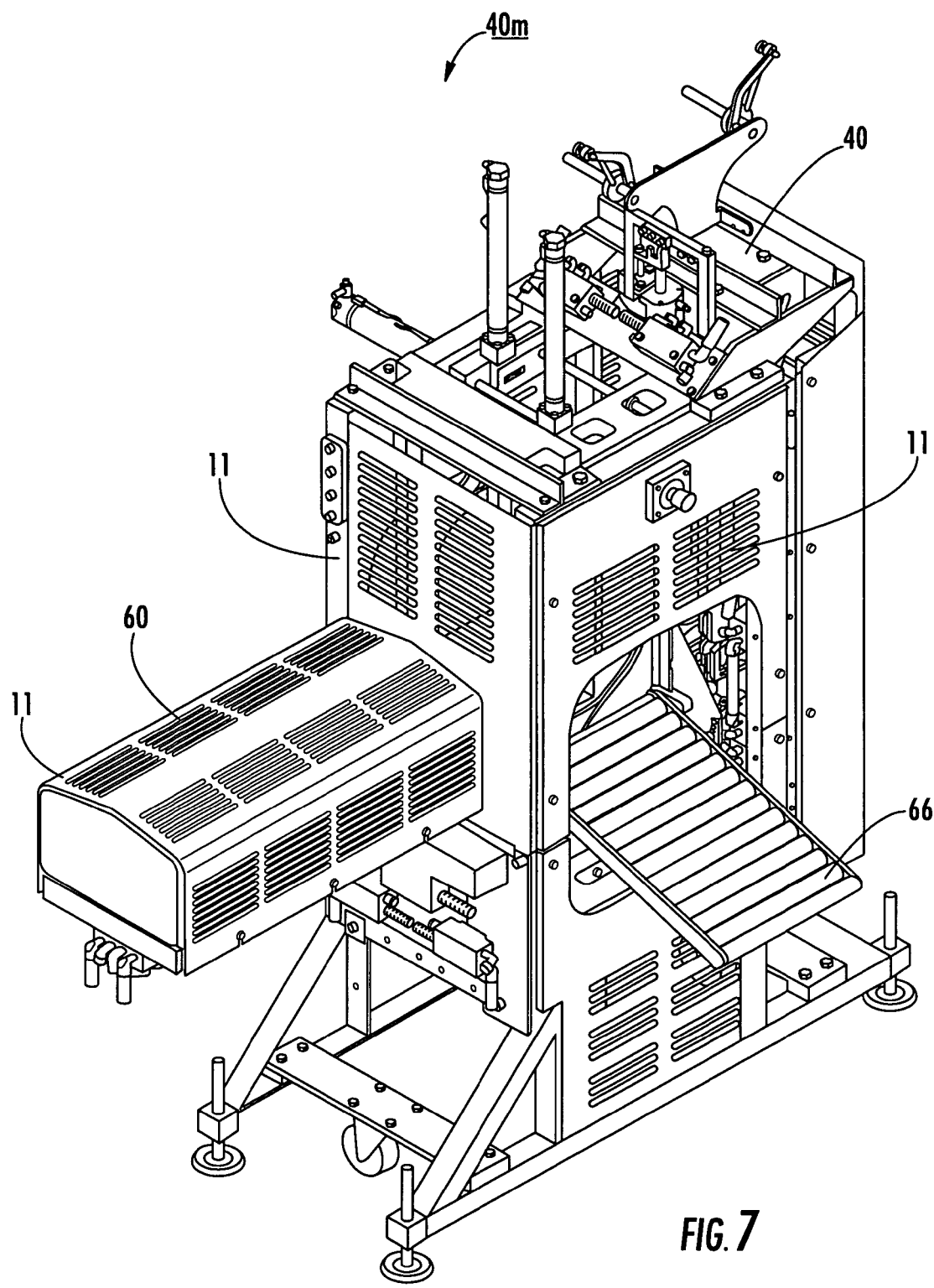
FIG. 7 is a perspective view of a clipper voider handle maker ("CVH") module that can form a part of the apparatus shown in FIG. 1 according to embodiments of the present invention.
Figure 8:
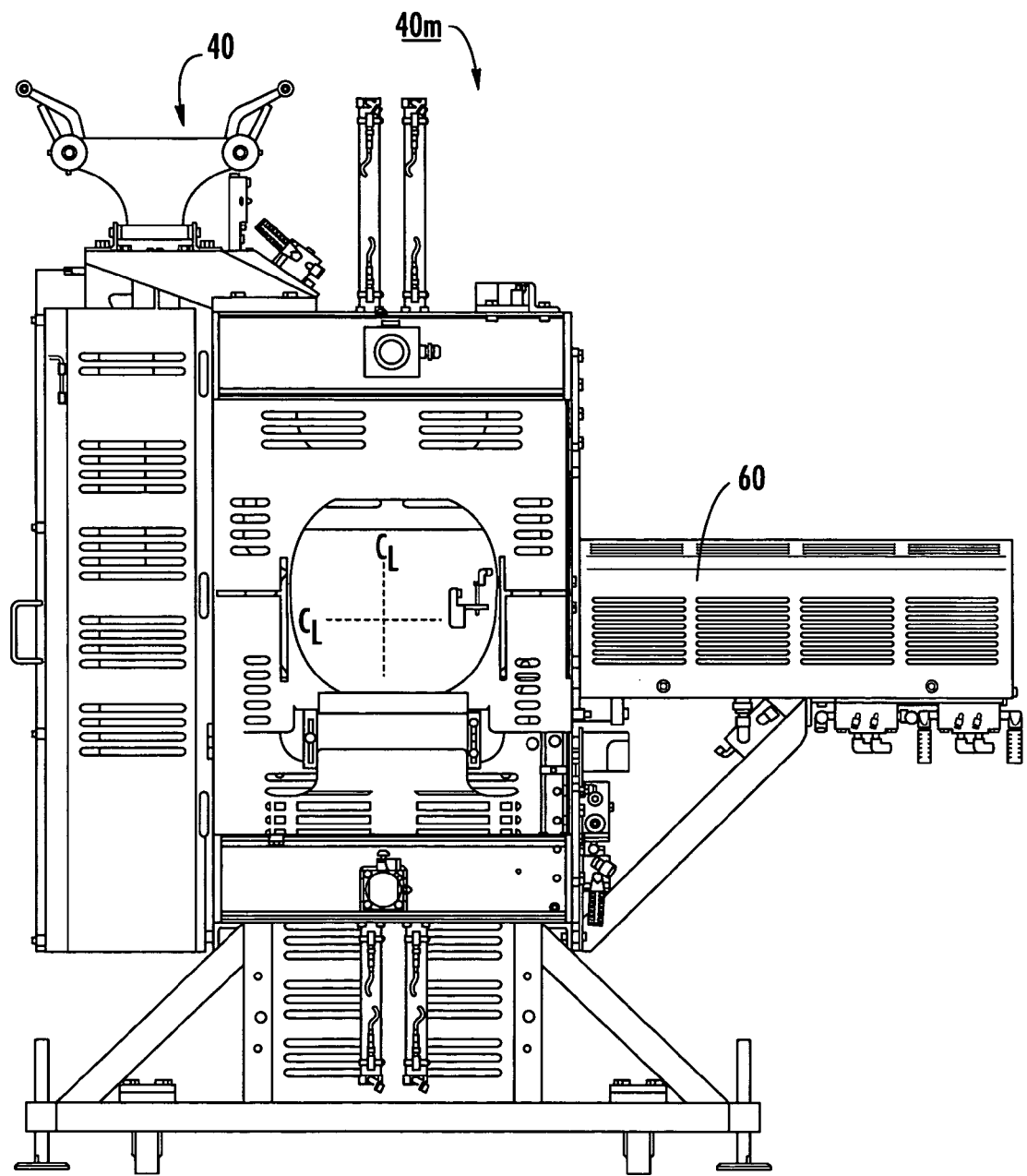
FIG. 8 is a side view of the CVH module shown in FIG. 7.
Figure 9:
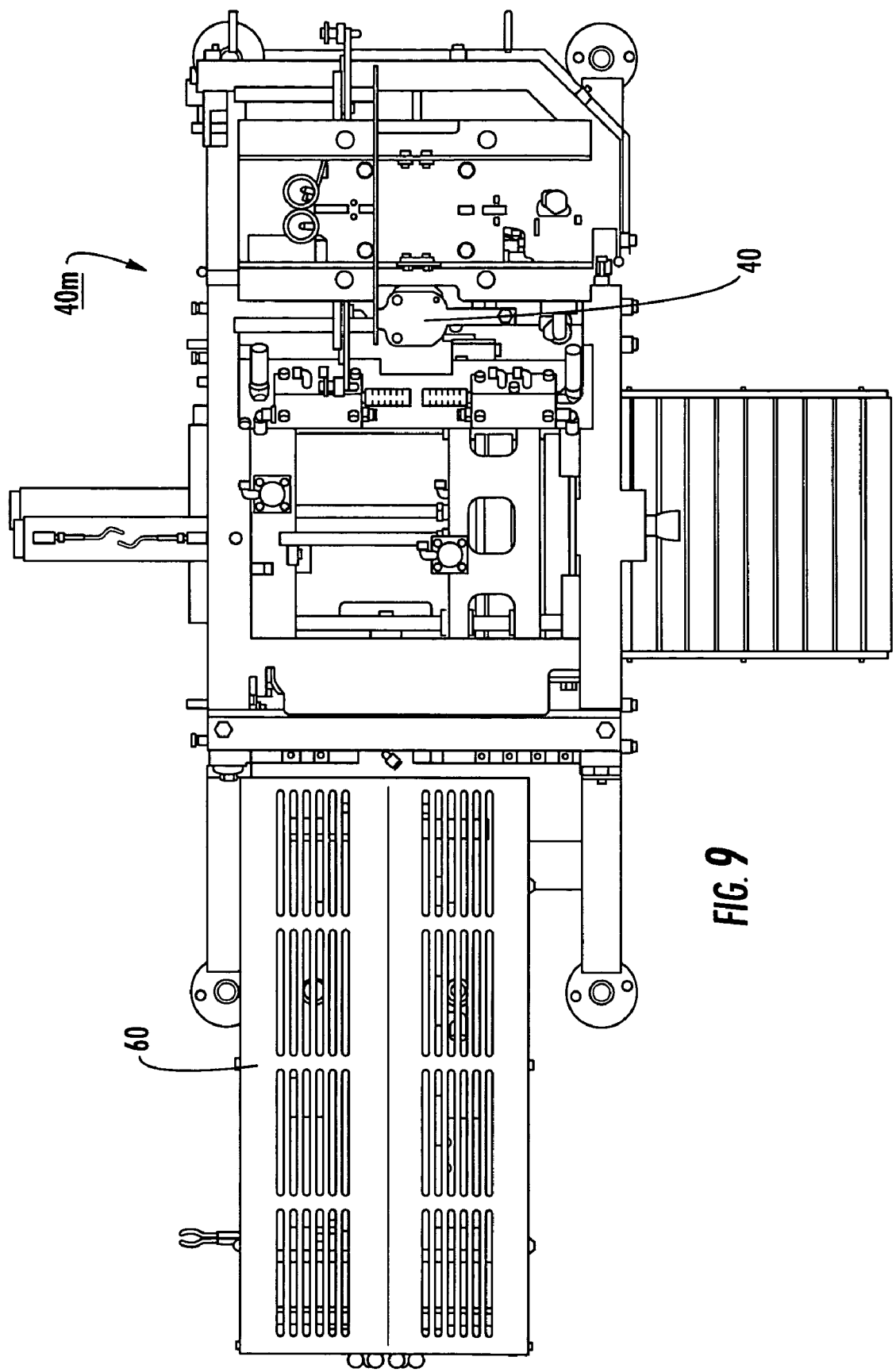
FIG. 9 is a top view of the CVH module shown in FIG. 7.
Figure 12A:
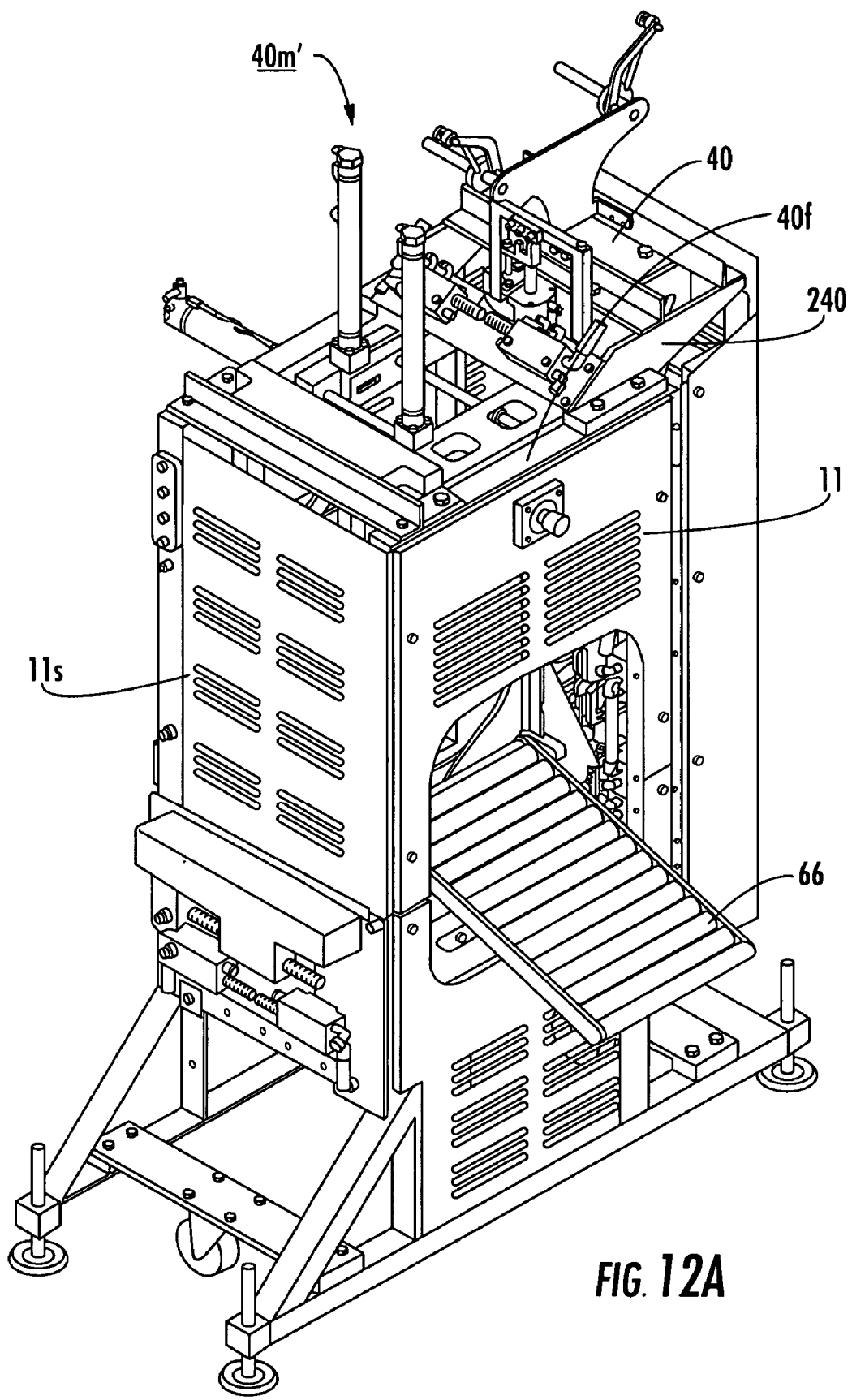
FIG. 12A is a perspective view of a clipper module, shown without an optional handle maker, according to other embodiments of the present invention.

Embodiments of the present invention provide modules 40m configured with a frame 40f (FIG. 10A) that allows a clipper 40 to mount to either the right or left hand side (40R, 40L respectively) of the frame 40f and/or to allow the selective assembly of a handle maker 60 (as shown by the module 40m of FIG. 7) or not (shown by the module 40m' of FIG. 12A). The right and left hand sides 40R, 40L of the frame 40f are defined with respect to the location of the product primary travel path, so that the right hand side 40R of the frame 40f extends from a generally medial position above and/or below the product travel path and rightward therefrom, while the left hand side 40L of the frame 40f extends from a generally medial position above and/or below the product travel path and leftward therefrom. Thus, it will be understood that the right side 40R of the frame 40f is not limited to the rightmost portion of the frame structure and the left side 40L of the frame 40f is not limited to the leftmost portion of the frame structure.

Figure 1:
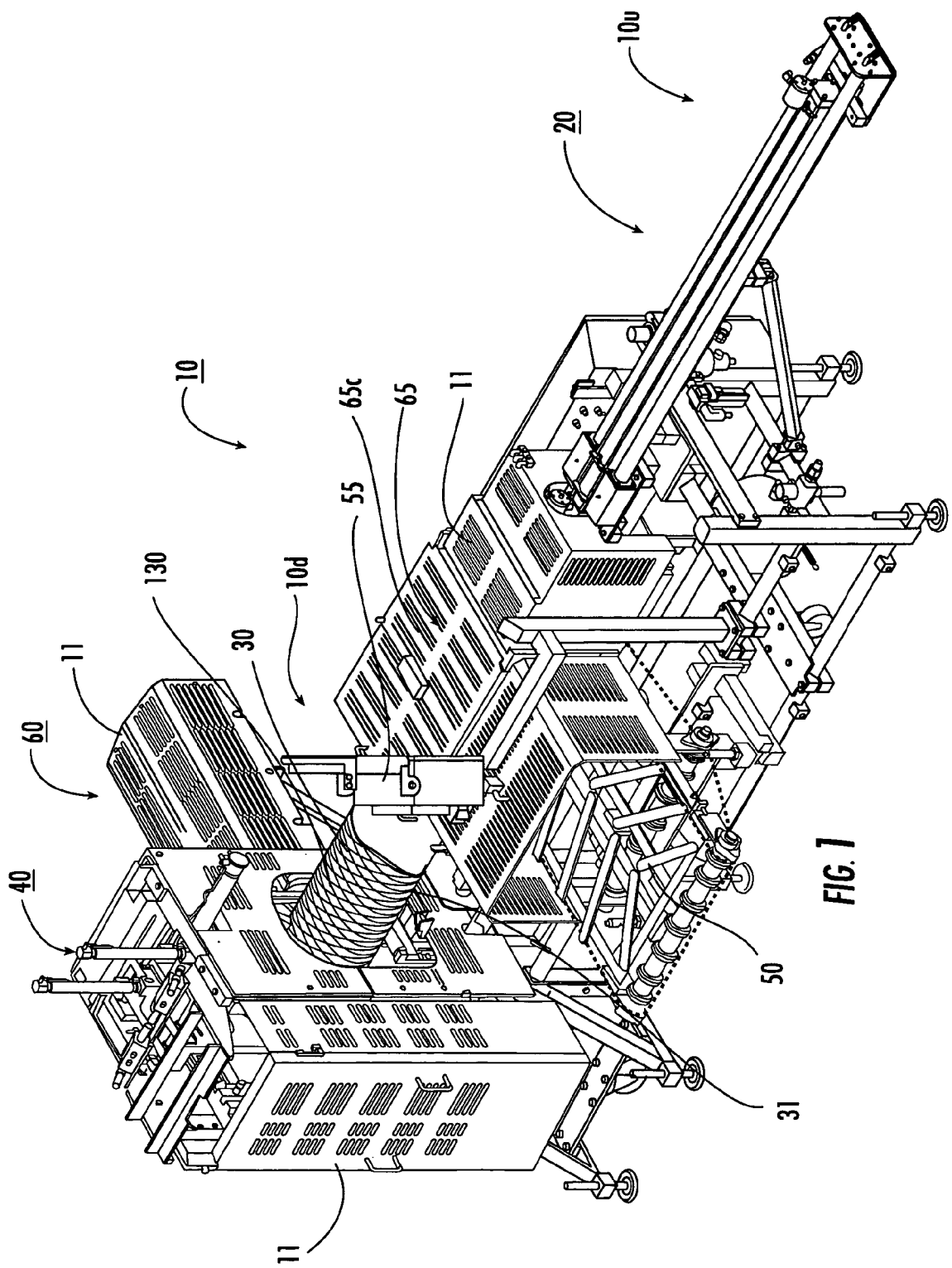
FIG. 1 is a perspective view of an apparatus/system used to automatically advance objects through a product chute and then automatically apply at least one clip according to embodiments of the present invention.

It is also noted that different mounting orientation configurations of the modules and/or apparatus are shown in the figures. For example, FIG. 1 illustrates the clipper 40 mounted on one side of the frame 40f, but other views may have the clipper 40 on the other side of the frame 40f and/or in the front or back of the module 40, 40m. Thus, the figures may show certain of the devices in different views with different mounting configurations and the views in different figures do not necessarily correspond to a common or single mounting arrangement as different views may have certain components and/or devices oriented differently.

The present invention is particularly suitable for applying closure clips to discrete objects held in a covering material. The covering material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. In certain embodiments, the casing comprises netting. The term "netting" refers to any open mesh material in any form including, for example, knotted, braided, extruded, stamped, knitted, woven or otherwise. Typically, the netting is configured so as to be stretchable in both axial and lateral directions.

Netting or other covering material may be used to package discrete meat products such as loaves of meat, boned ham, spiral sliced ham, deboned ham, turkey, turkey loaves held in molds, or other meat or items directly or with the items held in subcontainers and/or wraps such as molds, trays, boxes, bags, absorbent or protective sheets, sealant, cans and the like. Other embodiments of the present invention may be directed to package other types of food such as cheese, bread, fruit, vegetables, and the like, as well as non-food items. Examples of non-food items that may be packaged using embodiments of the present invention include living items such as flora, trees, and the like, as well as inanimate objects. Additional examples of products include discrete, semi-solid or solid objects such as firewood, pet food (typically held in a container if the wet type), recreational objects (such as balls), or other solid or semi-solid objects. The product may be packaged for any suitable industry including horticulture, aquaculture, agriculture, or other food industry, environmental, chemical, explosive, or other application. Netting may be particularly useful to package ham or turkeys, manufactured hardware such as automotive parts, firewood, explosives, molded products, and other industrial, consumable, and/or commodity item(s).

Generally stated, embodiments of the present invention are directed at automating the packaging of piece goods or discrete items by forcing them through a product chute and wrapping or enveloping the objects at the other end of the chute in a covering material, such as netting, then automatically or semi-automatically clipping the covering material with a closure clip or other attachment means to close the covering and hold the object or objects inside of the covering material. As noted above, clippers are available from Tipper Tie, Inc., of Apex, N.C. Examples of suitable clips include metallic generally "U"-shaped clips available from Tipper Tie, Inc., in Apex, N.C. Other clips, clip materials and clip configurations or closure means may also be used.

Figure 2:
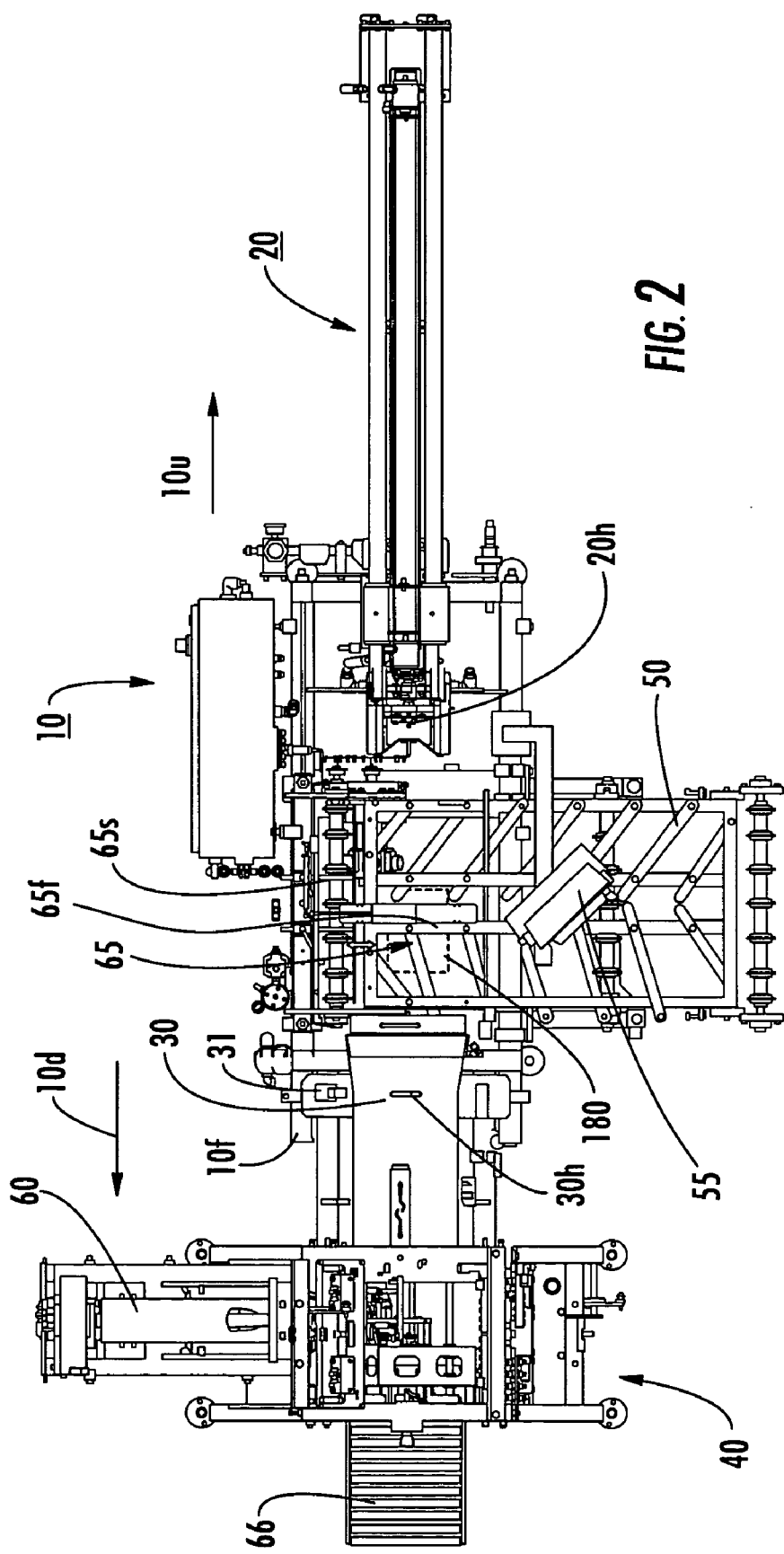
FIG. 2 is a top view of the apparatus shown in FIG. 1, illustrated with the housing guards removed according to embodiments of the present invention.
Figure 3:
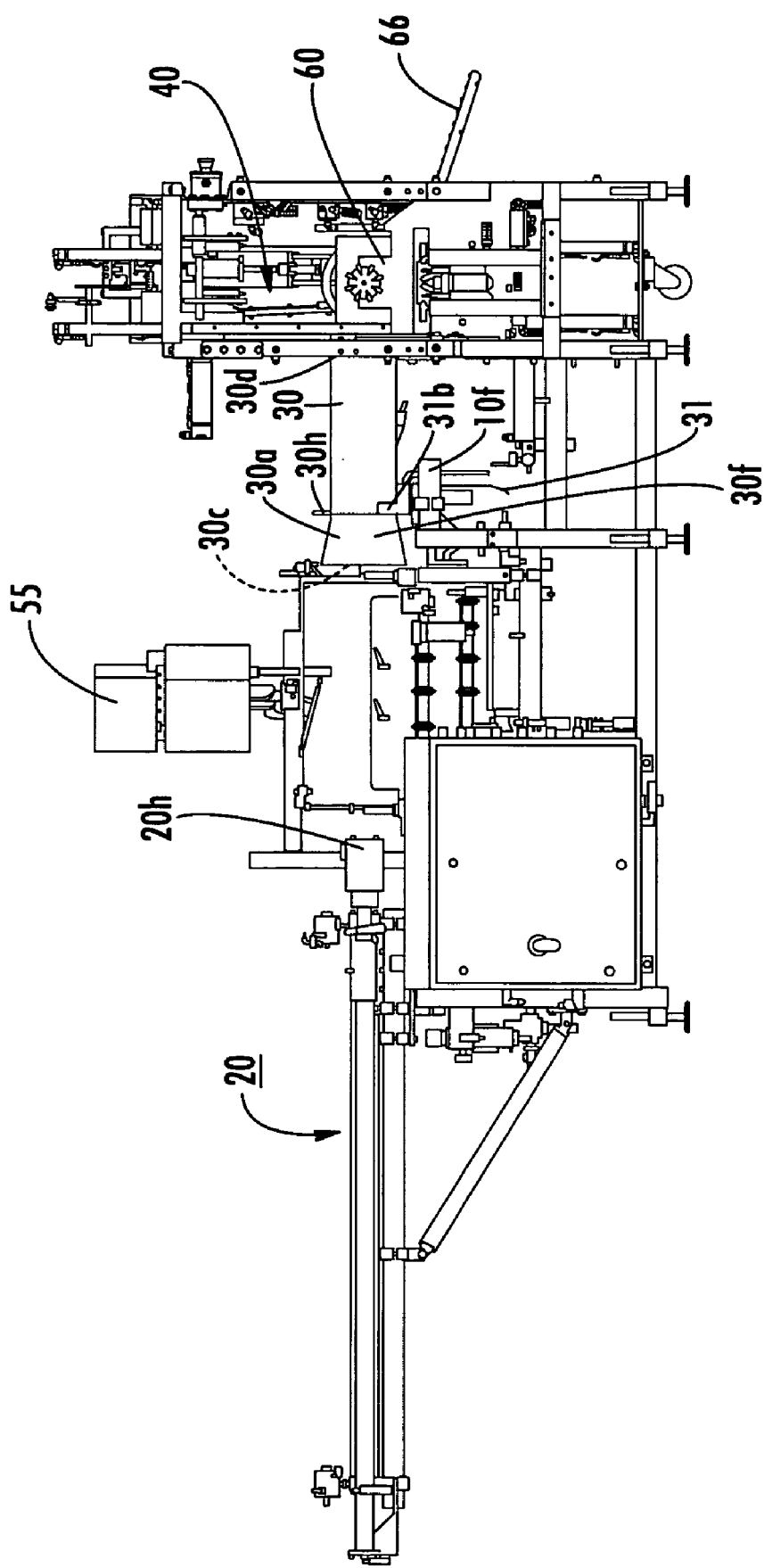
FIG. 3 is a back view of the apparatus shown in FIG. 1, illustrated with the housing guards removed according to embodiments of the present invention.

FIG. 1 illustrates an exemplary automatic clipping packaging apparatus 10 according to embodiments of the present invention. As shown, the apparatus 10 includes a product pusher assembly or mechanism 20, a product chute 30, and a clipper 40. It is noted that the clipper 40 may be referred to herein as a clipper apparatus, clipper module, clipper mechanism, and/or clipper assembly, but each term may be used interchangeably with the others. As shown, the apparatus 10 may optionally include an infeed conveyor 50. Optionally, the apparatus 10 may also include a handle maker 60. FIG. 1 illustrates the apparatus 10 with examples of housing guards 11 disposed over certain functional components. FIGS. 2–4 illustrate the apparatus 10 without the housing guards 11.

In the embodiment shown, the apparatus 10 can be described as a horizontal automatic clipping packaging apparatus as the product is primarily moved, processed, clipped and packaged in a horizontal plane. However, certain components, features or operations may be oriented and/or carried out in other planes or directions and the present invention is not limited thereto. For example, the product chute 30 and/or the conveyor 50 may be configured to incline. The arrow in FIG. 2 indicates the primary direction of product flow, toward the product chute 30 and clipper 40. In addition, although the downstream direction 10$d$ is shown as in a direction that extends from right to left (with the upstream direction 10$u$) in the opposing direction, the apparatus 10 can be oriented to run left to right or in a direction that is in or out of the paper.

FIGS. 1–4 also illustrate a human machine interface ("HMI") station 55 that houses operational switches or components that an operator can access to operate the apparatus 10. The apparatus 10 includes a product transfer zone 65, which is the location where a product (or products) is positioned, intermediate the product pusher assembly 20 (in the retracted position) and the product chute 30, and substantially aligned with the internal cavity 30$c$ (FIG. 4) of the product chute 30. This positioning of the product in the flow path and/or alignment with the product chute cavity 30$c$ can be carried out substantially automatically as will be discussed further below. However, a target product undergoing packaging can also be manually introduced or placed into the flow path and subsequently processed.

In operation, the product pusher assembly 20 linearly retracts and advances to push a product through the product chute 30 so that the product is positioned proximate the clipper 40, then retracts to a resting state upstream of the product transfer zone 65. As described above, a sleeve of covering material (designated at 31 in FIG. 1) can be positioned about the external surface of the product chute 30 and configured to be drawn downstream thereof so as to automatically encase the product as the product emerges from the discharge end 30$d$ of the product chute 30. A supplemental sleeve material holder may also be used if desired instead of placing the sleeve of casing material on the product chute. The supplemental sleeve holder can be configured to surround a downstream portion of the product chute 30. The sleeve of covering material may be sized to stretch to substantially conform to the external wall or surface of the product chute 30 or may be more loosely held thereon. The cavity 30$c$ of the product chute 30 may be sized to snugly contact or squeeze opposing portions of the product (side to side and/or top to bottom) as the product is pushed therethrough or may be oversized with respect to the product so that the product loosely travels therethrough. For example, as shown in FIGS. 2, 3 and 4, the pusher head 20$h$ is undersized relative to the chute cavity 30$c$ so that the product chute 30 and pusher head 20$h$ are configured to engage in an unsealed configuration. That is, in some embodiments, the product chute 30 is unsealed and open to environmental conditions at both egress 30$d$ and ingress axially opposing ends thereof.

In operation, the sleeve of covering material may be clipped, welded, fused, knotted or otherwise closed and sealed at a leading edge portion thereof. When the product exits the product chute 30, it is held in the covering material as the covering material is drawn downstream. The covering material may be loaded onto the product chute 30 and the leading edge portion thereof closed before the product chute 30 is mounted to the apparatus 10.

Referring to FIGS. 2 and 3, the product pusher mechanism or assembly 20 has a pusher head 20$h$ that contacts the product and pushes the product downstream through the product chute 30. After the product exits the product chute 30, the downstream portion or leading edge of the product in the covering material can be held in position proximate the clipper 40. In certain embodiments, the product can be held by a retractable product holding member disposed downstream of the clipper 40 to inhibit the product from migrating downstream, thereby holding the product in the covering material between the product holding member and the discharge end of the product chute 30 during the clipping operation. As shown in FIG. 3, the apparatus 10 can include a discharge tray 66 that receives the clipped and packaged product after clipping. In the embodiment shown in FIG. 2, the tray 66 comprises a floor of rollers. Other discharge tray configurations may also be used.

FIGS. 2 and 3 illustrate that the discharge end portion of the product chute 30 can be positioned proximate and upstream of the clipper 40. The product pusher assembly 20 has a pusher head 20$h$ that is adapted to contact the product. As shown, in FIG. 4, the pusher head 20$h$ may be configured to substantially fill the entire cross-sectional width of the product chute cavity 30$c$ as the pusher head 20$h$ approaches and/or exits the discharge portion of the product chute 30$d$. The clipper 40 is configured to reside in a retracted position out of the product travel region to allow the enclosed product to pass unimpeded until the product rests against the product-holding member 75 (FIG. 12D).

Figure 11A:
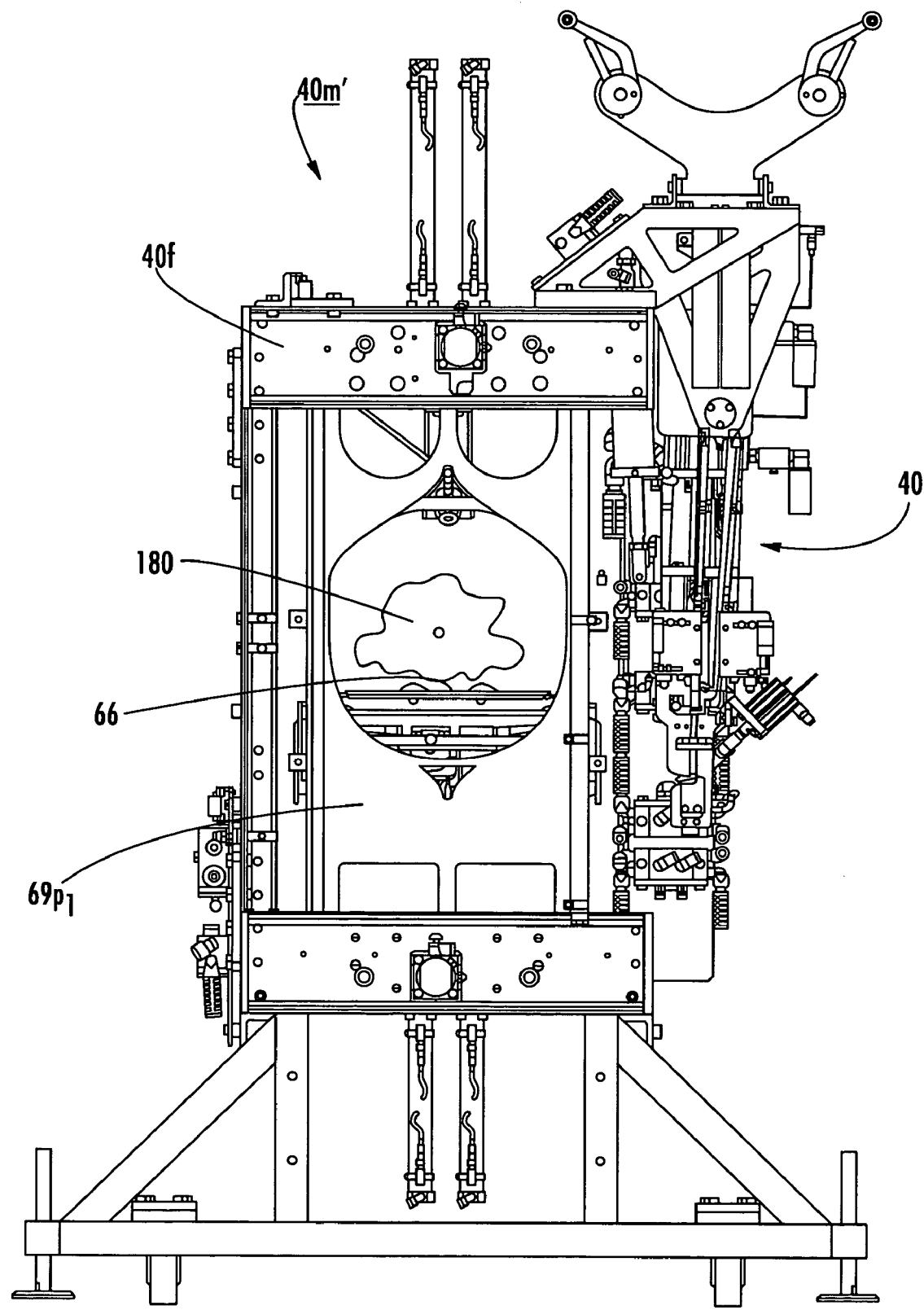
FIG. 11A is an upstream side view (product flow direction is into paper) of a clipper module with a voider mechanism to define a voider clipper module (VC module) according to embodiments of the present invention.
Figure 12B:
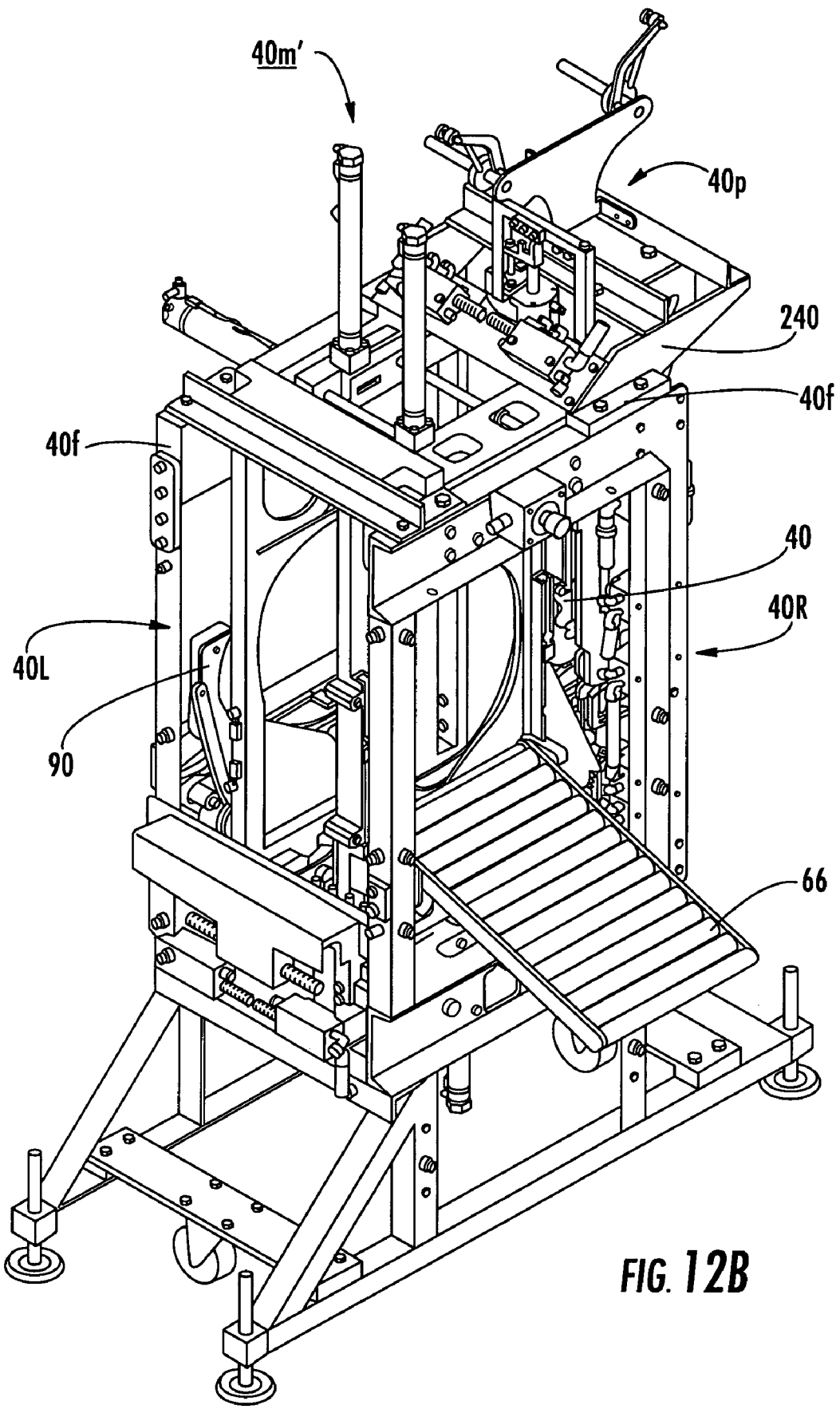
FIG. 12B is a perspective view of the VC module shown in FIG. 12A, illustrated without housing guards.

As shown in FIGS. 4, 11A and 12B, the clipper 40 can be pivotably mounted 40$p$ to a frame 40$f$ and sized and configured to automatically and controllably actuate (via a pneumatic or fluid cylinder) to advance into a clipping position after the product is in position downstream thereof, then clip the covering material and retract to await to clip the next covering material for the next enclosed product. The clipper 40 may operate in response to data from a proximity sensor that is positioned to detect when a product is ready for clipping and provide the data to a controller or processor. The proximity sensor may be positioned at any suitable place to indicate when the product is in position. The proximity sensor can be an optical sensor (infrared, photosensor, or the like), a hall-effect sensor, a magnetic sensor, an inductive sensor, and/or any other suitable sensor. The clipper 40 can be attached to a clipper rotation rotary actuator that can control the movement of the clipper 40 during use.

Figure 10A:
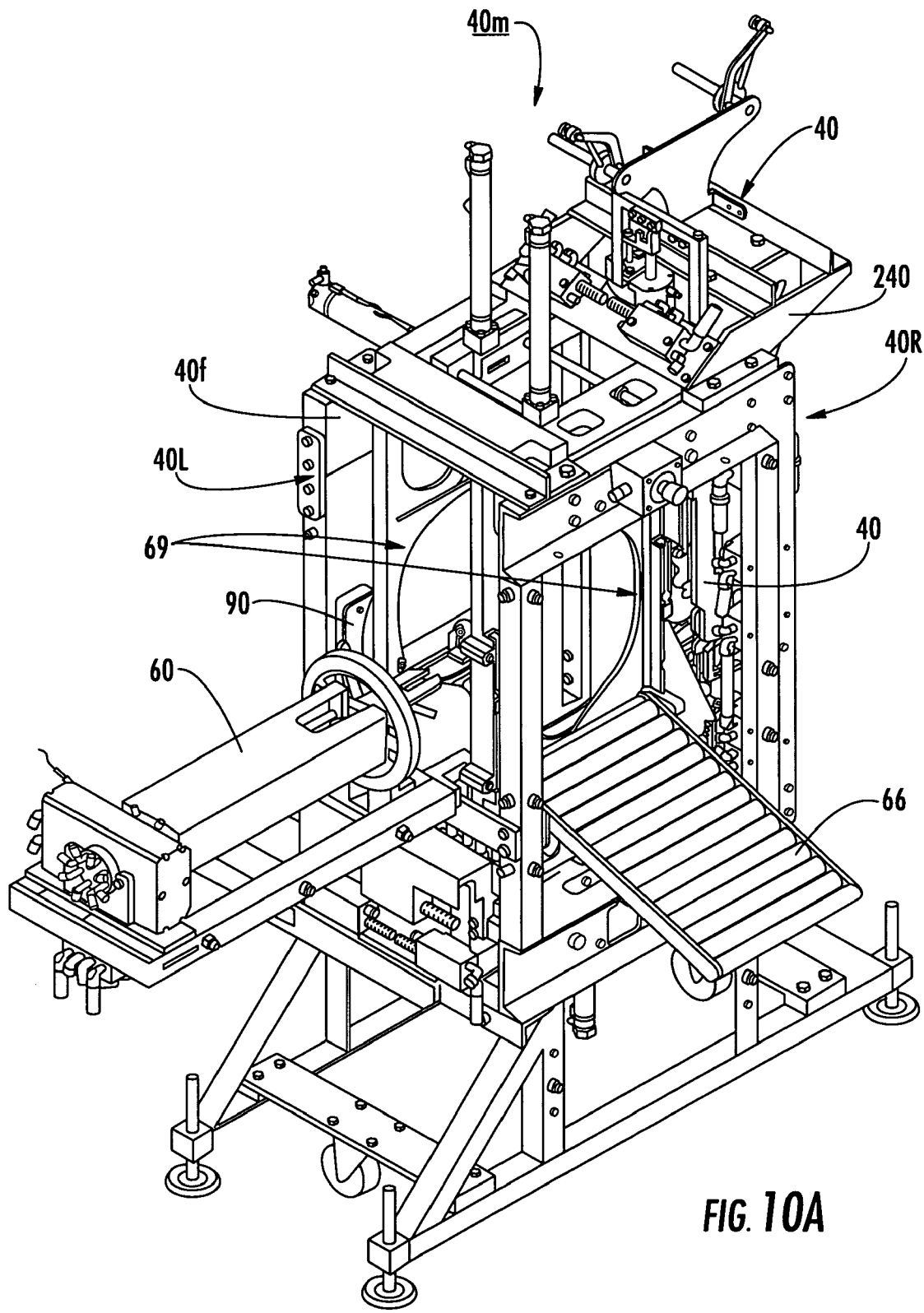
FIG. 10A is a perspective view of the CVH module shown in FIG. 7, illustrated without the housing guards according to embodiments of the present invention.
Figure 11B:
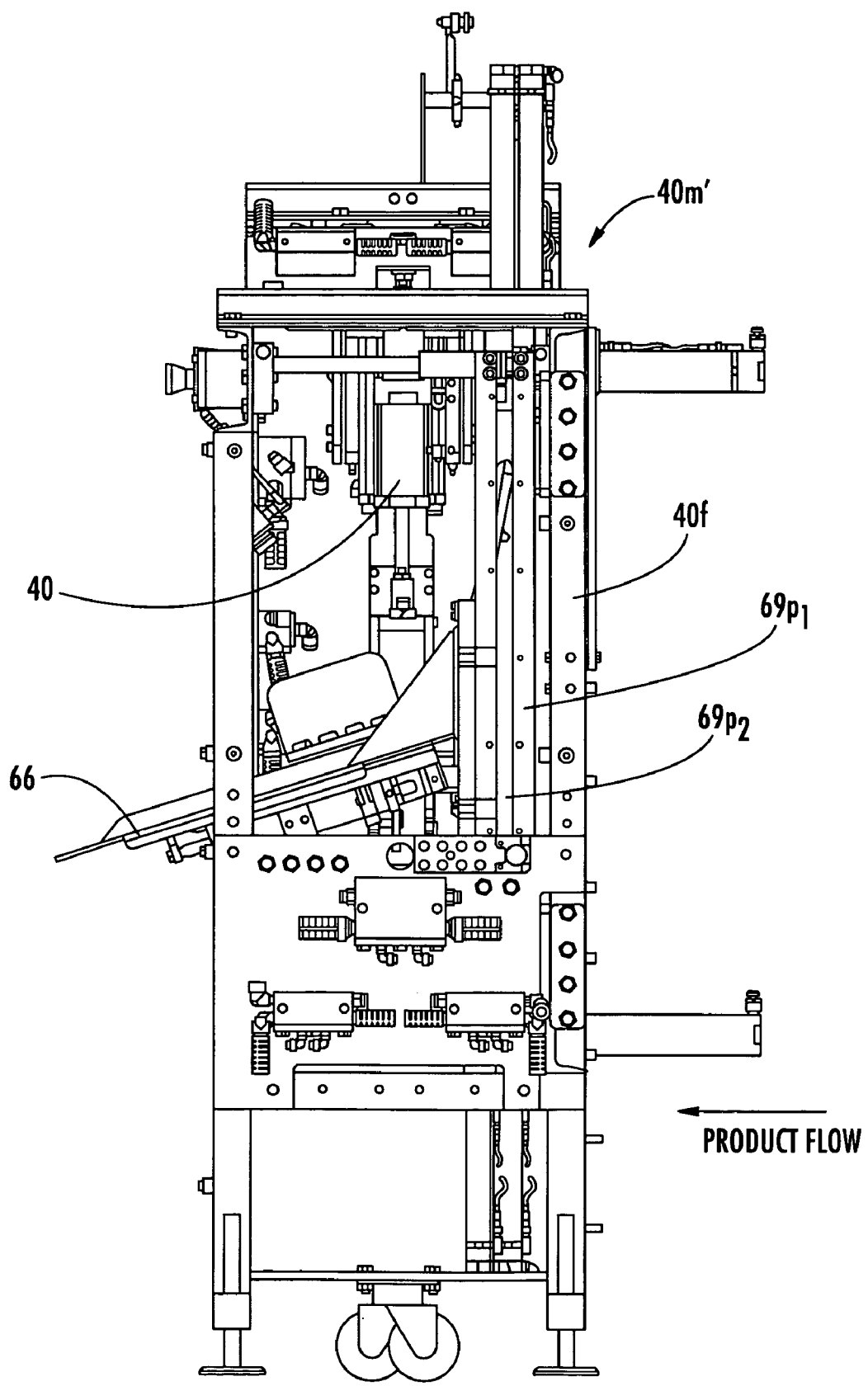
FIG. 11B is a back view of the module shown in FIG. 11A.
Figure 11C:
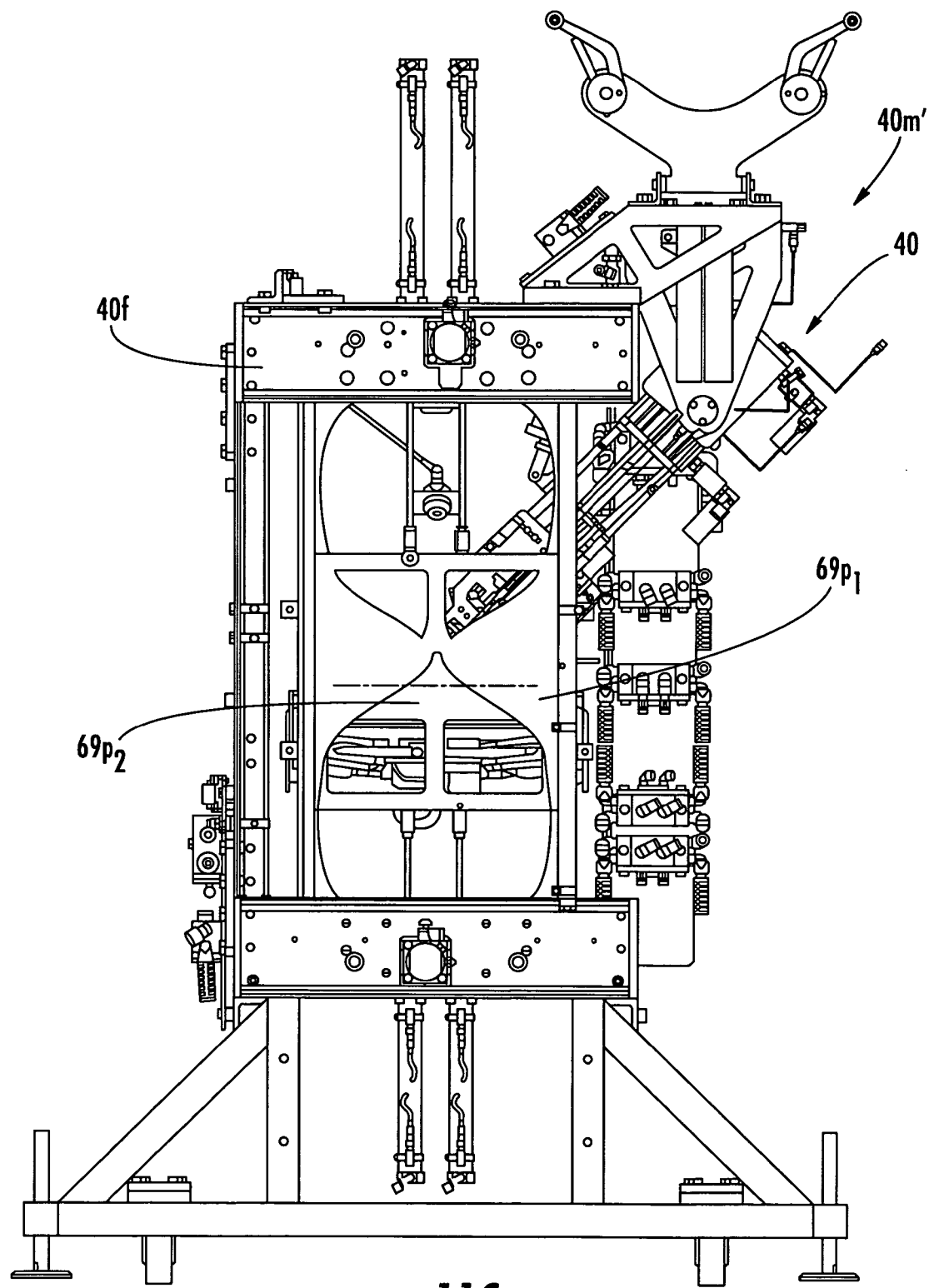
FIG. 11C illustrates the clipper module shown in FIG. 11A with the voiders closed and the clipper in a clip position.
Figure 11D:
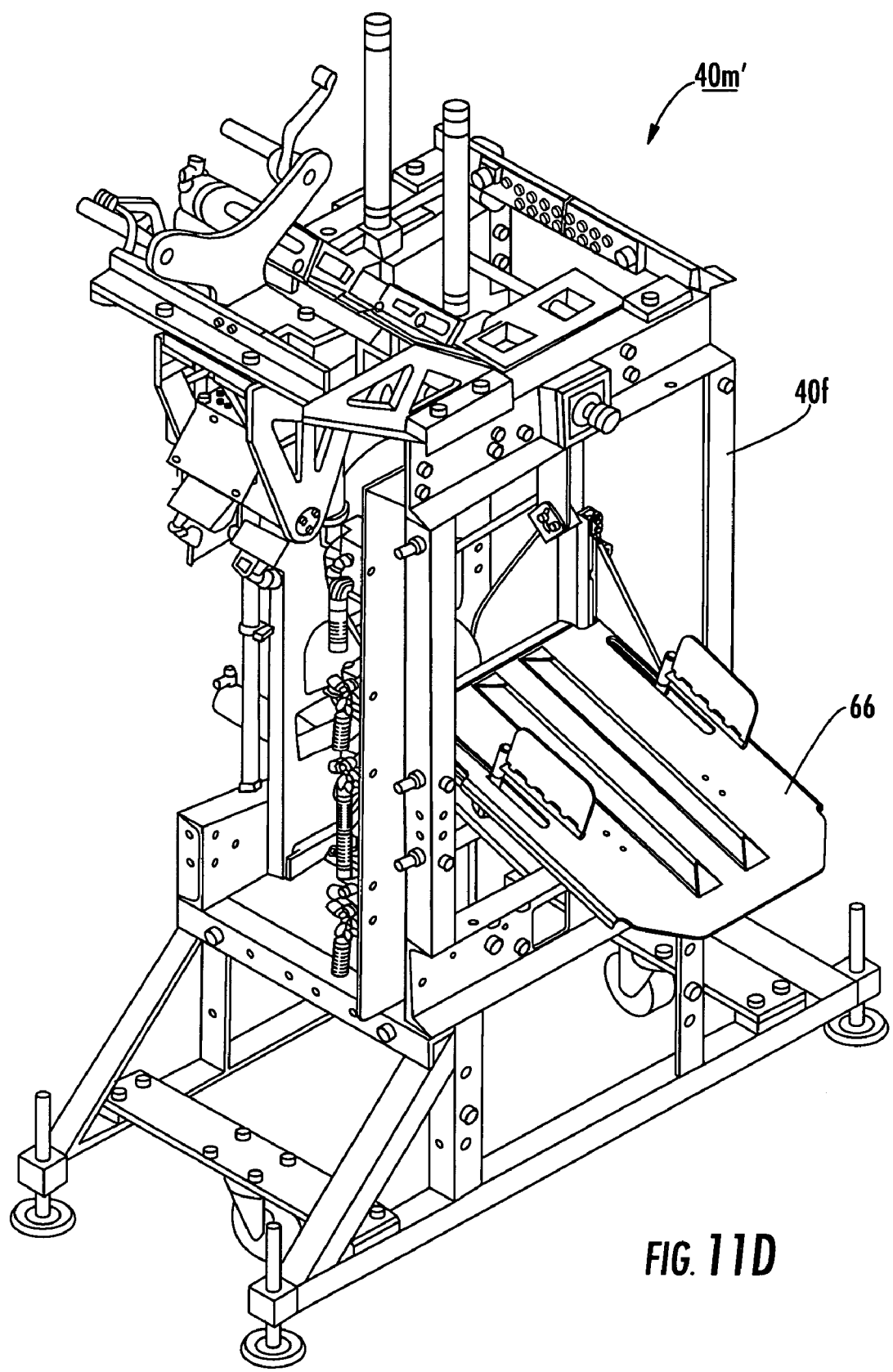
FIG. 11D is a perspective view of the module shown in FIG. 11A.
Figure 11E:
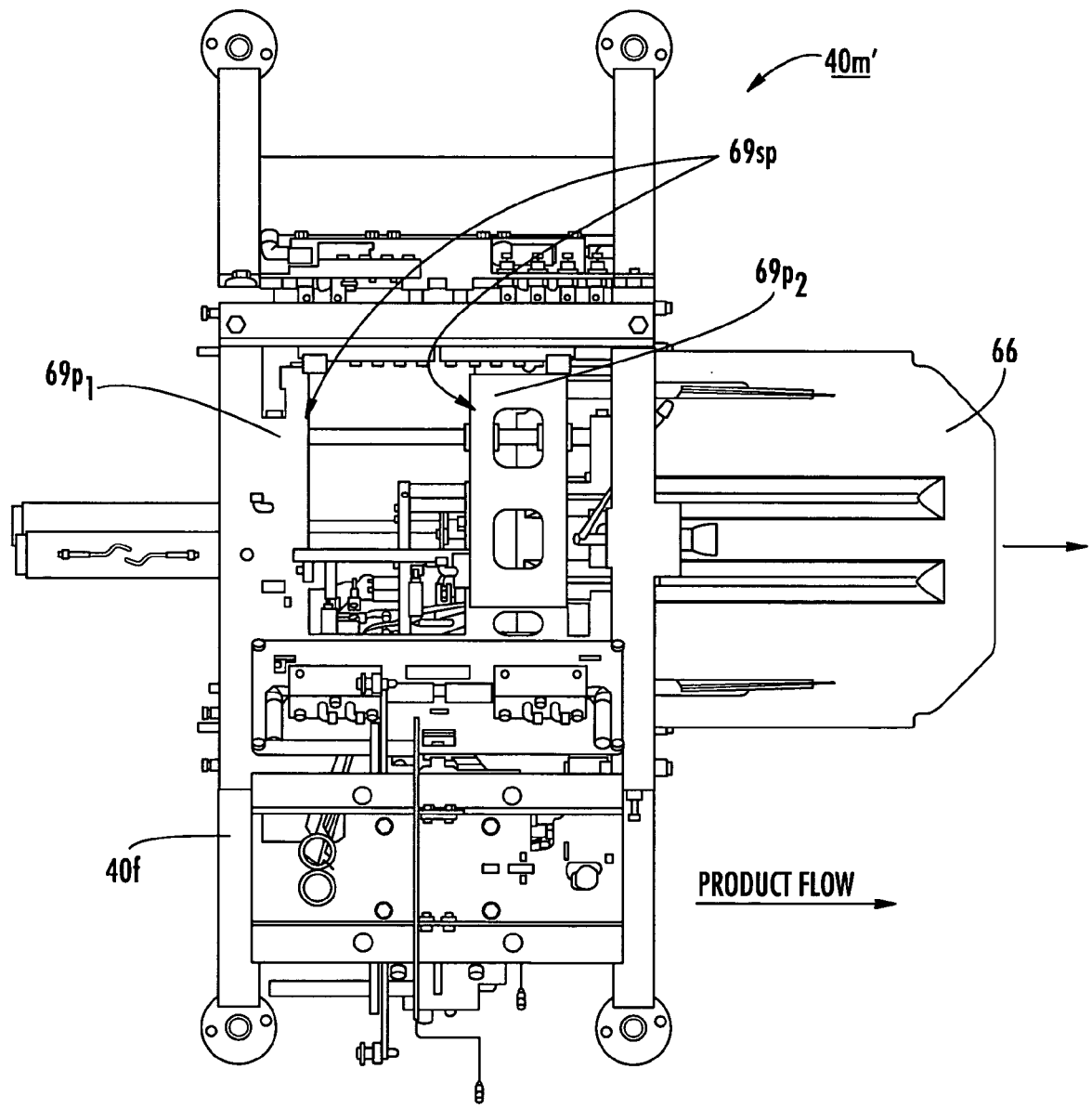
FIG. 11E is a top view of the module shown in FIG. 11A illustrating the voider members separated according to embodiments of the present invention.

In some embodiments, as shown, for example, in FIGS. 10A and 11A–11E, the apparatus 10 may include a voiding mechanism 69 (also known as a voider) that cooperates with the clipper mechanism 40 and handle maker 60 (where used) to help gather and "void" the casing or covering material prior to clipping. The voiding mechanism 69 can include a pair of spaced apart plates 69$p_1$, 69$p_2$ that can move together and apart, each with a window that converges upon the covering material that is held in tension therethrough, to force excess product out of the clipping area/volume as is well known to those of skill in the art. FIG. 11A illustrates the clipper 40 in a home position (generally upright) and the voider plates 69$p_1$ (FIG. 11B), 69$p_2$ (FIGS. 11A and 11B) open and ready to accept a target product (the product flows or travels into the page). FIG. 11B is a back view of the module 40$m'$ that shows the voider plates in position. The upstream plate 69$p_1$ may be fixed in the product flow direction but is typically configured to move up and down. The downstream plate 69$p_2$ can move toward and away from the upstream plate 69$p_1$ (in the longitudinal direction). The tray 66 may be inclined during product entry with the flap or trapping members open as shown. The tray 66 will be discussed further below. FIG. 11C illustrates the clipper 40 in a clip position and the voider 69 closed (i.e., the plates 69$p_1$ and 69$p_2$ are converged). FIG. 11D also illustrates the clipper 40 in a clip position with the voider plates 69$p_1$, 69$p_2$ closed and separated. FIG. 11E illustrates the voider plates 69$p_1$, 69$p_2$ longitudinally spaced apart and separated to define a voider space 69$sp$.

The voider or voiding mechanism 69 helps to provide a tighter clipped package. In addition, the pusher mechanism 20 is not required to exit the chute 30, particularly when a voider 69 is employed, and yet still can provide a tight encased package. The handle maker 60 (where used), the voider 69 and the brakes 90 can all contribute to the tension of the covering (e.g., netting) and thus the tightness of the package about the product.

In some embodiments, the clipper mechanism 40 can operate with an automatic stroke cycle that comprises three dwell positions: a first retracted home position; a second pre-clip position; and a third clipping position. When in the home position, the clipper body is retracted out of the product travel path (typically pivoted outward and upward). In the third clipping position, the clipper travels inward and is generally oriented substantially vertically with the clip window disposed in the product travel path, typically so that the axial centerline of the product chute 30 is generally aligned with the clip window (not shown). In certain embodiments, the second position of the clipper mechanism 40 can be between about 50–75% of the stroke distance between the first and third clipper mechanism positions, typically at about 75% of the stroke distance. The travel from the first home to the second pre-clip position can be carried out as the product is exiting the product chute 30 to save the cycle time that it would take to clip the product while waiting for the clipper to travel the full "home to clip position" cycle. For example, where a handle maker 60 is used (the handle maker being an optional device and/or operation), the clipper mechanism 40 can advance from the home to the pre-clip second position during the handle-making operation. It is noted that the dwell times in each position can be different. The home dwell time may have the longest duration in any stroke cycle.

Figure 15A:
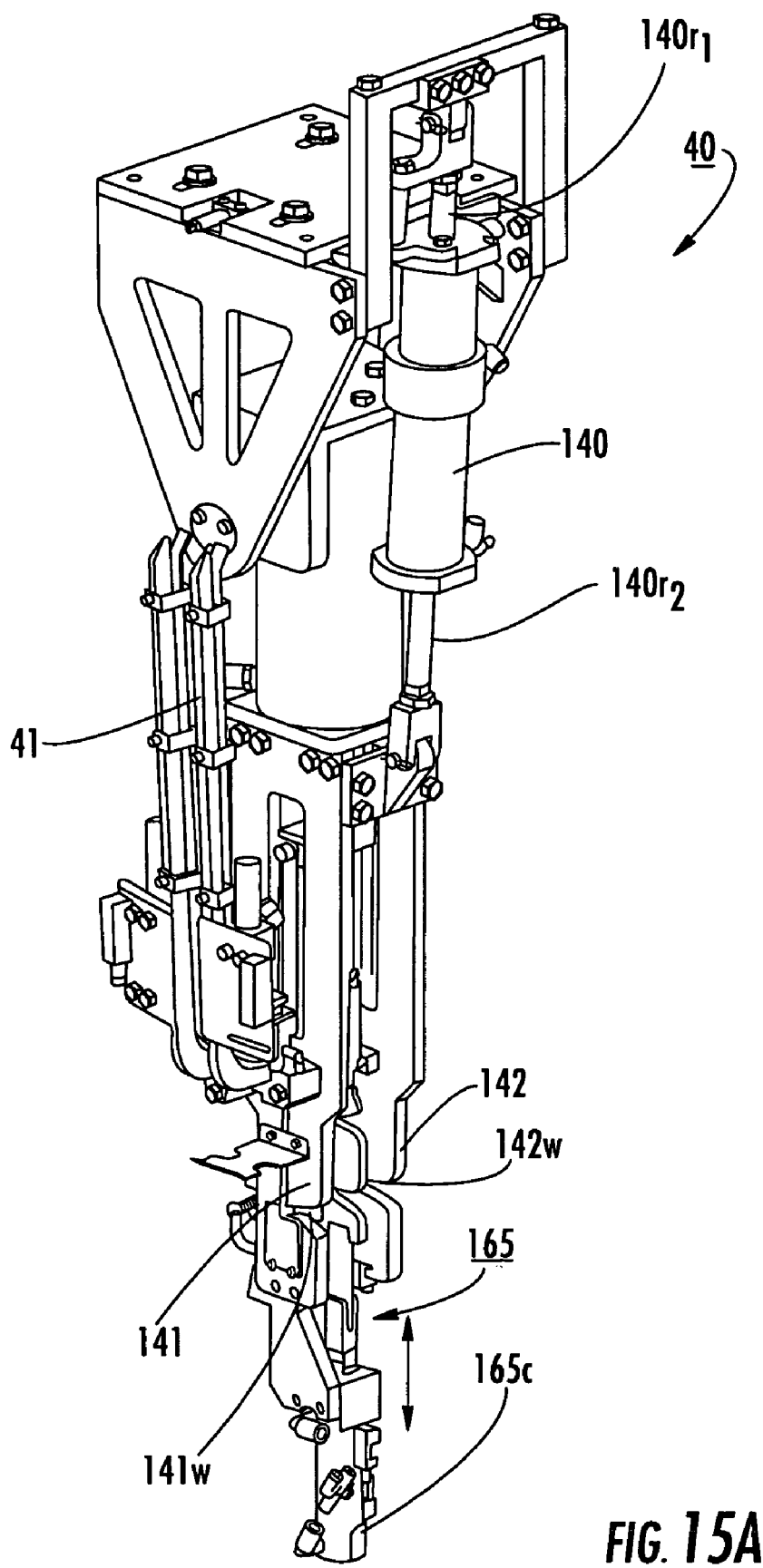
FIG. 15A is a perspective view of a clipper module according to embodiments of the present invention.
Figure 15B:
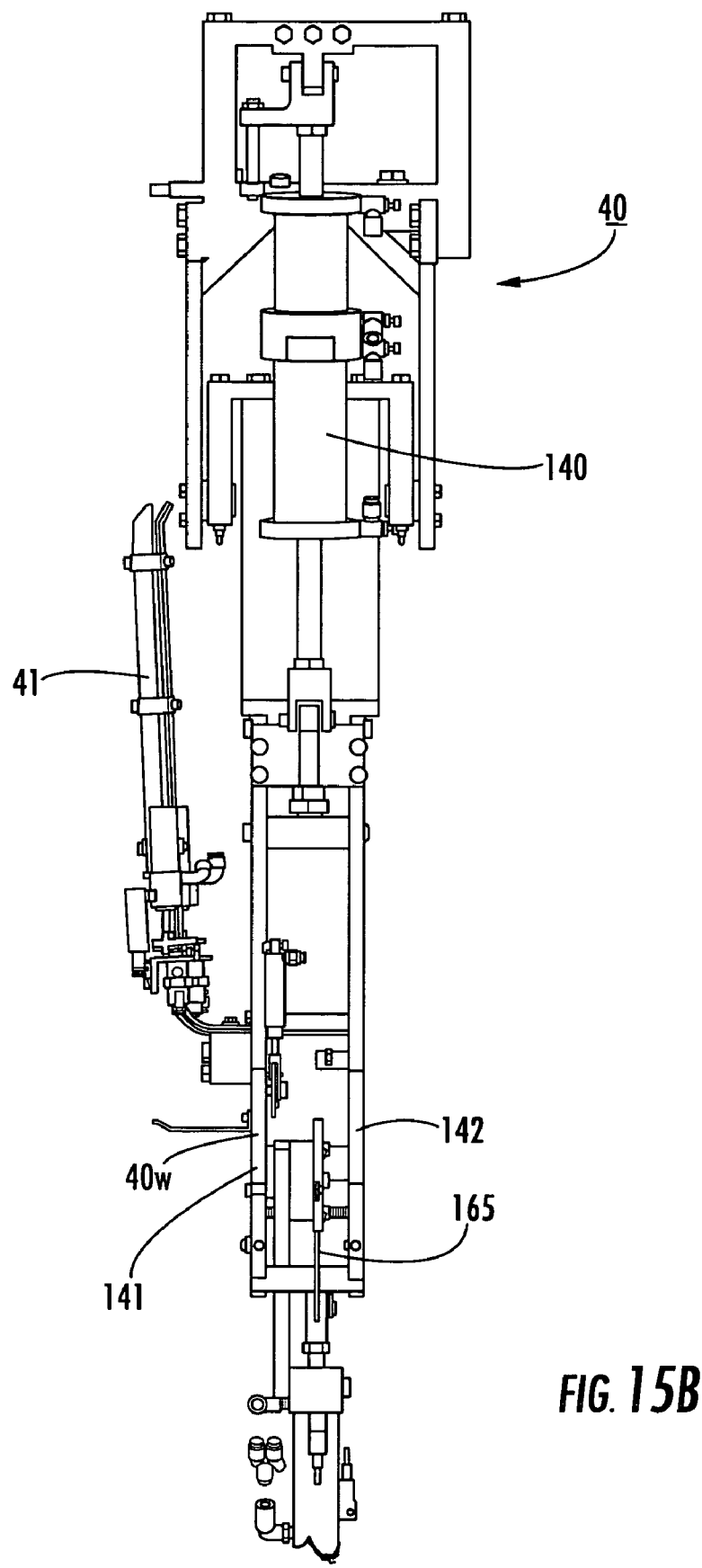
FIG. 15B is a front view of the clipper module shown in FIG. 15A.
Figure 15C:
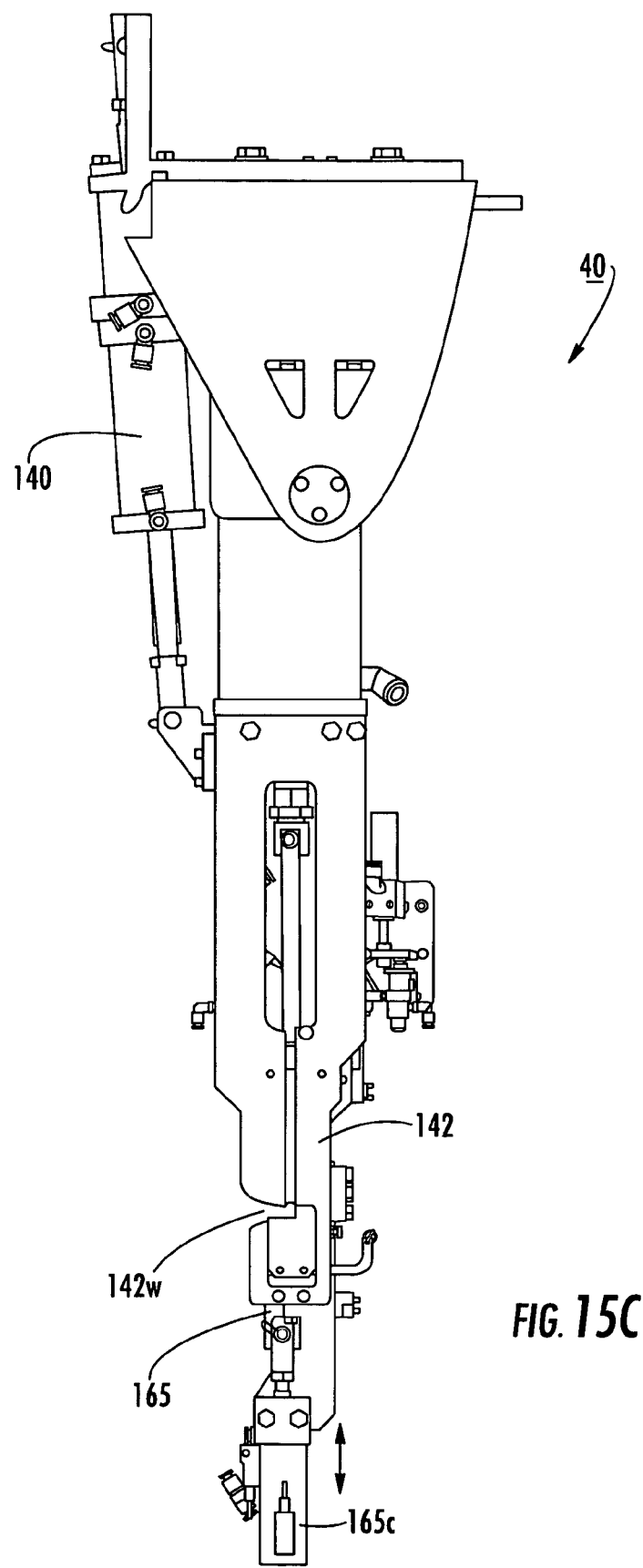
FIG. 15C is a side view of the clipper module shown in FIG. 15A.

As shown in FIGS. 13A and 15A–15C, the clipper mechanism 40 can include an actuation cylinder 140 that controllably and serially advances the clipper mechanism from the first (home) position, to the second (pre-clip) position, and the third (full clip) position, then back to the pre-clip or first (home) position. In certain embodiments, as shown in FIGS. 15A–15C, the clipper 40 includes an integrated double two stroke cylinder 140 with upper and lower cylinder rods $140r_1$, $140r_2$. The stroke length of the upper rod $140r_1$ may be shorter than the stroke length of the lower rod $140r_2$. As shown in FIG. 15A, the lower rod $140r_2$ extends a greater distance than the upper rod $140r_1$ in the home position. In the full clip position, both cylinder rods $140r_1$, $140r_2$ can be in a retracted. FIG. 15B illustrates the clipper in an exemplary pre-clip or intermediate dwell position. The lower rod $140r_2$ can be extended a greater distance than the upper rod $140r_1$ at the home configuration as shown in FIG. 15A.

Figure 5A:
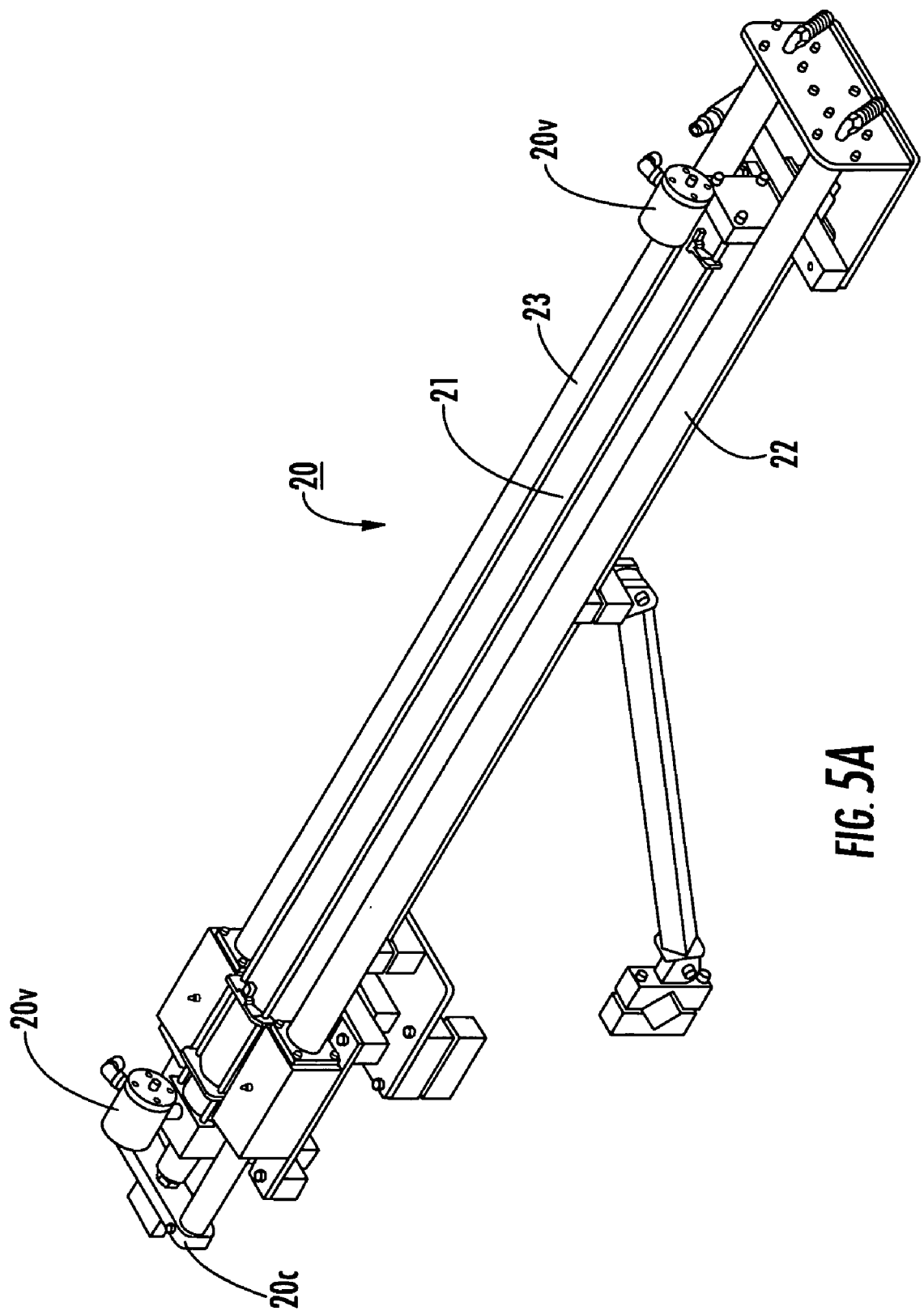
FIG. 5A is a perspective view of the product pusher cylinder assembly according to embodiments of the present invention.
Figure 5B:
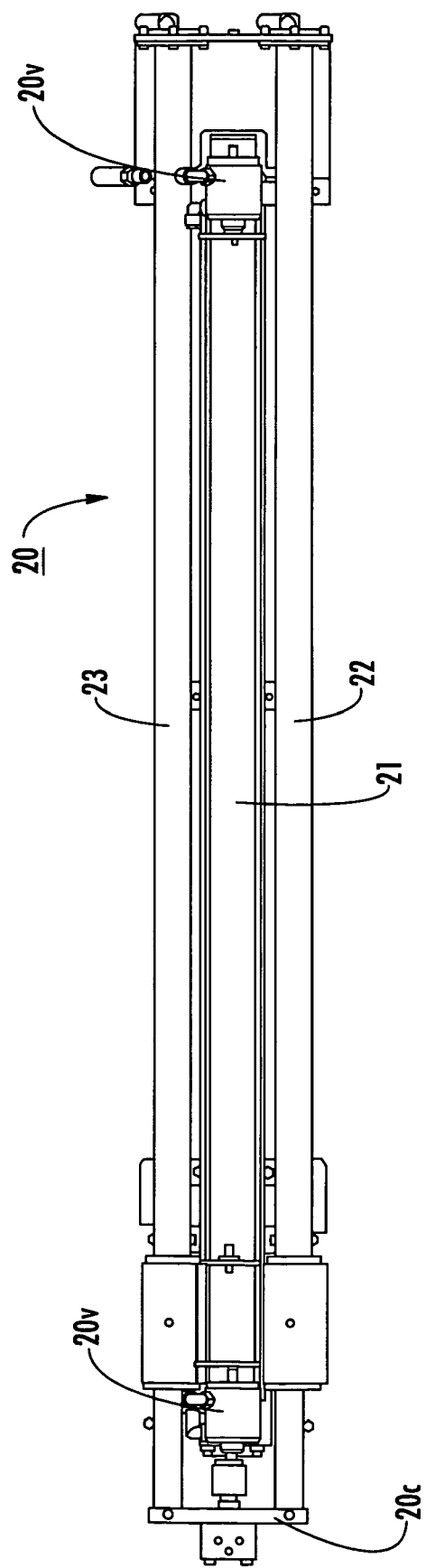
FIG. 5B is a top view of the assembly shown in FIG. 5A.
Figure 5C:
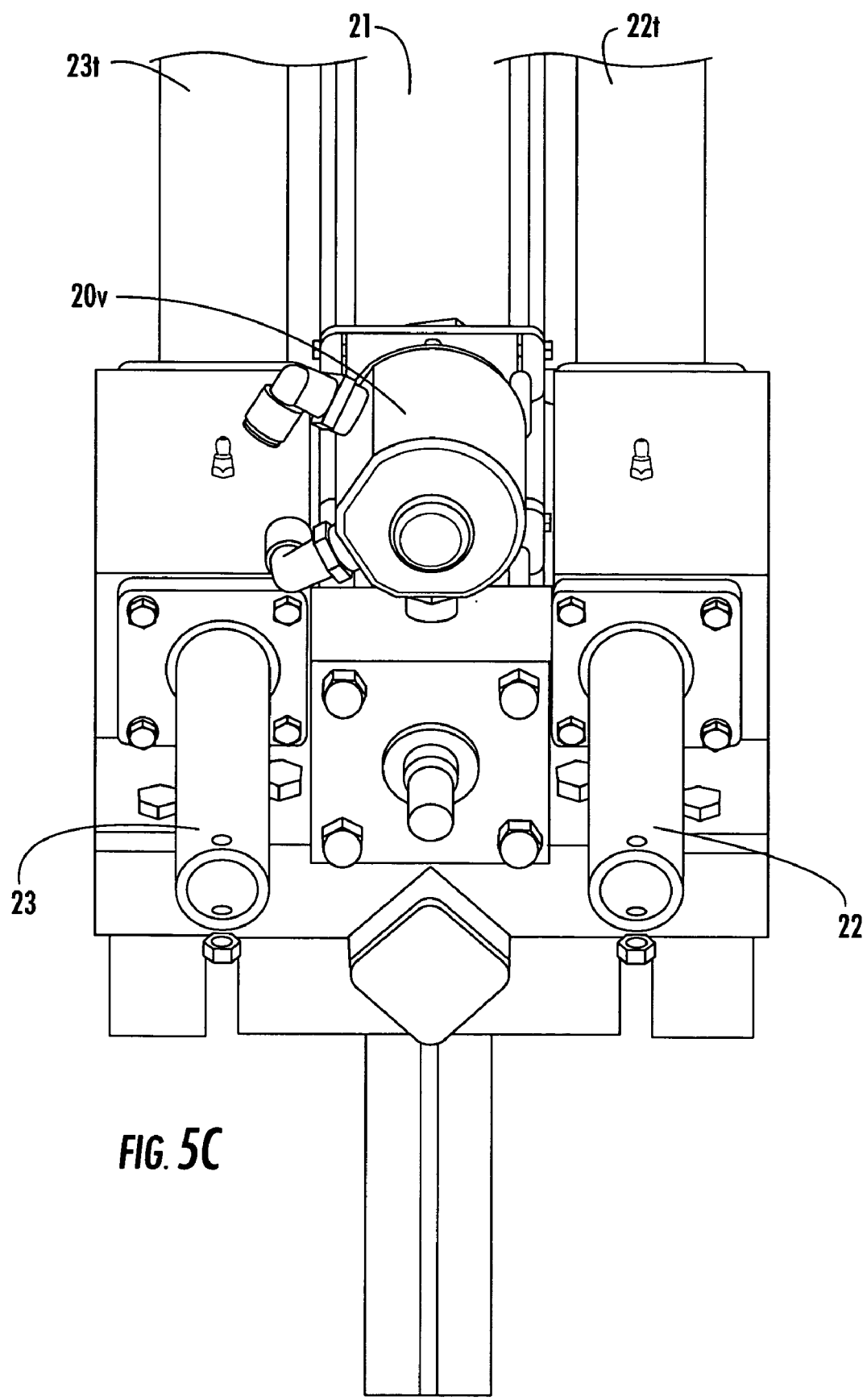
FIG. 5C is a greatly enlarged left-hand (downstream-end) view of the assembly shown in FIGS. 5A and 5B with the pusher plate and coupler removed according to embodiments of the present invention.

FIGS. 5A and 5B illustrate that the product pusher assembly 20 can include a product pusher cylinder 21 and two product pusher guide rods 22, 23, respectively. The product pusher guide rods 22, 23 can be positioned on opposing sides of the pusher cylinder 21 and help to stabilize (i.e., provide an anti-rotation structure) for the pusher head 20h as the pusher head 20h travels, particularly when it travels outside the product chute 30. As shown, the product pusher assembly 20 can include a coupler 20c that can attach the pusher head 20h. FIG. 5C shows the pusher assembly 20 with the pusher head 20h (FIG. 2) and coupler 20c (FIG. 5B) removed, illustrating the guide tubes 22t, 23t that are in communication with the guide rods 22, 23.

As shown in FIGS. 5A–5B, the pusher assembly 20 can include at least one, (illustrated herein as two), 3-way power valves 20v, one positioned on each end portion of the cylinder 21. The product pusher assembly 20 can also include at least one pressure regulator and an air source in communication with the cylinder 21. In operation, the pressure regulator can allow the cylinder 21 to operate at up to about 80 psi (653 $lb_f$). The cylinder 21 may be operated at a substantially constant fixed pressure of between about 50–80 psi. In certain embodiments, the pressure is maintained at about 80 psi to allow the pusher 20 to push the product through the chute 30 even when the product is slightly oversized, thereby shaping the product as it travels through the chute 30. The bore size of the cylinder 21 may be about 3.25 inches. This shaping may be particularly suitable for whole or partial hams, including bone-in hams, as such a shaping operation may form increased numbers of center slices.

Figure 14:
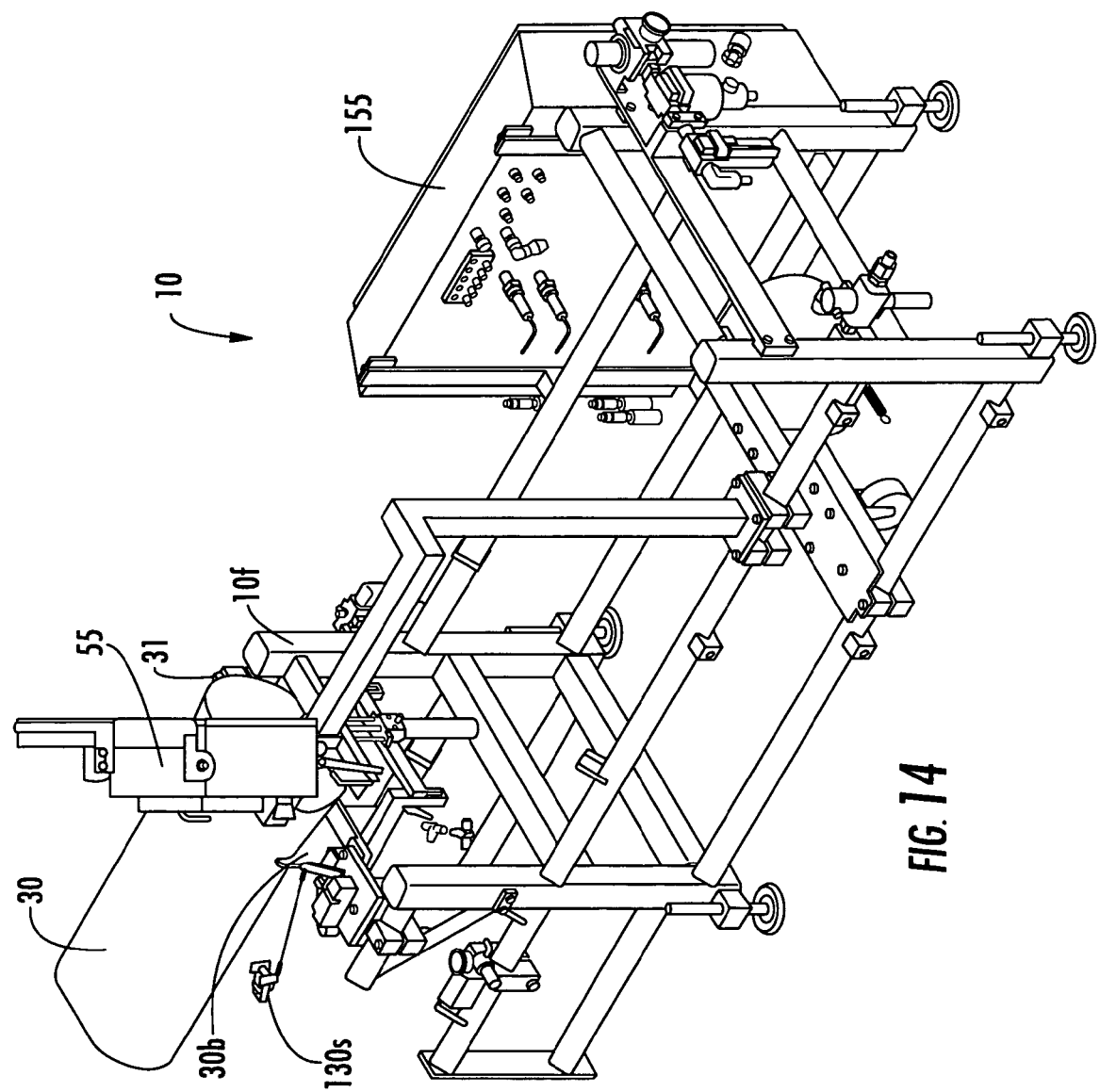
FIG. 14 is a perspective view of a chute/pusher frame module with a control box that can be configured to selectively engage CV or CVH modules according to embodiments of the present invention.

As shown in FIG. 14, a control housing 155 can hold system valves, pressure transducers, actuator controls, a processor that directs the automated operations of the apparatus 10 which may also be held in total or partially in the HMI 55 and other electronic, software and/or mechanical equipment as will be understood by one of skill in the art. The HMI 55 may include a touch screen interface/user input.

Figure 6A:
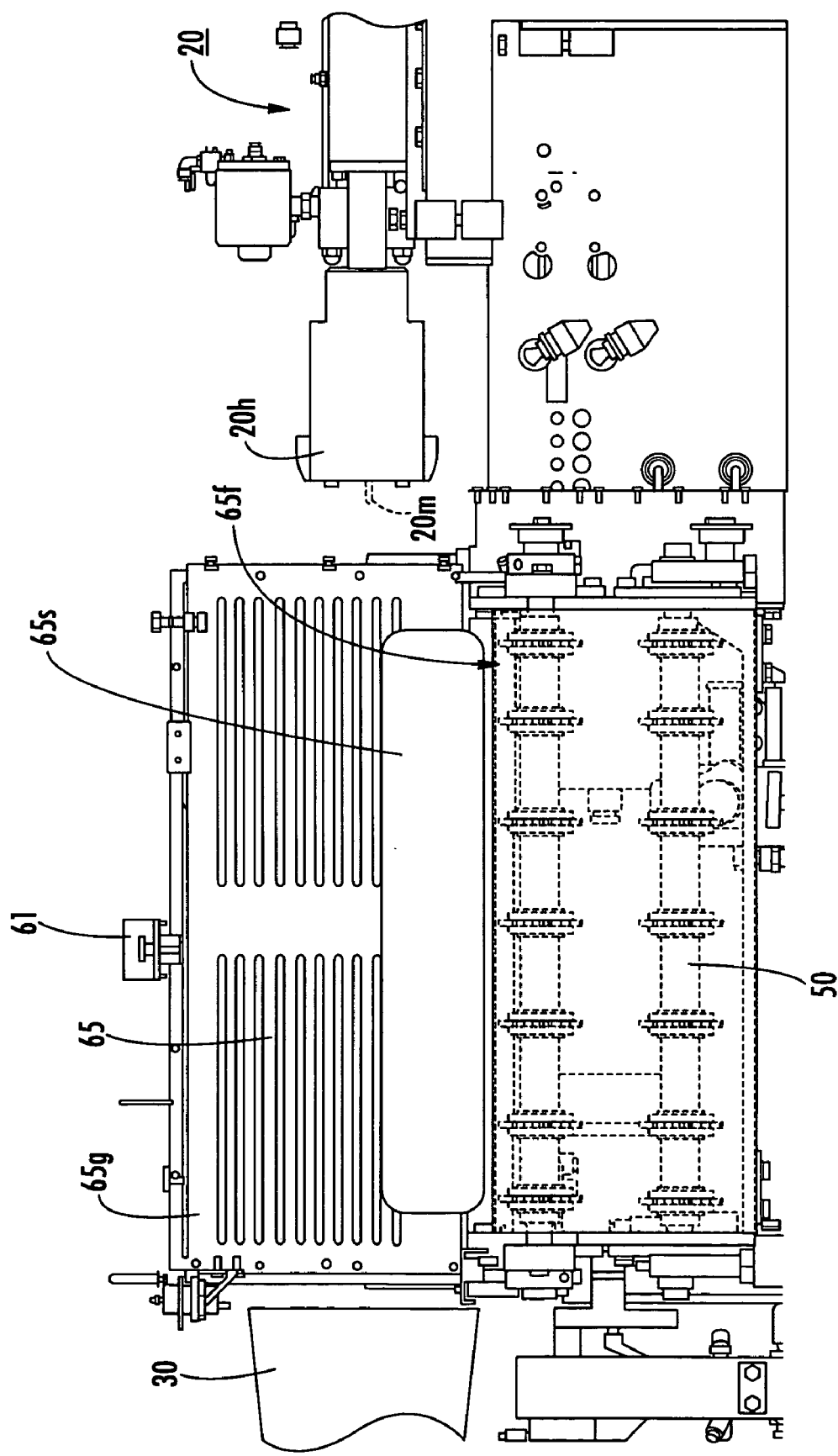
FIG. 6A is a front view of a transfer region of the apparatus shown in FIG. 1 according to embodiments of the present invention.

FIGS. 1 and 2 illustrate that the product transfer zone 65 can have a ceiling or lid 65c that overlies the floor 65f and a sensor 61 (FIG. 6B) held above the floor 65f (typically in the ceiling 65c). In FIGS. 2 and 6A, the product pusher assembly 20 is shown retracted with the pusher head 20h upstream of the product chute 30. The ceiling 65c (FIG. 1) may be pivotably mounted to the frame of the apparatus 10 to allow an operator easier access to the transport zone 65 for clearing misfeeds and the like. The sensor 61 (FIG. 6B) can be an ultrasonic sensor configured to identify when a product is in a suitable deployable position in the underlying space of the product transfer zone 65. This data can be fed to a controller that can then timely activate the actuation cylinder 21 to advance the product pusher assembly 20. In operation, if an expected product is not delivered to the product transfer zone 65 within a predetermined time, a timing circuit (typically included in the machine control logic program code) can automatically stop the infeed conveyor 50. An operator can restart the apparatus 10 by depressing the start pushbutton.

Figure 6B:
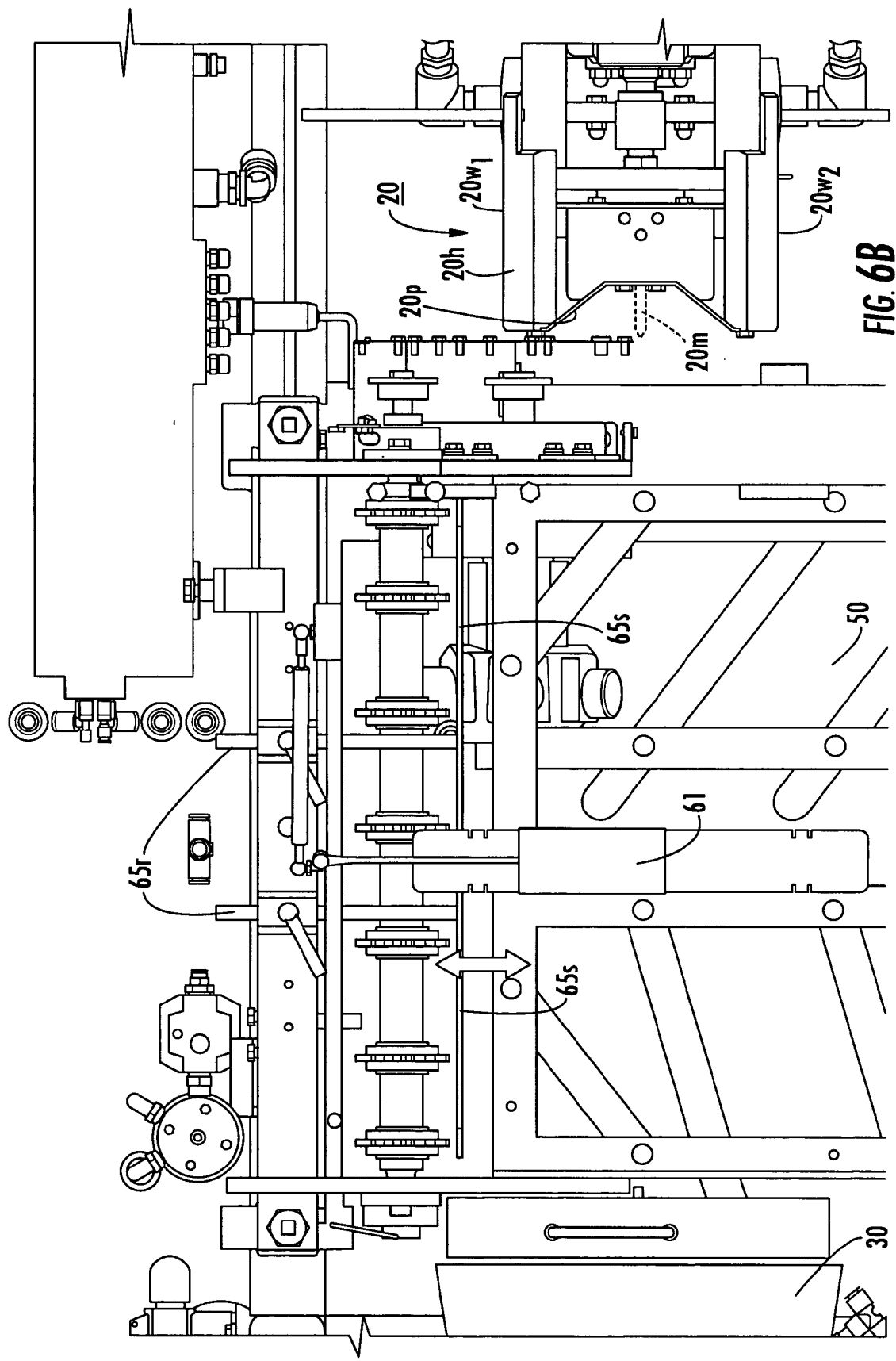
FIG. 6B is a top view of the transfer region shown in FIG. 6A.
Figure 6C:
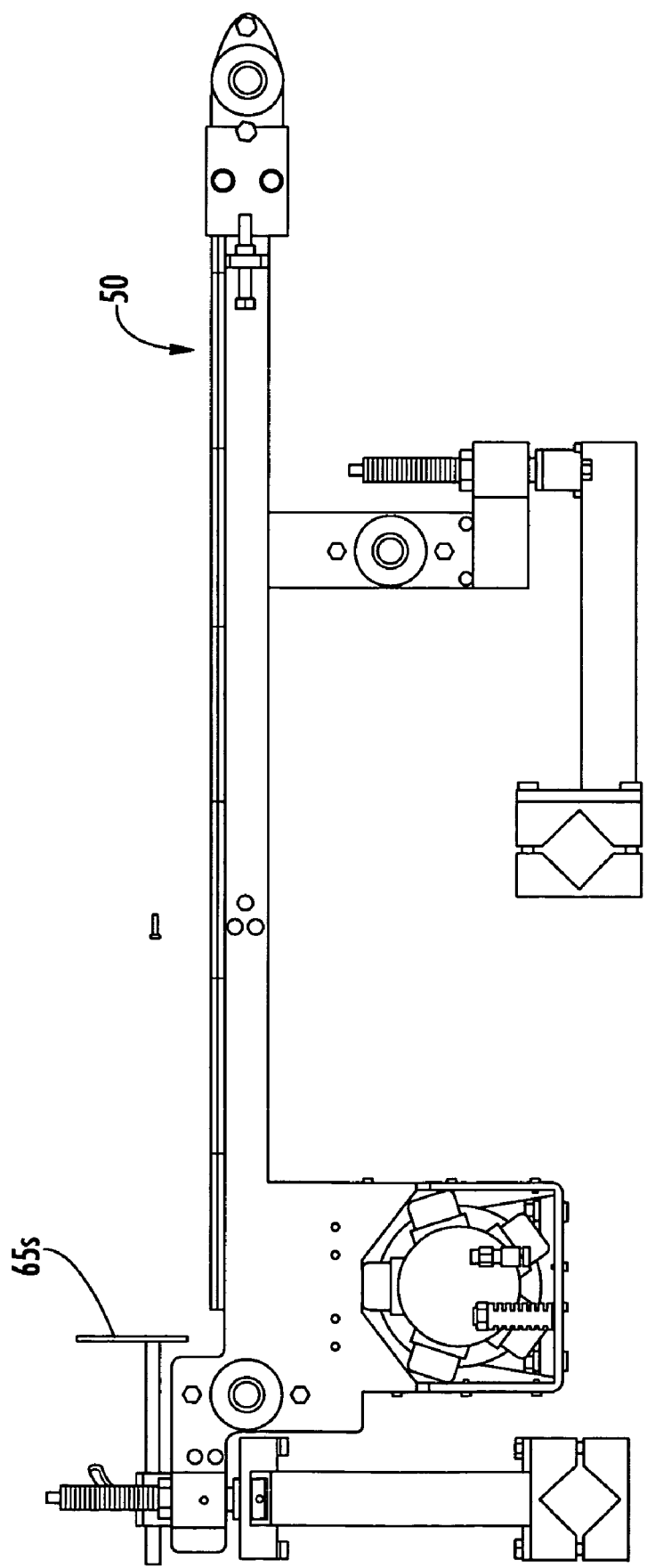
FIG. 6C is a left-hand (downstream-end) view of the conveyor in the transfer region according to embodiments of the present invention.

FIGS. 6A and 6B also show a stop member 65s that can move toward the conveyor 50 to help align the incoming product on the primary travel path, so that the center of the product is generally aligned and in line with the axial centerline of the product chute 30. The stop member 65s can be moved in and out (as shown by the arrow in FIG. 6B) in response to when product is determined to be in position in the transfer zone 65, such as via direction of the controller based on a signal from the proximity sensor 61. FIG. 6C shows that the stop plate 65s can be in communication with at least one (shown as two) adjuster rods 65r to allow the apparatus 10 to adjust the position and/or travel distance to accommodate different size in-feed conveyors 50 as well as different sized chutes 30 and/or products. FIG. 6A also illustrates that a housing guard 65g may be positioned in the transfer zone 65 on the other side of the stop member 65s.

FIG. 2 illustrates a product 180 on the floor 50f of the conveyor 50 and positioned in the product transfer zone 65. The product 180 is stopped by the product stop plate 65s from progressing out of alignment with the outer perimeter of the chute 30 so that the product is in communication with the inlet portion of the, chute 30 and so that the product pusher assembly 20 will be able to push the product 180 axially downstream through the product chute 30 substantially about the chute axis 30a.

It is noted that in lieu of and/or with the conveyor 50, other moving floors or product advancement systems may be used (for example, rollers, rolling bars, belts or drives that advance trays or other support members and the like). In addition, the moving floor may be angularly oriented to travel up, down, or otherwise to advance the product to the product transfer zone 65. In addition, the apparatus 10 can include an automated continuous advancement system with discrete product(s) separated at desired intervals on the moving floor to serially introduce product for packaging to the chute 30. In certain embodiments, the moving floor can include partitions, channels, or other spacer configurations to hold the product(s) in desired alignment on the moving floor so that, when the proximity sensor indicates the product is present, the partition or channel provides the desired product stop.

For groups of objects, manual or automated bins or feeders can accumulate the desired amount of grouped objects upstream and place them together on the moving floor (not shown). In other embodiments, an automated counter can be used to count the number of products that pass a target location or enter the transfer zone 65 so that a desired number of products are accumulated in the transfer zone 65 and activate the product pusher assembly 20 (not shown). The conveyor 50 and chute 30 may be configured to have a gap or bridge space therebetween, depending on the size of the conveyor 50. In certain particular embodiments, a gap space of about 2.5 inches extends in the axial direction between the conveyor 50 and the chute 30.

As shown in FIG. 2, the apparatus 10 may include another sensor 31 positioned proximate the receiving end of the product chute 30. The sensor 31 is configured to confirm that the product chute 30 is in operative position. When a product 180 is detected in the transfer zone 65, the activation of the product pusher assembly 20 may also be based on whether the product chute 30 is determined to be in proper position using data from the sensor 31, typically positioned on the frame 10f thereat. An exemplary sensor 31 is a two-part magnetic switch; one part can be positioned on a mounting bracket 31b attached to a chute bracket 30b as shown in FIG. 3 and the other part held on the mounting frame 10f. When the two matable parts of the switch 31 engage, the chute 30 is determined to be in proper position. Other types and/or additional sensors may also be used as suitable as is known to those of skill in the art.

A controller/processor (such as a Programmable Logic Controller) may be configured to monitor a signal from this sensor 31 and deactivate the product pusher assembly 20 (release cylinder pressure) automatically whenever a product chute 30 position-error is noted at any time during the process. The signal can be automatically monitored through a Safety Circuit Module. If the product chute 30 is missing or out of position, the apparatus 10 can be held in a low energy state that removes power to air supplies and controls to inhibit machine operation. To reinitiate the procedure, an operator may press a restart or reset button. In certain embodiments, the clipper 40 may be operated on override even when the chute 30 is absent. Once the product chute 30 is in location and the stop is reset, power air can be applied to the machine control valves and electric power can be applied to the control (PLC) outputs. After the PLC determines the positions of the moveable components, such as the product pusher assembly 20, the clipper 40, the product holding member and the like, an automatic reset can be performed and those components automatically moved to a respective home position as needed.

As shown in FIG. 4, the HMI 55 can include an input display screen, an emergency stop button 56, a reset button and a clipper only activation button. The HMI can also include a pressure regulator for corresponding gages. The pressure regulators can be for the retractable product holding member on a discharge tray (which may be described as a product clamp bar), and/or for a retractable brake system 90 (FIG. 10), typically used to selectively apply brake pressure to the covering material proximate the discharge end portion of the product chute 30.

The apparatus 10 may be configured to allow the clipper 40 to operate irrespective of the upstream devices using the clipper-only push button instead of the apparatus-start push button. The HMI 55 can also include an emergency stop 56 and reset pushbutton or other type of switch as shown.

FIG. 6B also illustrates that the pusher head 20h can be configured with a product pusher plate 20p that is adapted to contact the product 180 (such as food) as the pusher assembly 20 extends forward. The pusher head 20h can also include axially extending guidewalls $20w_1$, $20w_2$. The pusher head 20h can be sized and configured to substantially fill the chute cavity 30c to thereby inhibit objects from attempting to migrate downstream during the pushing operation. The pusher plate 20p is shown in FIG. 6B as a forward portion adapted to contact the product which, when viewed from the top, comprises side portions that angularly converge to a recessed medial planar portion shape; other configurations and shapes may also be used as will be discussed further below. The shape of the product-contacting portion 20p of the pusher head 20h may influence the orientation (typically the attitude) of the product inside the netting as it exits the chute 30. FIG. 6B also illustrates the assembly 20 and/or the product pusher head 20h in a home or resting position. The pusher head 20h may include a forward plow configuration to help center the product (such as a bone-in ham product). The plow may have a width of about 5 inches. FIGS. 6A and 6B illustrate that the pusher head 20h may include a forward outwardly extending piercing member 20m such as a nail, blade, pin, or other sharp implement that can pierce a rearward portion of the product to help keep the product in alignment as it is pushed through the chute 30. As such, the apparatus 10 can employ a removing member that can be positioned to cooperate with the chute to remove the member prior to clipping (not shown).

In some embodiments, the product pusher mechanism 20 is configured to limit the travel of the pusher head 20h so that at least a portion of the pusher head 20h remains inside the product chute 30 at a furthermost operative extension position (extended position) of the product pusher mechanism 20. In other embodiments, the forward portion of the pusher head 20h passes out of the chute 30 downstream of the gathering plates while in still other embodiments, the pusher head 20h stops short of the downstream most gathering plate (the gathering plates will be discussed further below). In operation, the pusher head 20h is configured to push the product from the discharge end of the chute 20d so that the covering material extends a sufficient distance therefrom to allow an automated clipping operation to be carried out.

Referring to FIG. 6B, as described above, the product pusher mechanism 20 comprises a pair of spaced apart elongate guidewalls $20w_1$, $20w_2$ positioned on opposing sides of the forward portion of the pusher head 20h to help guide the pusher head 20h in the product chute 30. The guidewalls $20w_1$, $20w_2$ may have a length that is less than the length of the product chute 30. The guidewalls $20w_1$, $20w_2$ may each connect (directly or indirectly) to a guide rod 23, 22, respectively. The guiderods 22, 23 may be symmetrically arranged with respect to the intermediately located pusher cylinder 21. As shown in FIGS. 1–3, and 5A, the product pusher assembly 20 can operate using a fluid-actuated cylinder 21 (typically a pneumatic cylinder) that is longitudinally mounted on the apparatus 10 and extends in the axial direction. The centerline of the cylinder 21 may be aligned with the product chute centerline 30. The two guide rods 22, 23 can be stainless steel guide rods mounted in a linear ball bearing block assembly. As noted above, the guide rods 22, 23 can act as an anti-rotation stabilizer for the product pusher assembly 20 and/or help guide the head 20h to travel in a substantially straight line through the product chute 30 as the head 20h travels repetitively through extended and retracted configurations.

Referring to FIG. 6B, the guidewalls $20w_1$, $20w_2$ and/or the forward portion 20p of the pusher head 20h may be formed of and/or coated with a non-stick material (and/or lubricant) such as TEFLON. In particular embodiments, such as for packaging of meat, the guidewalls $20w_1$, $20w_2$ may be formed of acetyl while the forward portion 20p can be formed of stainless steel.

The conveyor system 50 may include a DELRIN conveyor floor support, belt drive sprockets, air motor and gear box that can automatically advance the conveyor floor. The conveyor floor material may be an open mesh, interlocking material, such as an interlaced composite material. Generally stated, in the embodiment shown, the conveyor floor is driven by a series of sprockets that engage the weave and/or underside of the conveyor floor. A radial piston air motor drives the conveyor floor through a speed reduction gearbox. Power is transmitted to the conveyor drive roller via a chain and sprocket configuration.

FIG. 3 illustrates a side view of the product chute 30 held on a mounting bracket and attached to the frame 10f. As shown, the product chute 30 can be an elongate product chute. The product chute 30 can include a larger front-end cavity area 30a (shown as a funnel-like shape) relative to the intermediate and/or discharging portion 30d, i.e., the chute cavity 30c narrows in the pushing/product travel direction. Thus, the product chute 30 can include a primary body and a larger upstream guide portion that narrows into the shape of the primary body. The chute 30 may be formed as a unitary member or a series of attached members (not shown). The chute 30 can include a lifting handle 30h (FIGS. 2 and 3) to facilitate removal and installation. In operation, a supply of covering material 130 (see, e.g., FIG. 1) can be placed on or about the chute 30, arranged to surround the exterior surface of at least a portion of the product chute 30 and extend in tension in the downstream direction to cover the product (tenting/tensioning in the axial direction) as the product exits the discharge end portion of the product chute 30d. In certain embodiments, the covering material is configured and sized to stretch in at least the lateral direction and typically in both the lateral and axial directions as it is held on and dispensed from the product chute 30.

The product chute floor may be a stationary floor with an anti-stick coating or material. It is also noted that the product chute 30 may include a moving floor such as those types described above with respect to the infeed floor configurations. The chute 30 may be sized relative to the product 180 so that the product 180 extends across a major portion of the width of the cavity, and in certain embodiments, extends across at least about 75% of the width of the cavity. In certain embodiments, the product 180 and chute cavity 30c are sized so that the sides and/or top and bottom of the product 180 are pressed against the sidewalls of the cavity as the product is pushed therethrough. The product chute 30 may comprise stainless steel and be coated with a friction reducing material such as TEFLON polymer. Lubricants may also be disposed on the inner surface(s) of the product chute 30.

In certain embodiments, the product chute 30 has a cross-sectional profile that is non-circular. The product chute 30 may be configured with a planar top and/or bottom portion and semi-circular side portions. Other cross-sectional profile configurations may also be used including, but not limited to, circular, oval, triangular, rectangular, square and the like.

As shown in FIG. 14, the mounting bracket 30b can be configured to relatively easily attach to and be removed from the frame of the apparatus 10 so as to be releasably mountable thereto. The mounting bracket 30b can hold the product chute 30 in alignment with the clipper mechanism 40 downstream and the product pusher mechanism 20 upstream. As shown in FIG. 14, an alligator clip can be used in combination with a sensor 130s to clip to a trailing edge of the covering material and trip a switch to automatically monitor and alert when the covering material is low and/or may need replaced. In certain embodiments, the system 10 can include a first product chute and a respective first mounting bracket 30b and a second product chute 30 releasably mountable to the apparatus frame 10 at the same position (interchangeable chutes) using a respective second mounting bracket 30b that can be configured substantially the same as the first mounting bracket 30b. In other embodiments, the product chute 30 can be lifted off of the mounting bracket 30b (leaving the mounting bracket in place) and another chute 30 placed thereon. The second product chute may be sized and configured the same as the first product chute 30 and loaded with a second supply of covering material. The covering material may be the same as that of the first product chute or different. Thus, the respective first and second mounting brackets 30b can be configured as quick disconnect components (merely loosening and/or releasing attachment hardware) to allow the first and second product chutes 30 to be interchanged on the system 10 in under 5 minutes, and more typically in under about 2 minutes, to allow an operator to employ at least one of a different size product chute, a different configuration product chute, different packaging material dispensed by the product chute.

In other embodiments, a plurality of chutes 30 can be mounted on a sliding or movable track that can serially move a selected chute out of and/or into the operative position (not shown). The plurality of chutes 30 may be positioned side to side or above and below each other (vertically stacked), mounted on a carousel, or the like so as to automatically move into and out of position. In operation, an operator or an autoloader can place a sleeve of covering material on one or more chutes 30, select the order of presentation (based on the type of product being dispensed and/or the type of covering material desired), and proceed to move the chutes serially into operative position so as to be aligned with the product pusher assembly 20 and the clipper 40. In this manner, the apparatus 10 can be preloaded or reloaded with covering material limiting any downtime associated therewith.

Figure 10B:
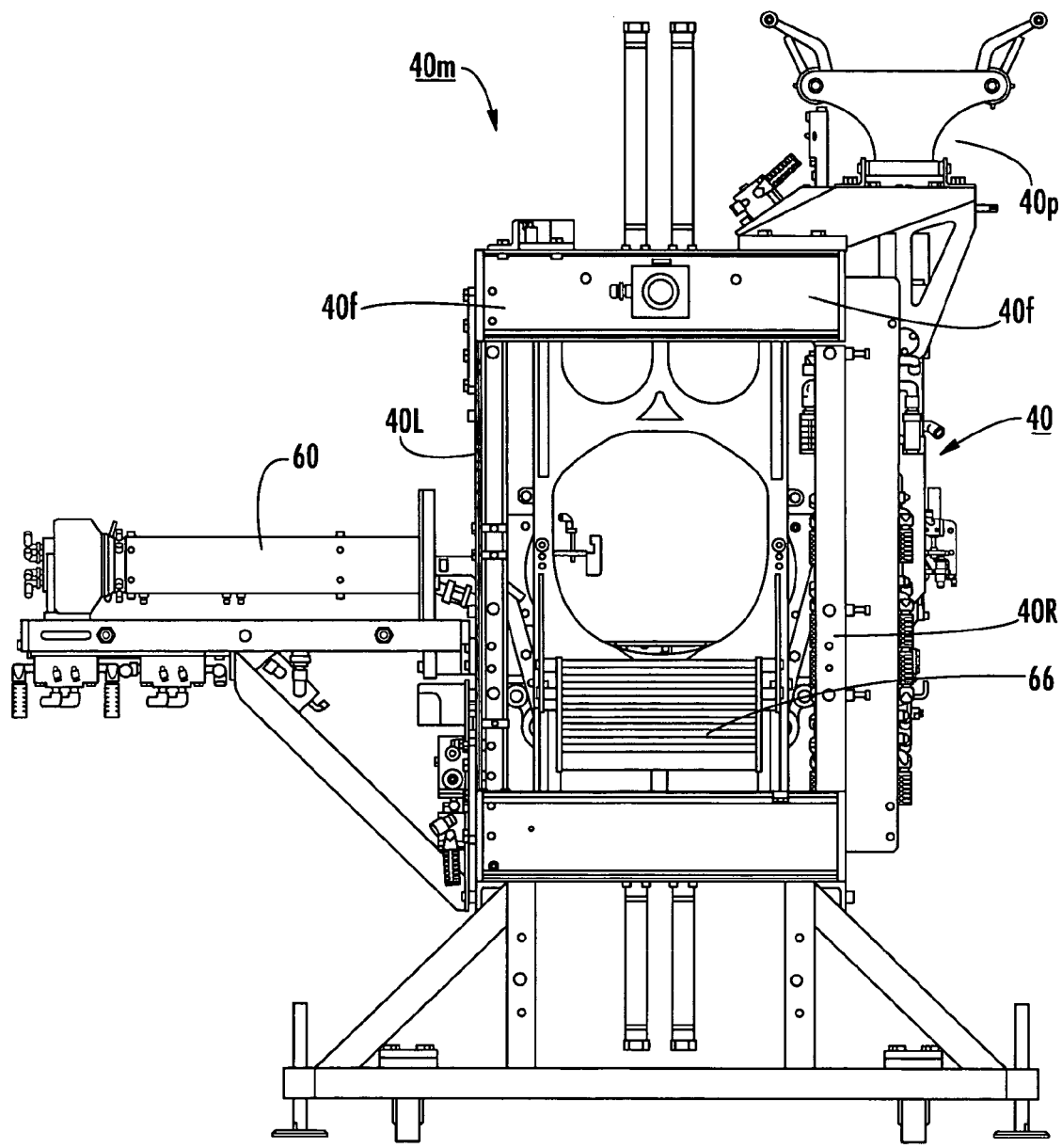
FIG. 10B is an opposite side view (downstream-end) of the CVH module shown in FIG. 10A.

FIGS. 7–9 and 12A illustrate a downstream module 40m which can be a discrete portion of the apparatus 10 according to certain embodiments of the present invention. FIGS. 10A and 10B illustrate the module 40m shown in FIGS. 7–9 with housing guards 11 removed and FIG. 12B, 13A–13D illustrate the module 40m' shown in FIG. 12A with the guards 11 removed. When the handle maker 60 is not assembled, a planar housing sidewall 11s can be used to close the module 40m as shown in FIG. 12A.

As described above, the handle maker 60 and frame 40f can also be configured to allow the handle maker 60 (as well as the clipper 40) to mount to either the left or right hand side 40L, 40R, respectively, of the frame 40f (and primary product travel path) with their respective housing guards 11 likewise mountable to either side. Typically, the handle maker 60 (where used) will mount to a different opposing side of the frame 40f from the clipper 40. An example of a suitable handle-maker is described in U.S. Pat. No. 6,729,102, the contents of which are hereby incorporated by reference as if recited in full herein.

The frame 40f can have pre-formed apertures, brackets, or other structures or members that can allow the clipper 40 and/or handle maker 60 to mount to the desired side of the frame 40f without customizing the frame for a particular customer. The clipper 40 will typically mount to a top portion of the frame 40f in a manner that allows the clipper 40 to dynamically retract and advance into clipping position as discussed above. For example, as shown in FIGS. 10A and 12A, the clipper 40 is mounted to an upper portion of the right hand side of the frame 40f using a coupler member 240. In operation, the clipper 40 moves inward to a desired clip location. The coupler member 240 can alternatively be assembled to the upper portion of the left hand side of the frame 40f allowing the clipper 40 to move inward to the same operative location. The frame 40f and the clipper 40 and/or handle maker 60 are also modular to be able to provide several build options so as to be assembled to the desired side of the frame during manufacturing assembly to meet a customer's order without customizing each component for each customer. This will allow a decrease in labor, less single-purpose inventory, and/or faster build cycles. For example, a modular frame 40f may have additional apertures over specific use frames. Unused apertures may be sealed, filled or closed for sanitary reasons, such as with fasteners or plugs.

In any event, the modules 40m, 40m' are arranged to align with the chute 30 such that the discharge end portion of the product chute 30d terminates proximate the clipper 40. The modules 40m, 40m' are configured to hold the clipper 40 so that the clip window 140w (FIG. 17) can be generally axially aligned with a desired axial location of the product travel path in the full clip position (see the centerline location illustrated in FIG. 8), typically the axial centerline of the chute 30, irrespective of whether the clipper 40 is mounted to the right or left hand side of the frame 40f.

As described above, the apparatus 10 can include a brake assembly with brake gripping members 90 (FIG. 10). FIG. 10 illustrates the gripping members 90 are housed in the clipper module 40m, 40m' and, in position, reside adjacent the sidewalls of the chute 30. The brake assembly can inhibit an excessive quantity of covering material from being pulled off the chute 30 during product insertion into the covering. The brake assembly may be particularly suitable for use with netting covering materials. In addition, the product covering can be held (stretched axially) to be relatively tight and substantially centered about the encased product. The tightness or tension of the covering material may be adjusted by varying the force that the gripper members 90 apply to the chute 30. Where a pneumatic cylinder is used to automatically operate the brakes, the force/tension adjustment can be carried out by adjusting the air pressure delivered to the cylinder. A pressure regulator for this operation may be disposed on the HMI 55 (FIG. 1).

In some embodiments, the modules 40m, 40m' include a product-holding member (i.e., product clamp) that can automatically be moved into position by actuating a clamp drive cylinder, thereby blocking the product from moving further downstream (not shown). See, e.g., co-pending, co-assigned U.S. Provisional Patent Application Ser. No. 60/508,609, Filed Oct. 3, 2003, the contents of which are incorporated by reference herein. The optional holding member may be configured to actuate to its operative holding position prior to retraction of the product pusher assembly 20 and/or to clamp onto the encased product to inhibit the product from migrating back into the chute as the product pusher head 20h is retracted. The holding member can also hold the encased product so that the upstream covering material is relatively firmly or tightly held proximate the clipper 40 and/or facilitate centering the covering material during the gathering and clipping operations. The holding member can be integrated with the handle maker 60 (where used) or it can be a separate component. Co-pending, co-assigned U.S. Provisional Application filed Jun. 15, 2004 and identified by Attorney-Docket No. 9389-15PR further describes a flap configuration that can be used to hold the product and co-pending, the contents of which are hereby incorporated by reference as if recited in full herein. Thus, other discharge tables or product holding members may be used in lieu of and/or with the table 66.

Figure 12C:
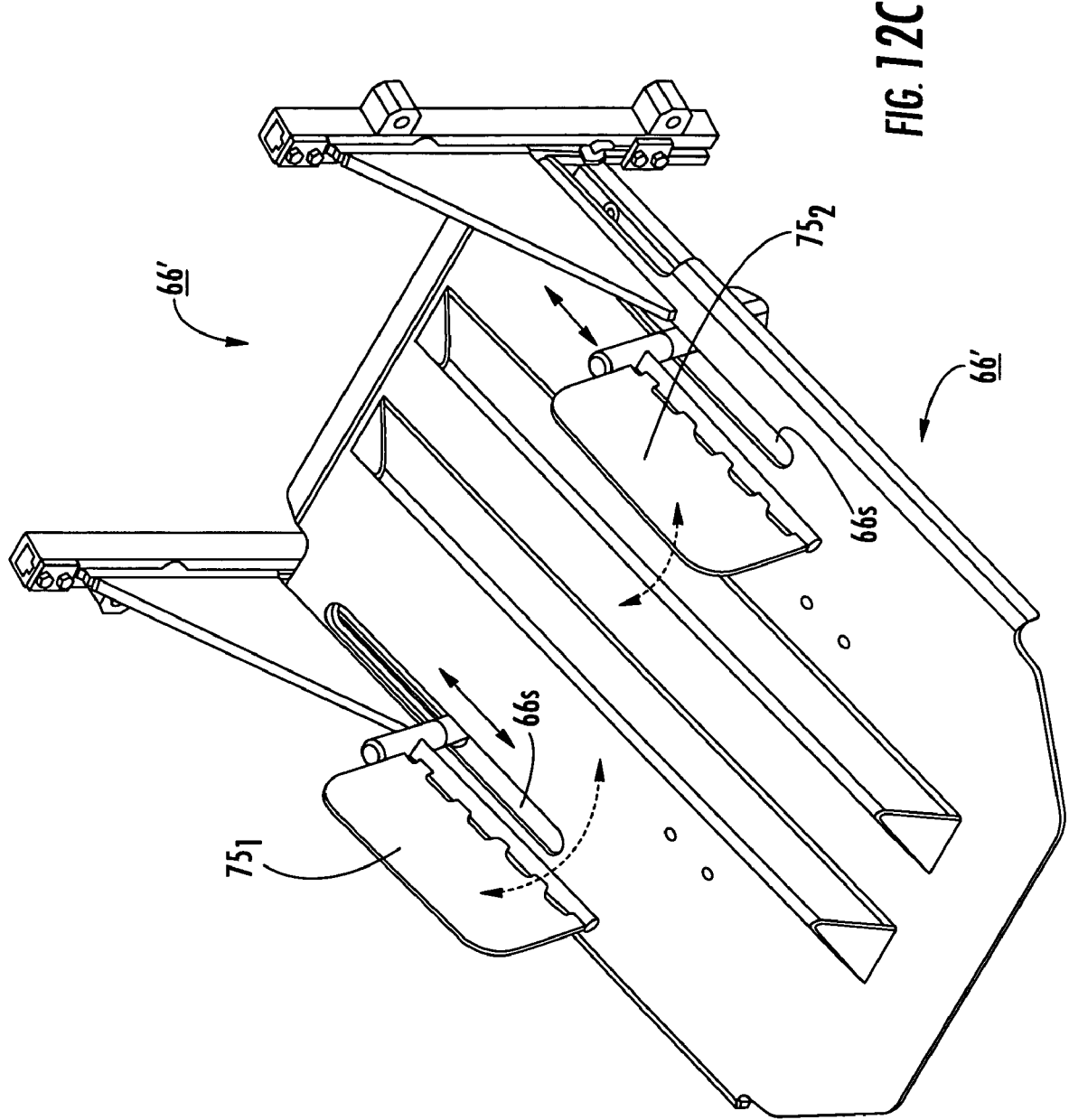
FIG. 12C is a perspective view of an alternative interchangeable discharge tray and/or table according to embodiments of the present invention.
Figure 12D:
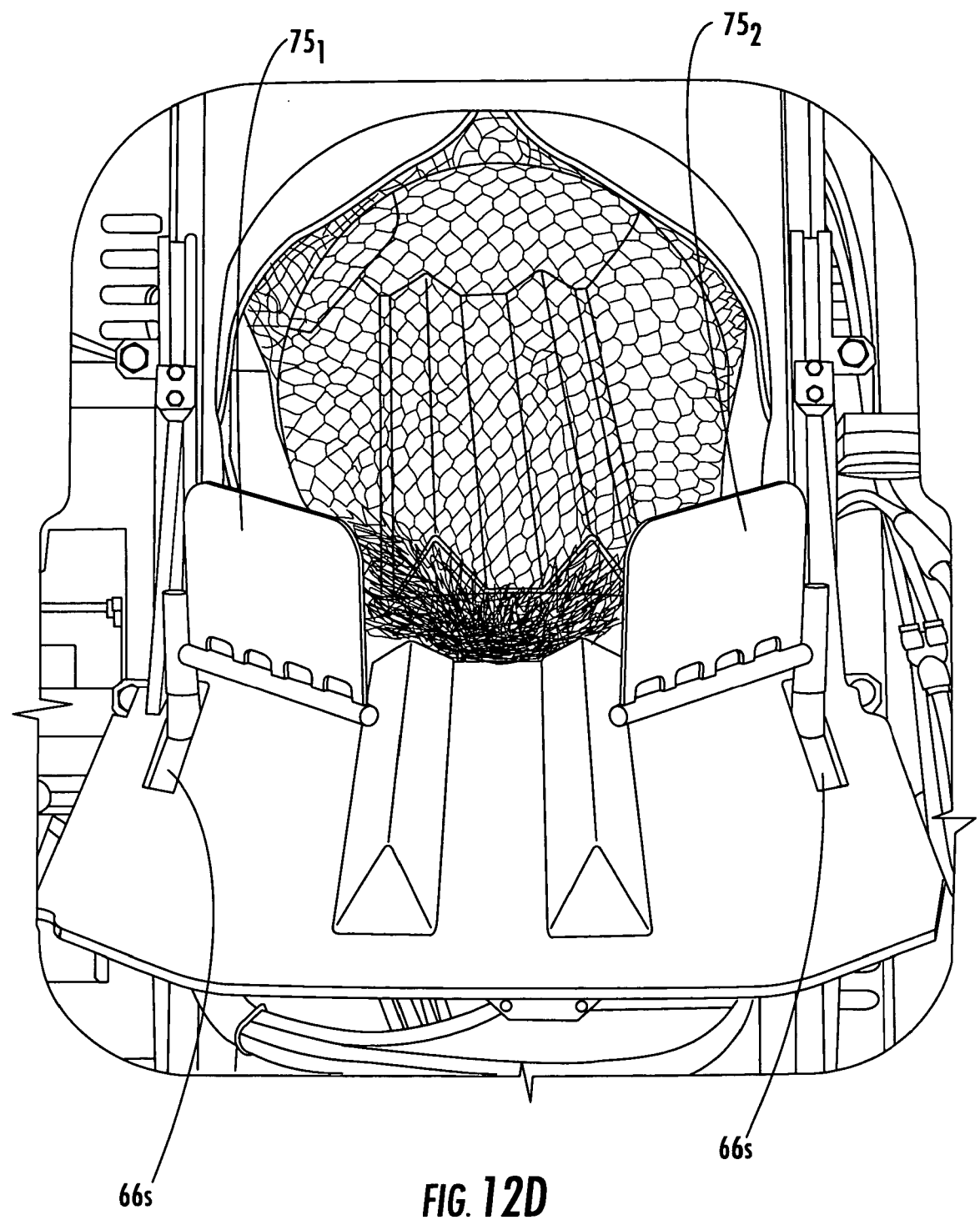
FIG. 12D is a view looking upstream of an exemplary discharge table with holding flaps disposed downstream of a netting chute according to embodiments of the present invention.
Figure 13A:
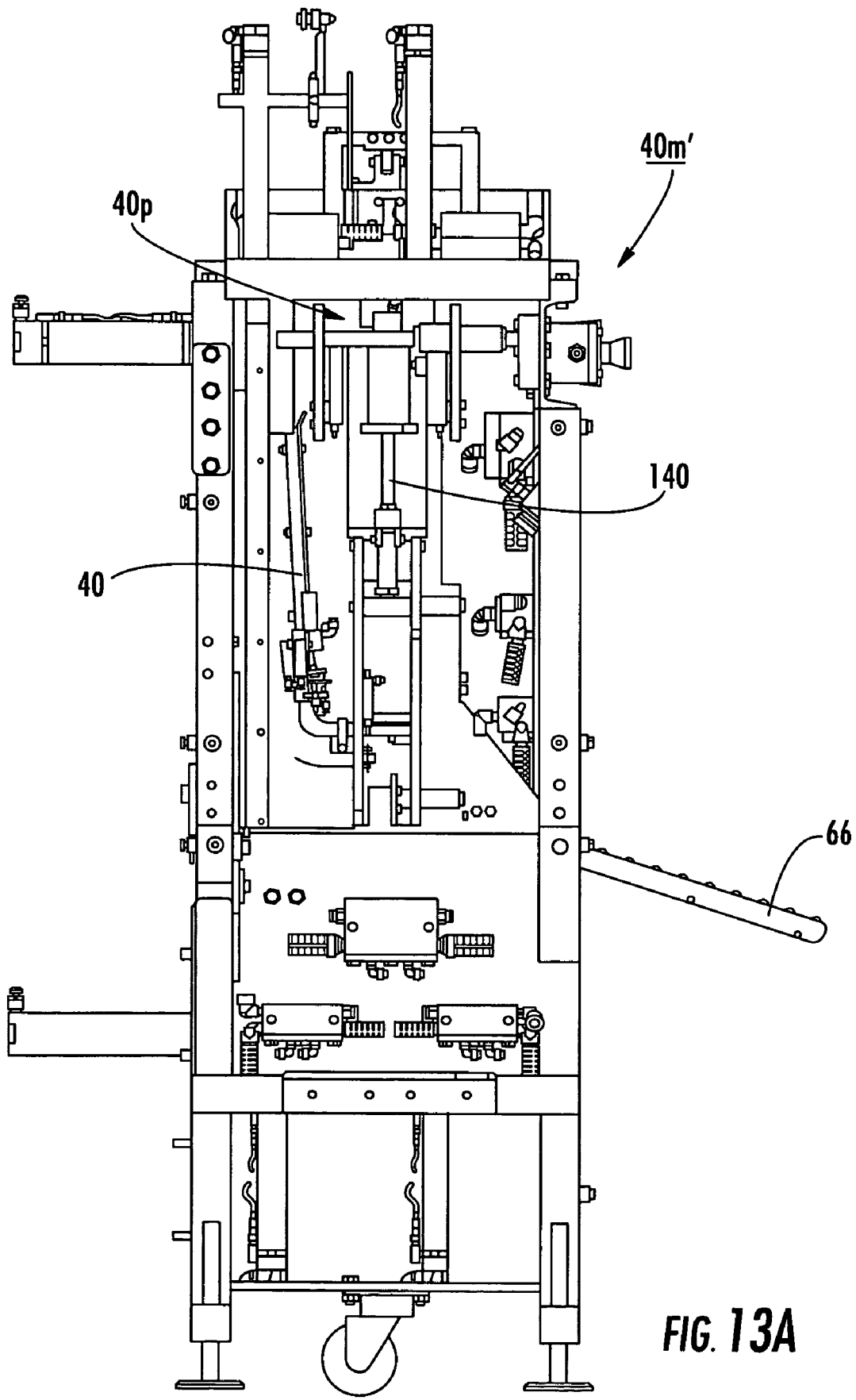
FIG. 13A is a rear view of the VC module shown in FIG. 12B.
Figure 13B:
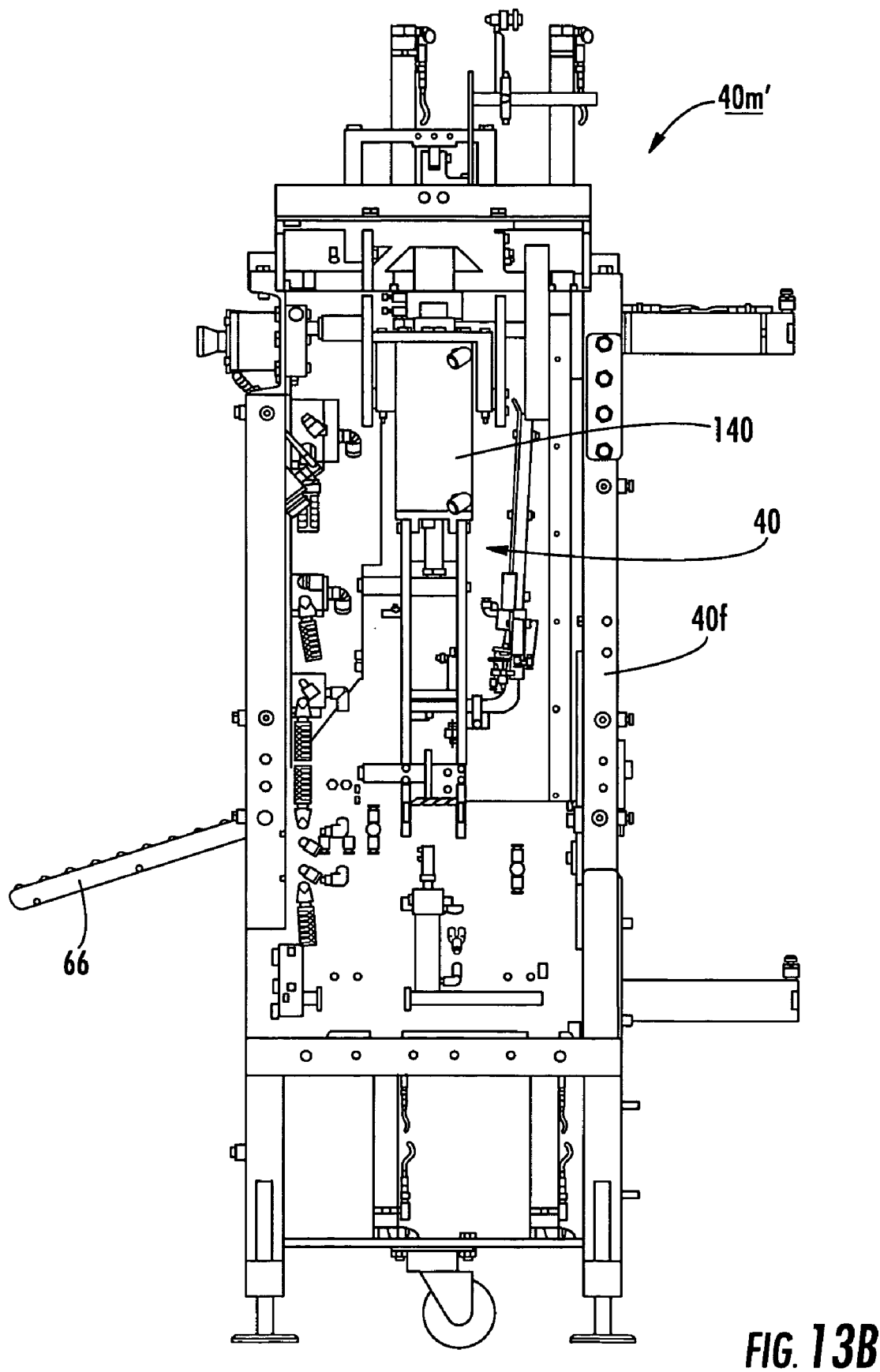
FIG. 13B is a front view of the VC module shown in FIG. 13A.
Figure 13C:
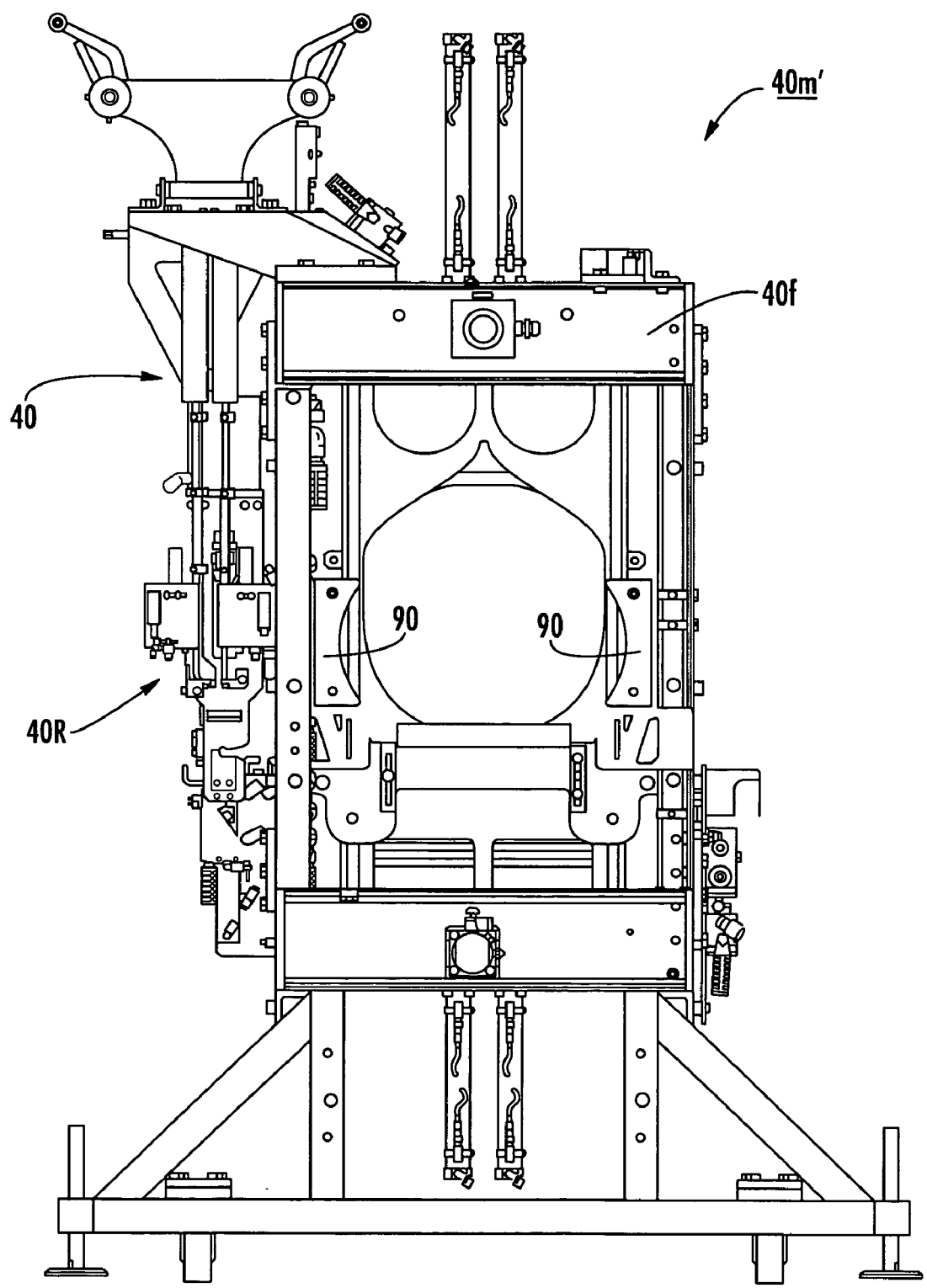
FIG. 13C is a right hand (upstream-end) view of the VC module shown in FIG. 13A.
Figure 13D:
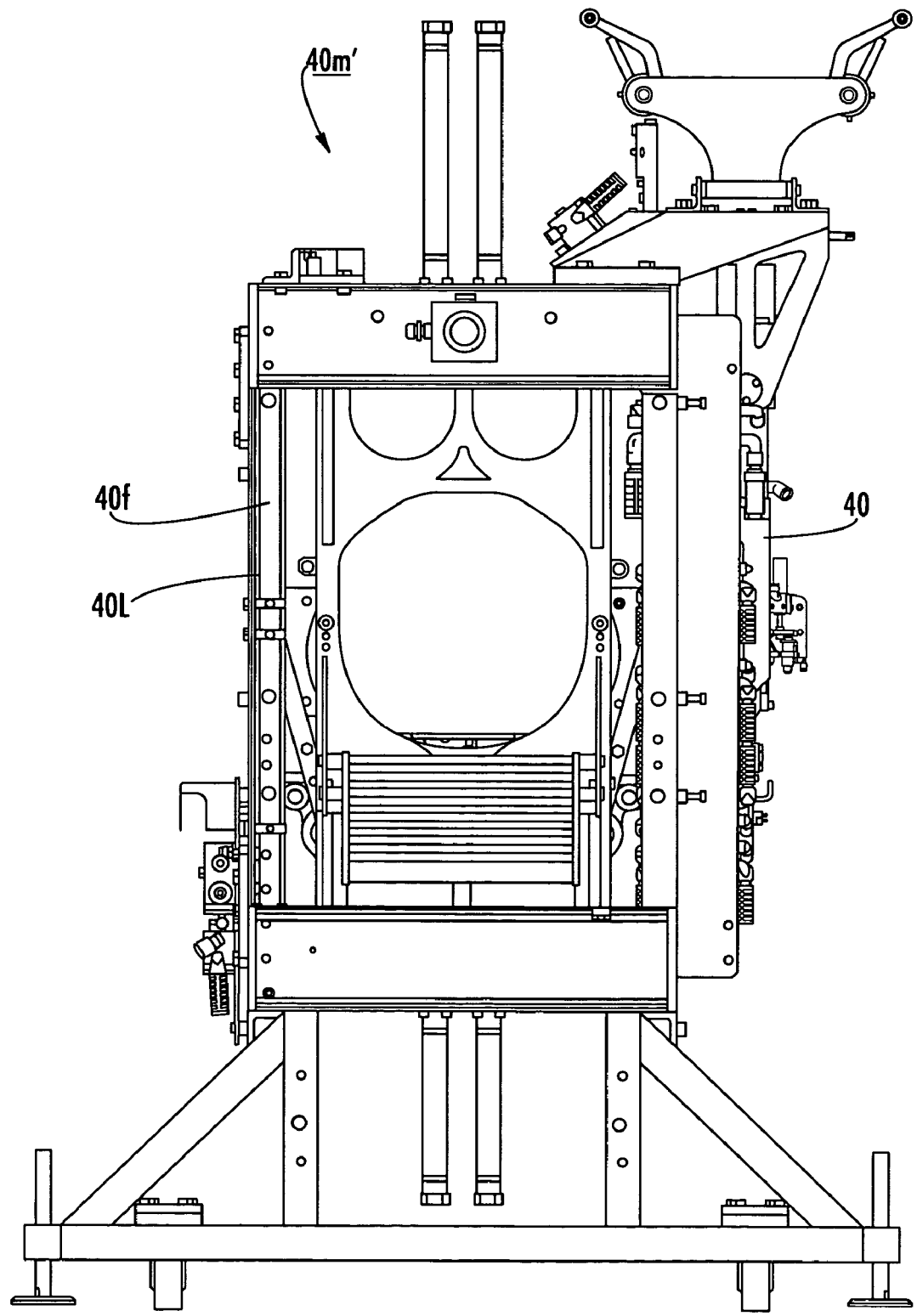
FIG. 13D is a left hand (downstream-end) view of the VC module shown in FIG. 13A.

In certain embodiments, as shown in FIG. 12C, the discharge table 66' is interchangeable with that shown in FIG. 12B. The table or tray 66' includes two slots 66s, each holding a translatable flap $75_1$, $75_2$ with a leg that travels in a respective slot. The flaps $75_1$, $75_2$ can automatically move upstream and downstream and pivot to move closer together (FIG. 12D). The flap configuration can be configured to orient a bone in a bone-in ham product so that the product can be clipped on the bone end, such that the netted product hangs generally straight and provides additional spiral cuts as the spiral cut is performed on the axis of the bone.

The actuation of the holding member can be controlled by the PLC using proximity sensors and operation feedback as will be understood by one of skill in the art. The discharge table 66 may be stationary (with or without rollers as shown). In other embodiments, the product table 66 may include a traveling floor (such as a conveyor) that advances the packaged product to another processing or subsequent workstation (not shown).

FIG. 14 illustrates that the front end of the apparatus 10 can include a frame 10f that is modular. The frame 10f holds the chute 30 and the pusher assembly 20 (FIG. 1). The frame 10f may also hold the in-feed conveyor 50 (FIG. 1), a control box 155 and PLC interface 55. The frame 10f can be configured to accommodate different size interchangeable chutes 30 and/or different widths of conveyor 50. For example, the apparatus 10 can operate with larger and smaller chutes 30, which can be placed on the frame 10f at the OEM site and/or at a use site, depending on a particular product/use. The chute widths may range from between about 9–13 inches and the height of the chutes 30 may be between about 5–12 inches. A smaller chute 30 may have a cavity that is about 9 inches wide by 5.75 inches tall while a larger chute 30 may have a cavity that is about 13 inches wide by about 11.25 inches tall. The chutes 30 may have a length (at least for the portion having a generally constant cross-sectional area) that is between about 28–30 inches. The chutes 30 may also have a flared or funnel-like entry portion 30f (FIG. 3) with a length of about 4–10 inches. The funnel 30f may be formed with larger flares for the larger chutes. In addition, the apparatus frame 10f may accommodate conveyors 50 having widths that are between about 18–24 inches wide.

FIGS. 15A–15C illustrate one example of a clipper mechanism 40. The clipper 40 can include a pivot attachment which can be supported by the frame 40f (such as by two trunnion type arms as shown in FIG. 10) to pivotally mount the clipper to the frame 40f. The clipper 40 can include a curvilinear clip rail or channel 41 that is in communication with the clip window 40w to automatically supply clips to the underlying covering material. The clipper 40 may be particularly suitable for clipping netting but may be used for other materials as well. The clipper 40 can be configured to attach to the coupling member 240 to suspend the clipper from the frame 40f as shown for example in FIG. 10.

As is well known to those of skill in the art, in operation, the clipper 40 defines a closure/clip delivery path using a clip rail 41 in communication with the clip window 40w in a clip channel for receipt of a U-shaped metal clip. The clip is advanced in the closure path or channel by means of a punch so that the clip will engage a die positioned in a manner permitting the clip to be formed about gathered material that encases the product in the material at a closure zone in the product travel path. Although not illustrated, pressurized air or other means of pressing or moving the clip to close about the tubular package may also be used. As shown, the guide rail 41 can have a curvilinear configuration with a vertical run which is curved at its lower end so that it gradually merges into a horizontal run to direct clips mounted thereon into the window 40w. The clips are typically arranged in a stack with adjacent clips abutting each other so that the legs of each clip fit around the guide rail with a crown of each clip fitting over the guide rail. The multiple clips may be connected to one another by means of a thin elastomeric film, tape or adhesive (typically along the crown) so that the clips together may slide down the guide rail and around the bend therein between the vertical and horizontal runs of the guide rail. Typically, clips are provided in a coil or on a reel for feeding onto the guide rail. Although illustrated herein as a generally vertical and downwardly directed clip feed, other feed orientations may also be employed.

As shown in FIGS. 15A–15C, the clipper 40 can include a cutting member 165 mounted to a lower portion of the clipper body. The cutting member 165 is configured to cut from the bottom up. The cutting member 165 can be configured to move in concert with the clipper 40 as the clipper 40 moves to its home and full clip position (and, where used, to the pre-clip position). As shown, gathering plates 141 and 142 can be mounted to the lower portion of the clipper 40 with the clip window 40w therebetween. When the clipper 40 is in its full-clip position, such as in the orientation shown in FIG. 15A, the cutting member 165 is generally vertically oriented and disposed under the gathering plate windows 141w, 142w, respectively. The cutting member 165 can then rise to sever the gathered and typically clipped or otherwise closed/sealed covering about the package. The cutting member 165 can be in communication with an actuator 165c that automatically extends the cutting member into the cutting position, then retracts the cutting member 165. The cutting member 165 can reside and slidably travel in a cutting guide 166 having a channel 166c. The guide 166 can be aligned with the gathering plates 141, 142, typically disposed axially intermediate thereof, and can be attached to the clipper 40. In other embodiments, the guide 166 may be formed into a gathering plate (not shown). Typically, the guide 166 is disposed proximate but upstream of the clipping location, at least where a single clip is applied. Where two spaced-apart clips are applied to the gathered covering, the guide 166 can be held intermediate the two clip locations to provide the desired cut location.

Figure 16:
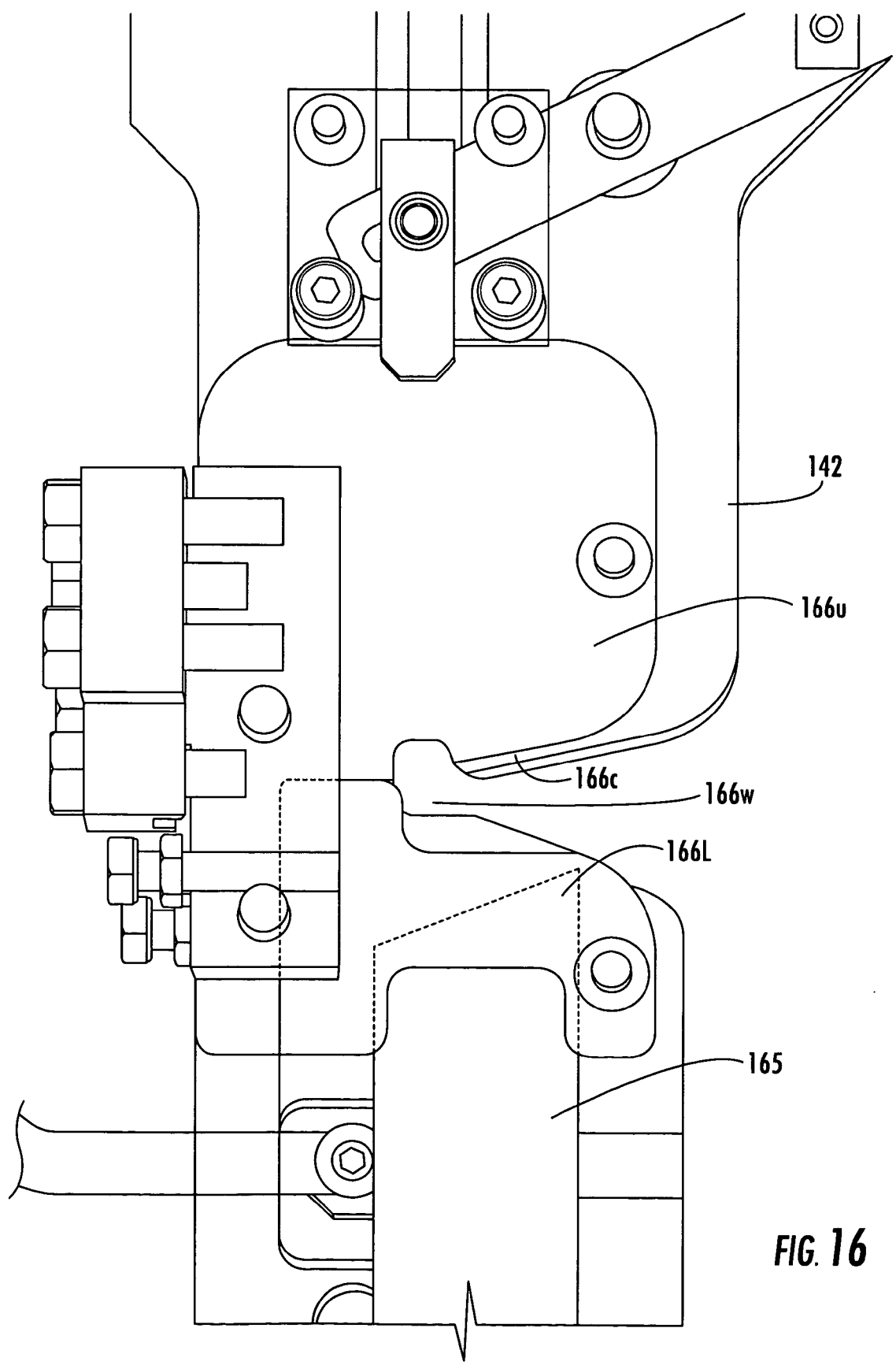
FIG. 16 is a greatly enlarged opposite side view of the clipper module shown in FIG. 15A.
Figure 17:
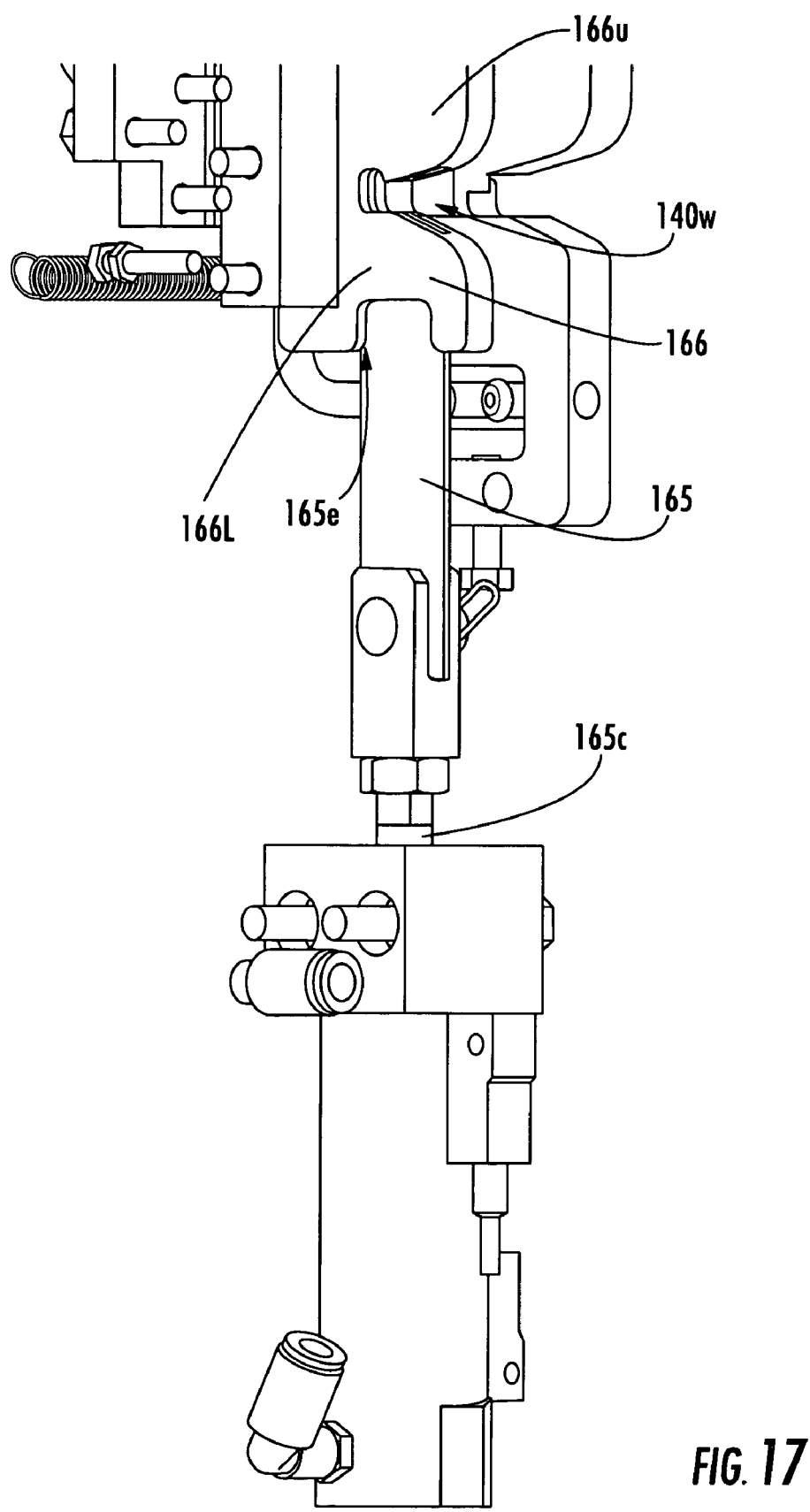
FIG. 17 is a greatly enlarged left-hand perspective view of the cutting member attached to the clipper module according to embodiments of the present invention.
Figure 18:
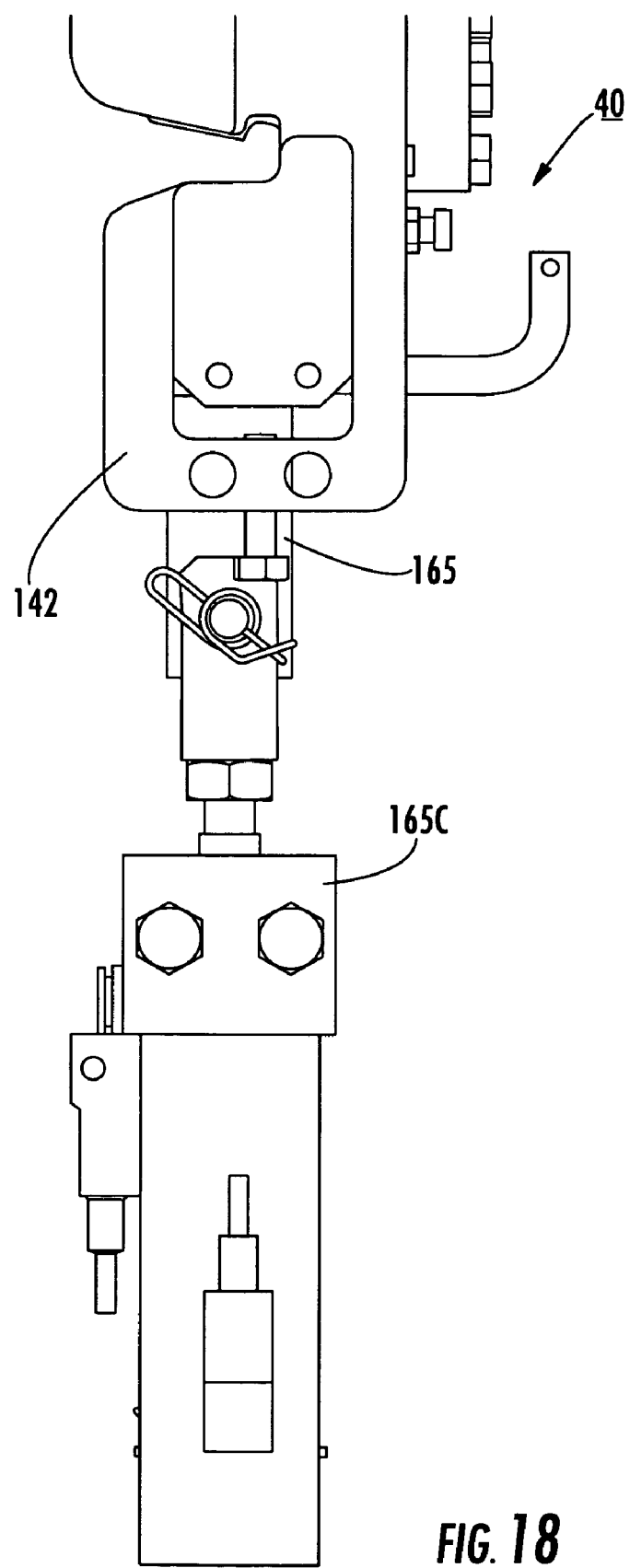
FIG. 18 is a right-hand view of the cutting member and clipper module shown in FIG. 16.

FIGS. 16–18 are enlarged views of the cutting member 165. FIG. 16 is illustrated with certain features shaded so that the underlying cutting knife and cutting channel are visible. The cutting guide 166 has opposing upper and lower portions, 166u, 166l, respectively, with an intermediate window portion 166w extending intermediate thereof. The window portion 166w can be aligned with the gathering plate window. The cutting guide channel 166c can extend both in the upper and lower portions of the guide 166. In operation, the cutting member 165 slides upwardly in the lower channel 166c, extends across the window 166w and into the channel 166c in the upper portion 166u of the cutting guide 165. The cutting guide channel 166c can be formed into a unitary body. Alternatively, the cutting guide 166 can comprise two members with generally planar downwardly extending sidewalls that are spaced apart a distance sufficient to receive and allow the cutting member 165 to slide while retained in a desired alignment. The two spaced apart members may be plates and/or the channel 166c may be generally planar. The cutting member 165 can be configured to remain in the lower body channel 166l during periods of non-use.

As shown in FIG. 17, (with one gathering plate omitted for clarity) one long edge portion 165e of the cutting member 165 can be retained in the cutting guide channel 166c as the cutting member 166 travels across the guide window 166w into the extended cutting, shearing and/or severing position. Where used, this positive retention of the cutting member 165 may provide additional alignment stability in some applications. The cutting member 165 may be a generally planar blade with a leading angled knife-edge portion as shown in FIG. 16. Other cutting techniques can be used including, but not limited to, heat (of whatever type), water, pressure, and other knife and/or blade shapes, as well as combinations thereof. Accordingly, the term "cutting" as used herein is used broadly to mean separating and/or severing adjacent portions of covering material and is not limited to physically cutting with a sharp implement.

In addition, it is noted that the present invention is not limited to a bottom-up cutting operation as top-down cutting mechanisms can be used such as, for example, hot-knife devices are described in U.S. Pat. Nos. 4,683,700 and 5,161,347, the contents of which are hereby incorporated by reference as if recited in full herein.

The clipper 40 can include a plurality of spaced apart gathering plates 141, 142 that are configured to automatically gather a portion of the tubular or sleeve of covering material (held in tension) to form the material into a rope-like and/or compressed configuration in preparation for receiving the clip(s) thereabout. Pairs of cooperating plates can be positioned to retractably travel axially in the product travel path toward and away from each other. As shown, the gathering plates 141, 142 may be mounted to the clipper 40 and can be described as clipper gathering plates. See co-pending, co-assigned U.S. Provisional Patent Application Ser. No. 60/508,609 for additional description of gathering plates, the contents of which have been incorporated by reference hereinabove. In addition or alternatively, voider plates (shown for example as members $69p_1$, $69p_2$ in FIGS. 11B, 11C) can be configured to gather or compress the covering material that extends between the clipper 40 and the product chute discharge end portion 30*d*.

In operation, once the covering material is gathered, a clip or clips can be applied to secure the encased product in the covering material. The covering material can then be severed to release the encased product in the clipped package. In certain embodiments, two clips are applied substantially concurrently proximate to each other using a dual clipper so that one clip closes the trailing edge of the covering material forming a first encased package and the other closes a leading edge of the covering material forming the next encased package. The clipped configuration of the covering material encasing the product may be configured to substantially conform to the shape of the enclosed product(s) or may be more loosely configured.

In certain embodiments, after the product moves by (and may be stopped by the product-holding member 75 (FIG. 12C)), the clipper 40 moves into its full-clip position (either from a home or pre-clip position) with its actuation cylinder 140, which also moves the gathering plates 141, 142 as well as the cutting member guide 166 and cutting member 165 toward the centerline of the travel path. The terms "actuator" or "actuation cylinder" are used generically to indicate any type of automatically moveable actuation member.

In some embodiments, the gathering plates 141, 142, guide 166 and cutting member 165 are mounted to the clipper 40 (i.e., clipper gathering plates) to move in concert therewith. As the clipper 40 is rotated into position, the clipper gathering plates 141, 142 automatically start the gathering operation. In certain embodiments, the modules 40*m*, 40*m*' can include additional gathering plates (not shown) that may be positioned on the opposing side of the travel path and which may be configured to laterally linearly translate into and out of operative position. In certain embodiments, each gathering plate can be mounted so that in operative position they are horizontally and vertically aligned with the corresponding centerlines of the product chute cavity 30*c*.

Summarizing some embodiments, when a product or target object enters the product transfer zone 65 (FIG. 1), its presence can be automatically determined and the apparatus controller can then activate an automated cycle. The automated cycle can include: stopping the infeed conveyor from advancing and actuating the product pusher assembly cylinder 21. The product pusher head 20*h* attached to the product pusher cylinder 21 and guide rods 22, 23 advance to engage the target product, which is pushed through the product chute 30 encased in covering material (e.g., netting) upon exit from the product chute 30. Upon exiting the product chute 30, the encased product is pushed onto the product table 66. When the product pusher head 20*h* reaches the end of its forward stroke, its position is detected by a sensor such as a Hall-effect switch, and the product holding member 75 is actuated. Then, the product pusher assembly head 20 is retracted into the product chute before the covering material is gathered and clipped. The product pusher cylinder 21 does not have to be fully retracted prior to initiation of the automated gathering and clipping operations. Once the product pusher head 20*h* clears the discharge end of the product chute 30 or reaches its desired travel stroke extension position, an intermediate sensor, such as another Hall-effect switch, typically placed on the product pusher cylinder 21, senses the partial retraction thereof. When the sensor is activated, the apparatus 10 can automatically (i.e., typically via the PLC) proceed to initiate the handle making (where used), gathering and clipping operations.

Thus, proximate in time to the retraction of the pusher head 20*h*, the clipper 40 automatically pivots into pre-clip position, thereby advancing the clipper gathering plates (where used) to the product centerline to converge the covering material into a rope-like configuration. One or two closure clips can then be applied thereto. The downstream clip ends the first product and the upstream clip defines the first end portion of the next product. The cutting cylinder is actuated and the covering material is severed between the two clips. Once the severing is complete, the cutting cylinder is retracted and the apparatus 10 can automatically start a reset cycle, returning the clipper 40 to its home position. The product-holding member 75 can be moved and the product released to travel downstream. When the clipper 40 and gathering plates 141, 142 are substantially in their home position, the apparatus 10 can begin the cycle again. When the product pusher assembly 20 reaches its retracted configuration, the infeed conveyor 50 can be started again so that when the reset is complete, another product is in position for entry into the product chute 30. In each case if a product is not detected in the transfer zone 65 in a predetermined time, the apparatus 10 can shut off and wait for a start signal to reactivate the process/apparatus, such as via a pushbutton at the HMI station.

The operation and sequence of certain events can be controlled by a programmable logic controller. Certain operations may be selected by an operator input using a Human Machine Interface to communicate with the controller as is well known to those of skill in the art.

Figure 19:
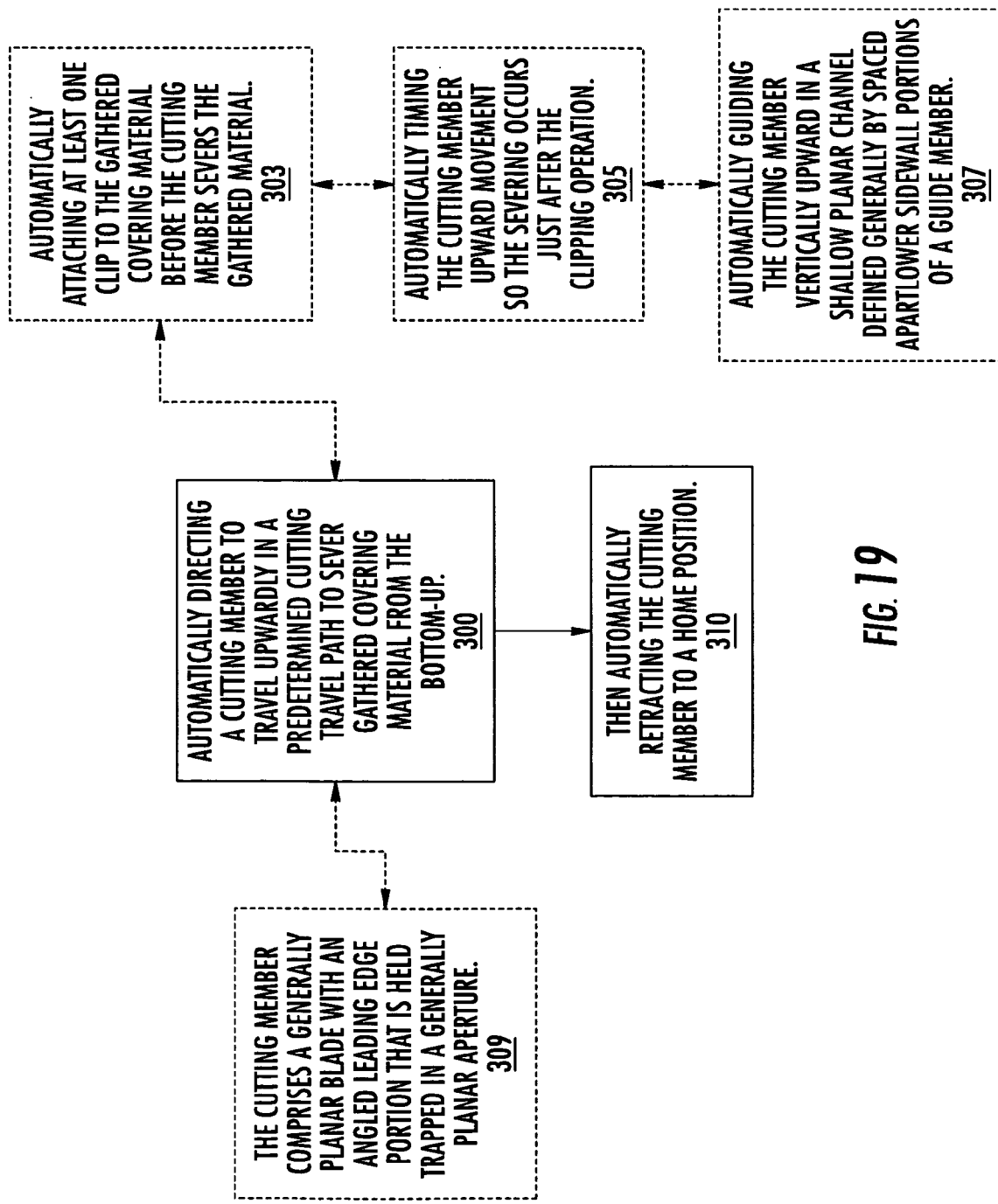
FIG. 19 is a flow chart of operations that can be carried out according to embodiments of the present invention.

FIG. 19 illustrates exemplary operations that may be carried out according to embodiments of the present invention. As shown, a cutting member can be automatically (including semi-automatically) moved upwardly in a predetermined travel path to sever gathered covering material from the bottom-up (block 300). The predetermined direction can be in a direction that is generally orthogonal to a product travel path to sever gathered covering material. The cutting member can then be automatically retracted to a home position (block 310).

In some embodiments, the operations can also include automatically (which includes semi-automatically) attaching at least one clip to the gathered covering material before the cutting member severs the gathered material (block 303). The cutting member can be timed to move upward so that the severing occurs just after the clipping operation (block 305). The cutting member can be automatically guided vertically upwardly in a planar channel defined by spaced apart sidewalls of a guide member (block 307). The cutting member may include a generally planar blade with an angled leading edge portion that is held trapped in a generally planar aperture (block 309).

Figure 20:
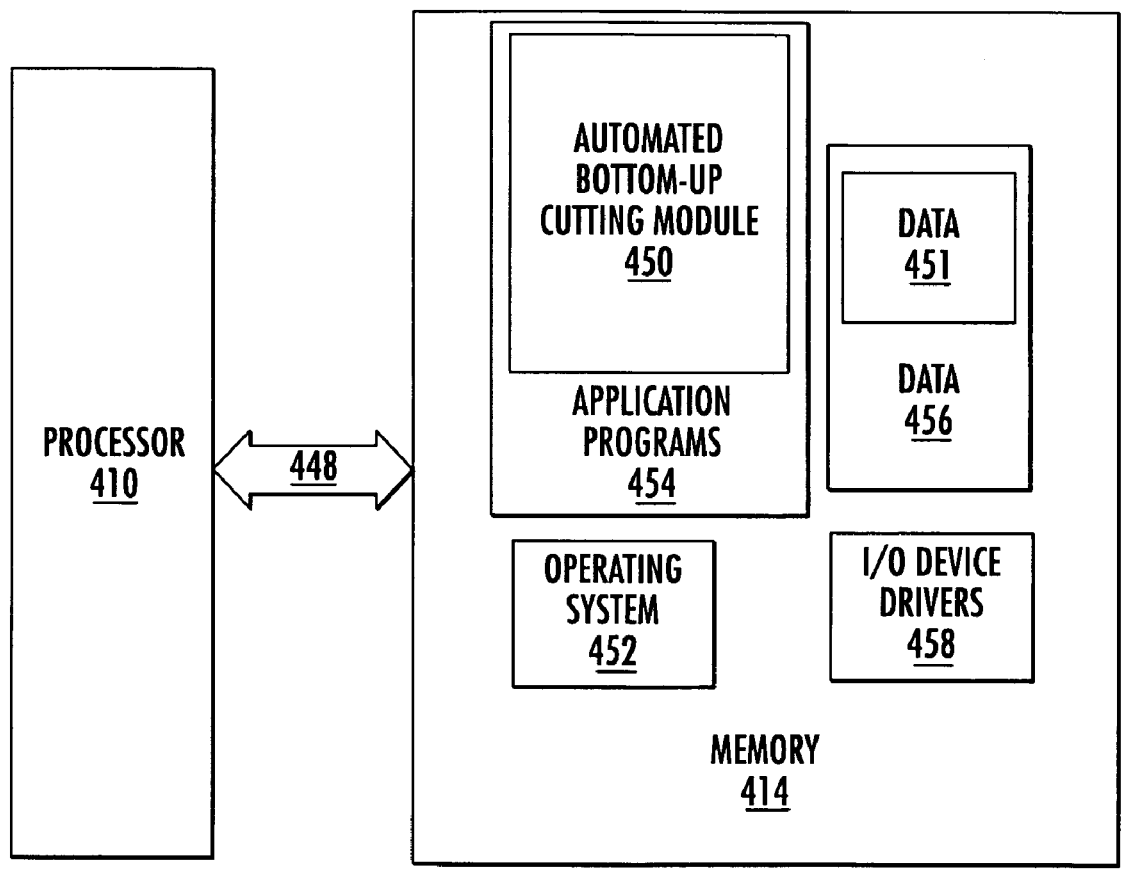
FIG. 20 is a block diagram of a data processing system/computer program according to embodiments of the present invention.

FIG. 20 is a block diagram of exemplary embodiments of data processing systems that illustrates systems, methods, and computer program products in accordance with embodiments of the present invention. The data processing systems may be incorporated in a programmable logic controller (such as station 55) and/or be in communication therewith. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIG. 20, the memory 414 may include several categories of software and data used in the data processing system: the operating system 452; the application programs 454; the input/output (I/O) device drivers 458; the Automated Bottom-Up Cutting Actuation Module 450; and the data 456.

The data 456 may include a look-up chart of different products, covering material, proximity sensor feedback, safety interlock circuits and the like 451 corresponding to particular or target products for one or more producers, which may allow additional force to cut the gathered material and/or time the cutting to a desired cycle for a shift and/or production run and the like.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components. The application programs 454 are illustrative of the programs that implement the various features of the data processing system and can include at least one application, which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Automated Bottom-UP Actuation Module 450 being an application program in FIG. 20, as will be appreciated by those of skill in the art, other configurations may also be utilized while still benefiting from the teachings of the present invention. For example, the Module 450 may also be incorporated into the operating system 452, the I/O device drivers 458 or other such logical division of the data processing system. Thus, the present invention should not be construed as limited to the configuration of FIG. 20, which is intended to encompass any configuration capable of carrying out the operations described herein. Further, the Module 450 can be used to operate other apparatus that may employ other chute, horn, and/or clipper types.

The I/O data port can be used to transfer information between the data processing system, the product pusher, and the closure attachment mechanism or another computer system or a network (e.g., the Internet) or to other devices controlled by the processor. These components may be conventional components such as those used in many conventional data processing systems which may be configured in accordance with the present invention to operate as described herein.

For example, certain embodiments of the present invention are directed to a computer program product for operating an automated clipped (netting) packaging apparatus so that the clipper mechanism operates from either a left or right hand side. The computer program product can include computer readable program code that allows a user to select left hand or right hand clipping mechanism operation, which may be programmed or selected at the OEM site. That is, the controller may have two program sequences, one for operating left hand operation and one for right hand operation (for either or both the handle-maker and/or clipper). During assembly and/or test, an OEM site can lock in the proper operational sequence. In other embodiments, the program is indifferent to which mounting orientation is used and, as such, a common program can be used to operate the apparatus irrespective of which mounting orientation is employed.

The automated/semi-automated packaging apparatus can include an automated product pusher mechanism that advances and retracts from a product chute and an automated clipping apparatus that applies at least one closure clip to netting thereat. The computer program product can include: (a) computer readable program code that automatically controllably actuates a pusher actuation cylinder to push a product pusher in a downstream direction; and (b) computer readable program code that automatically controllably actuates a clipper mechanism to position a clipping apparatus in a clipping position in response to product pushed by the product pusher out of the product chute and covered in netting.

In particular embodiments, the computer program product can also include one or more of: (a) computer readable program code that automatically controllably actuates netting gathering plate actuation cylinders to laterally translate the plates toward the clipper mechanism; (b) computer readable program code that automatically controllably actuates a package holding member to maintain a product held in netting in alignment with the clipper mechanism; (c) computer readable program code that monitors a proximity sensor positioned to detect when a product is in position to be packaged and then automatically controllably actuates the pusher cylinder in response thereto; (d) computer readable program code that prevents actuation of the pusher cylinder when the product chute is not in proper position; (e) computer readable program code that actuates a cutting tool actuation cylinder to controllably advance the cutting tool and automatically sever netting intermediate two clips thereon; (f) computer readable program code that supplies heat to the cutting tool; (g) computer readable program code that automatically actuates clip pushers in the clipper mechanism when netting is gathered and in position for clipping at the clipping window; (h) computer readable program code that controls the actuation of a braking mechanism to advance the braking mechanism to contact the product chute and selectively apply pressure to netting thereat; (i) computer readable program code that automatically controllably actuates the pusher actuation cylinder to pull a product pusher in an upstream direction out of the product chute; and (j) computer readable program code that automatically controllably actuates the clipper mechanism to remove the clipping apparatus from the clipping position.

While the present invention is illustrated, for example, with reference to particular divisions of programs, functions and memories, the present invention should not be construed as limited to such logical divisions. Thus, the present invention should not be construed as limited to the configuration of FIG. 20 but is intended to encompass any configuration capable of carrying out the operations described herein.

The flowcharts and block diagrams of certain of the figures herein illustrate the architecture, functionality, and operation of possible implementations of selective implementation of single and dual clip closure means according to the present invention. In this regard, each block in the flow charts or block diagrams represents a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims.

In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A system for enclosing at least one product in a covering material, comprising:
    an elongate product chute having an outer surface and opposing receiving and discharge end portions with an interior cavity extending therethrough;
    a product pusher mechanism that is configured to controllably and automatically advance into and retract from the product chute to thereby advance a product through the product chute and out of the discharge end portion of the product chute;
    a clipper mechanism pivotably attached to a mounting frame and disposed downstream of the product chute, wherein the clipper mechanism pivots from a home to a full-clip position in cooperating alignment with the product chute, the clipper mechanism configured to apply at least one clip to a covering material that encloses the product after the product exits the product chute;
    a cutting member disposed downstream of the product chute, the cutting member configured to cooperate with the clipper mechanism to, in operation, automatically pivot with the clipper mechanism as the clipper travels from the home to the full clip position, then automatically travel generally upwardly to sever adjacent portions of covering material from an underside to top side thereof; and
    at least first and second spaced apart gathering plates in communication with the clipper mechanism for automatically gathering a length of a leading and/or trailing edge portion of covering material held about a target product together for clipping by the clipping mechanism;
    wherein a guide member is attached to the clipper mechanism and is disposed intermediate the two spaced apart first and second gathering plates which are attached to the clipper mechanism and pivot in concert in response to pivoting the clipper mechanism, the guide member configured to guide the cutting member upward to sever a target gathered portion of a covering.

2. A system according to claim 1, wherein the guide member comprises opposing lower and upper body portions and a window therebetween, and wherein a cutting member guide channel extends in the upper and lower body portions and the cutting member is configured to travel across the window into the upper body channel during operation.

3. A system according to claim 2, wherein the cutting member is configured to remain in the lower body channel pivoted away from an axial centerline of the system during periods of non-use.

4. A system according to claim 3, wherein the cutting member is a generally planar blade with a leading angled knife edge.

5. A system according to claim 4, wherein the cutting member guide channel is defined by two spaced apart generally planar downwardly extending sidewalls each affixed to the clipper mechanism.

6. A system for enclosing at least one product in a covering material, comprising:
    an elongate product chute having an outer surface and opposing receiving and discharge end portions with an interior cavity extending therethrough;
    a product pusher mechanism that is configured to controllably and automatically advance into and retract from the product chute to thereby advance a product through the product chute and out of the discharge end portion of the product chute;
    a clipper mechanism pivotably attached to a mounting frame and disposed downstream of the product chute, wherein the clipper mechanism pivots from a home to a fill-clip position in cooperating alignment with the product chute, the clipper mechanism configured to apply at least one clip to a covering material that encloses the product after the product exits the product chute; and
    a cutting member disposed downstream of the product chute, the cutting member configured to cooperate with the clipper mechanism to, in operation, automatically pivot with the clipper mechanism as the clipper travels from the home to the full clip position, then automatically travel generally upwardly to sever adjacent portions of covering material from an underside to top side thereof,
    wherein the product pusher is in communication with an actuation cylinder and rod, the actuation cylinder in communication with a pressure regulator that is configured to allow the product pusher to push a product through the product chute, wherein the actuation cylinder operates with a substantially fixed pressure of about 80 psi to push respective products through the chute using a continuous push stroke cycle, and wherein the product pusher comprises a pair of elongate guide rods, at least one being disposed on each side of the actuation rod that is attached to the actuation cylinder, the actuation rod and guide rods being attached to a pusher head, wherein the actuation rod, guide rods and pusher head are configured to reciprocally travel in and out of the product chute whereby the pusher head is configured to controllably automatically advance into and retract from the product chute to thereby advance a product from a position upstream of the product chute, through the product chute and out of the discharge end portion of the product chute.

7. A system for enclosing at least one product in a covering material, comprising:

an elongate product chute having an outer surface and opposing receiving and discharge end portions with an interior cavity extending therethrough;

a product pusher mechanism that is configured to controllably and automatically advance into and retract from the product chute to thereby advance a product through the product chute and out of the discharge end portion of the product chute;

a clipper mechanism pivotably attached to a mounting frame and disposed downstream of the product chute, wherein the clipper mechanism pivots from a home to a full-clip position in cooperating alignment with the product chute, the clipper mechanism configured to apply at least one clip to a covering material that encloses the product after the product exits the product chute; and a cutting member disposed downstream of the product chute, the cutting member configured to cooperate with the clipper mechanism to, in operation, automatically pivot with the clipper mechanism as the clipper travels from the home to the full clip position, then automatically travel generally upwardly to sever adjacent portions of covering material from an underside to top side thereof, wherein the product chute is unsealed and open to environmental conditions at both egress and ingress axially opposing ends thereof, and wherein the product pusher mechanism is configured to limit the travel of the pusher head so that a portion of the pusher head remains inside the product chute while a forward to medial portion exits the product chute at a furthermost operative extension position of the product pusher mechanism.

8. A system for enclosing at least one product in a covering material, comprising:

an elongate product chute having an outer surface and opposing receiving and discharge end portions with an interior cavity extending therethrough;

a product pusher mechanism that is configured to controllably and automatically advance into and retract from the product chute to thereby advance a product through the product chute and out of the discharge end portion of the product chute;

a clipper mechanism disposed downstream of the product chute in cooperating alignment therewith, the clipper mechanism configured to apply at least one clip to a covering material that encloses the product after the product exits the product chute; and a cutting member disposed downstream of the product chute, the cutting member configured to cooperate with the clipper mechanism;

wherein the pusher head comprises an outwardly extending pin that is adapted to pierce and enter the product.

9. A system according to claim 8, further comprising a supply of covering material arranged to surround the exterior surface of at least a portion of the product chute and extend in tension in the downstream direction to automatically cover the product as the product exits the discharge end portion of the product chute.

10. A system for enclosing at least one product in a covering material, comprising:

an elongate product chute having an outer surface and opposing receiving and discharge end portions with an interior cavity extending therethrough;

a product pusher mechanism that is configured to controllably and automatically advance into and retract from the product chute to thereby advance a product through the product chute and out of the discharge end portion of the product chute, wherein the product pusher mechanism comprises a product pusher cylinder and a pair of product pusher guide rods, a respective one disposed on opposing sides thereof;

a clipper mechanism disposed downstream of the product chute in cooperating alignment therewith, the clipper mechanism configured to apply at least one clip to a covering material that encloses the product after the product exits the product chute; and a cutting member disposed downstream of the product chute, the cutting member configured to cooperate with the clipper mechanism.

11. A system for enclosing at least one product in a covering material, comprising:

an elongate product chute having an outer surface and opposing receiving and discharge end portions with an interior cavity extending therethrough;

a product pusher mechanism that is configured to controllably and automatically advance into and retract from the product chute to thereby advance a product through the product chute and out of the discharge end portion of the product chute;

a clipper mechanism disposed downstream of the product chute in cooperating alignment therewith, the clipper mechanism configured to apply at least one clip to a covering material that encloses the product after the product exits the product chute;

a cutting member disposed downstream of the product chute, the cutting member configured to cooperate with the clipper mechanism; and a discharge tray with a floor disposed downstream of the clipper mechanism, the tray having first and second spaced apart upwardly extending flaps that automatically pivot laterally inward to reside closer together to trap a forwardmost position of a respective product in a clip location, then pivot away from each other to allow the clipped product to pass.

12. A system for enclosing at least one product in a covering material, comprising:

an elongate product chute having an outer surface and opposing receiving and discharge end portions with an interior cavity extending therethrough;

a product pusher mechanism that is configured to controllably and automatically advance into and retract from the product chute to thereby advance a product through the product chute and out of the discharge end portion of the product chute;

a clipper mechanism pivotably attached to a mounting frame and disposed downstream of the product chute, wherein the clipper mechanism pivots from a home to a full-clip position in cooperating alignment with the product chute, the clipper mechanism configured to apply at least one clip to a covering material that encloses the product after the product exits the product chute; and a cutting member disposed downstream of the product chute, the cutting member configured to cooperate with the clipper mechanism to, in operation, automatically pivot with the clipper mechanism as the clipper travels from the home to the full clip position, then automatically travel generally upwardly to sever adjacent portions of covering material from an underside to top side thereof, wherein the system comprises a mounting frame that is configured to selectively mount a discharge tray with laterally pivoting flaps or a roller discharge table.

13. A system for enclosing at least one product in a covering material, comprising:
- an elongate product chute having an outer surface and opposing receiving and discharge end portions with an interior cavity extending therethrough;
- a product pusher mechanism that is configured to controllably and automatically advance into and retract from the product chute to thereby advance a product through the product chute and out of the discharge end portion of the product chute;
- a clipper mechanism pivotably attached to a mounting frame and disposed downstream of the product chute, wherein the clipper mechanism pivots from a home to a full-clip position in cooperating alignment with the product chute, the clipper mechanism configured to apply at least one clip to a covering material that encloses the product after the product exits the product chute; and
- a cutting member disposed downstream of the product chute, the cutting member configured to cooperate with the clipper mechanism to, in operation, automatically pivot with the clipper mechanism as the clipper travels from the home to the full clip position, then automatically travel generally upwardly to sever adjacent portions of covering material from an underside to top side thereof,
- wherein the product chute and pusher mechanism are configured to engage in an unsealed configuration.

* * * * *

UNITED STATES PATENT AND TRADEMARK OFFICE
CERTIFICATE OF CORRECTION

PATENT NO. : 7,237,369 B2 Page 1 of 1
APPLICATION NO. : 10/952421
DATED : July 3, 2007
INVENTOR(S) : Griggs et al.

It is certified that error appears in the above-identified patent and that said Letters Patent is hereby corrected as shown below:

On Title Page:

Sec. (56): Please add reference --7,234,287  6/2007  Griggs et al.--

In the Claims:

Column 26, Claim 6, Line 38:  Please correct "cuffing"
                               To read -- cutting--

Signed and Sealed this

Ninth Day of October, 2007

JON W. DUDAS
*Director of the United States Patent and Trademark Office*